(12) United States Patent
Kadono et al.

(10) Patent No.: US 6,351,562 B1
(45) Date of Patent: *Feb. 26, 2002

(54) PICTURE CODING APPARATUS AND DECODING APPARATUS

(75) Inventors: Shinya Kadono, Kobe; Kenjiro Tsuda, Kirakata, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,860

(22) Filed: Mar. 12, 1998

Related U.S. Application Data

(62) Division of application No. 08/552,617, filed on Nov. 3, 1995, now Pat. No. 5,751,377.

(30) Foreign Application Priority Data

Nov. 4, 1994 (JP) .................................. 6-271542
Nov. 4, 1994 (JP) .................................. 6-271543
Dec. 21, 1994 (JP) .................................. 6-318270

(51) Int. Cl.$^7$ ................................. G06K 9/36
(52) U.S. Cl. ................................. 382/232
(58) Field of Search ....................... 382/232, 233, 382/236, 238, 239, 240, 241, 242, 243, 248; 348/585, 586, 587, 589, 590, 591, 592, 593, 594, 595, 598; 358/432, 433, 262.1, 261.3

(56) References Cited

U.S. PATENT DOCUMENTS 4,691,329 A * 9/1987 Juri et al. .................... 382/248
4,796,087 A    1/1989 Guichard et al.

(List continued on next page.)

FOREIGN PATENT DOCUMENTS

| EP | 434429    | 6/1991  |
| EP | 588653    | 3/1994  |
| EP | 597450    | 5/1994  |
| EP | 0 606 675 | 7/1994  |
| EP | 0 606 856 | 7/1994  |
| WO | 88/09101  | 11/1988 |
| WO | 94/18799  | 8/1994  |

OTHER PUBLICATIONS

European Search Report dated Jan. 19, 2000, application No. 95117353.

(List continued on next page.)

*Primary Examiner*—Jose L. Couso
(74) *Attorney, Agent, or Firm*—Ratner & Prestia

(57) ABSTRACT

Representative picture extracting means 102 extracts representative pictures from a coded input signal 101 which consists of representative pictures, motion parameters for motion compensation which refers the representative picture, and reference relationships, and outputs a coded representative picture signal 103. The signal is decoded by a representative picture decoding means 104, and output as a decoded representative picture signal 105 to a delay memory 106. On the other and, representative picture reference relationship extracting means 112 extracts reference relationship additional information 113, and outputs it to decoded signal output controlling means 114. The sequence of outputting the representative pictures is determined on the basis of the reference relationship additional information 113, and an output control signal 115 is output to the delay memory 106. The delay memory 106 outputs the decoded representative picture signal 105 as a decoded output signal 107, on the basis of the output control signal 115.

2 Claims, 37 Drawing Sheets

U.S. PATENT DOCUMENTS

| | | | |
|---|---|---|---|
| 4,827,253 A | 5/1989 | Maltz | 348/586 |
| 4,853,784 A | 8/1989 | Abt et al. | 348/585 |
| 4,951,140 A | 8/1990 | Ueno et al. | |
| 5,063,444 A | 11/1991 | Knauer et al. | |
| 5,122,875 A | 6/1992 | Raychaudhuri et al. | |
| 5,177,608 A | 1/1993 | Ohki et al. | |
| 5,216,503 A | 6/1993 | Paik et al. | |
| 5,254,984 A | 10/1993 | Wakeland | 345/114 |
| 5,262,856 A | 11/1993 | Lippman et al. | |
| 5,282,037 A | 1/1994 | Eguchi et al. | 348/595 |
| 5,347,622 A | 9/1994 | Takemoto et al. | 348/586 |
| 5,408,272 A | 4/1995 | Barnett et al. | 348/585 |
| 5,463,728 A | 10/1995 | Blahut et al. | 345/344 |
| 5,491,517 A | 2/1996 | Kreitman et al. | 348/586 |
| 5,500,684 A | 3/1996 | Uya | 348/592 |
| 5,532,752 A | 7/1996 | Miyano | 348/586 |
| 5,548,696 A | 8/1996 | Kubota et al. | 345/435 |
| 5,568,167 A | 10/1996 | Galbi et al. | 348/589 |
| 5,621,869 A | 4/1997 | Drews | 345/435 |
| 5,631,107 A | 5/1997 | Frank et al. | 345/435 |
| 5,640,496 A | 6/1997 | Hardy et al. | 345/435 |
| 5,751,377 A * | 5/1998 | Kadono et al. | 348/586 |
| 5,930,394 A * | 7/1999 | Kondo et al. | 382/232 |

OTHER PUBLICATIONS

XP 000675651 "Object–Based Coding Method For Visual Telephony Using Discrete Wavelet Transform", K. Chow et al., vol. 2501, pp. 1737–1747, May 24, 1995.

XP000533815 "The Block–Based Coder Mode In An Object–Based Analysis–Synthesis Coder", J. Ostermann, pp. 960–964, vol. CONF. 28, Oct., 30, 1994.

XP000314537 "Adapting Transform Coding To Texturally Segmented Images", Sanei et al., vol. CONF. 25, pp. 1205–1209, Jun. 4, 1991.

XP000519203 "Segmentation–Based Texture Coding Algorithm For Packet Video: A Goal Oriented Approach", Day–Fann Shen et al., SPIE vol. 1818, pp. 1135–1145, Nov. 18, 1992.

XP000044684 "Optimization Of A Monochrome Picture Coding Scheme Based On A Two–Component Model", D. Barba et al., vol. CONF. 9, pp. 618–622, Nov. 14, 1988.

XP000036748 "Two–Layer Coding Of Video Signals For VBR Networks", M. Ghanbari, vol. 7, No. 5, pp. 771–781, Jun. 7, 1989.

"Representing Moving Images With Layers", John Y.A. Wang et al, vol. 3, No. 5, Sep., 1994.

* cited by examiner

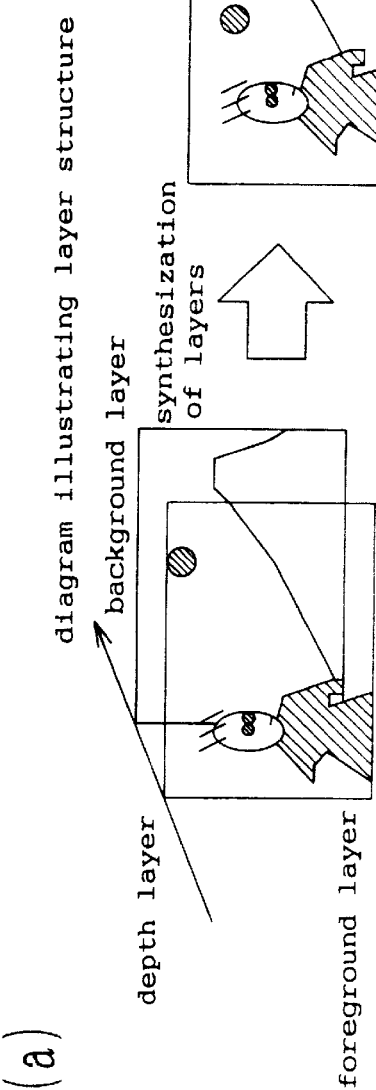
Fig. 11(a) diagram illustrating layer structure
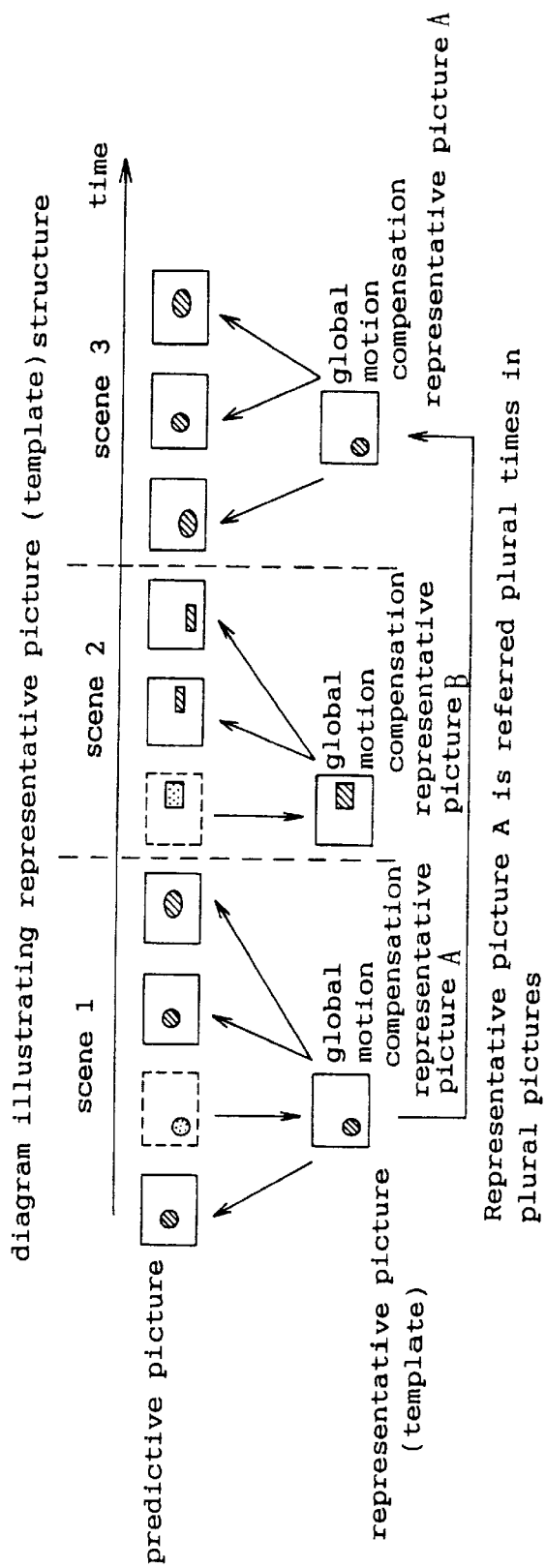
Fig. 11(b) diagram illustrating representative picture (template) structure

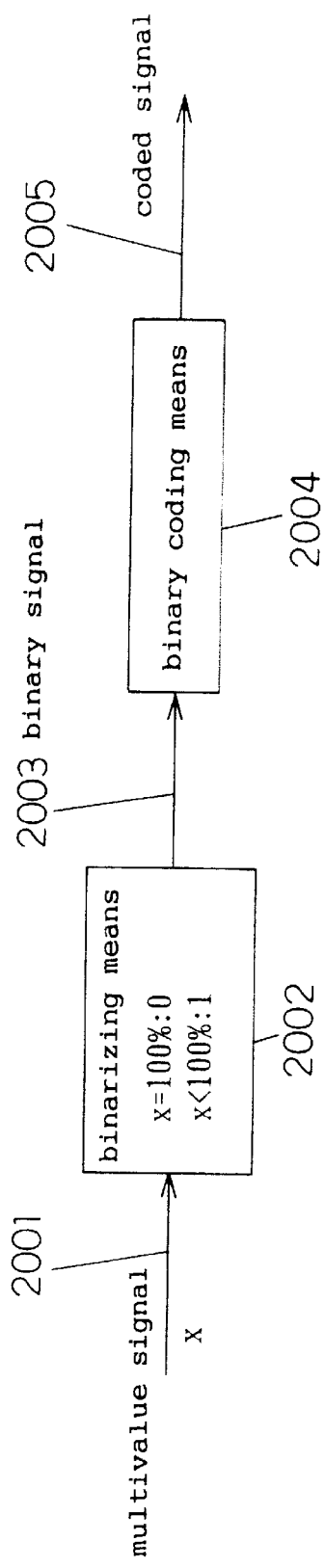
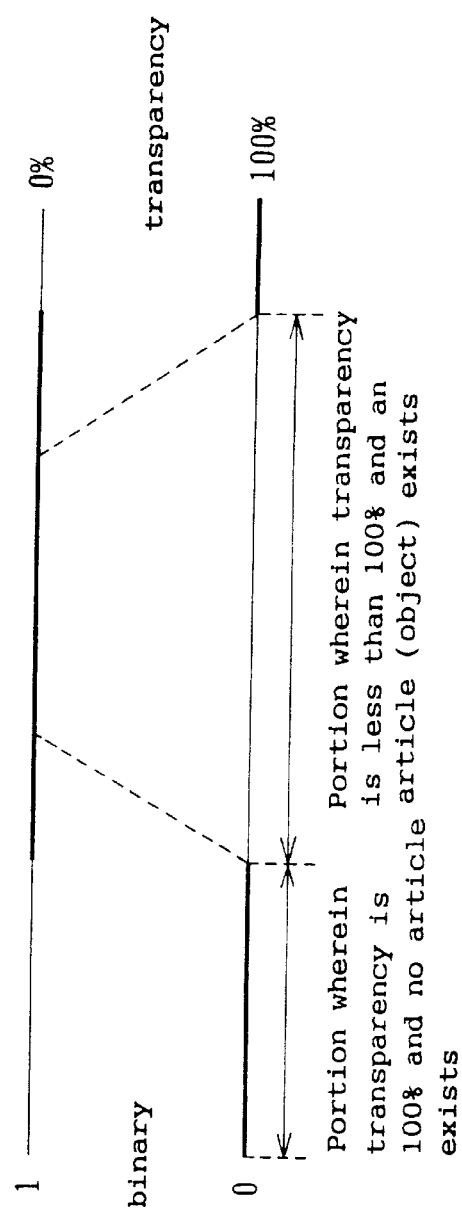
Fig. 16(a)
Fig. 16(b)

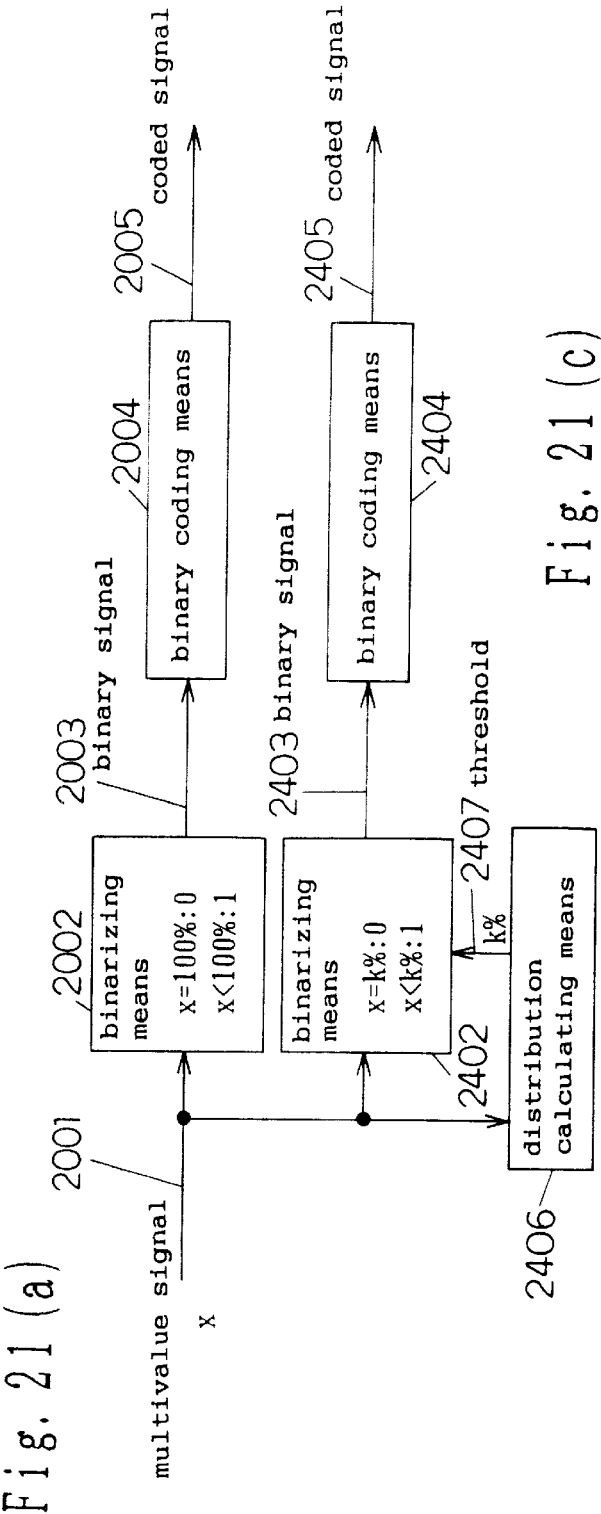
Fig. 21(a)
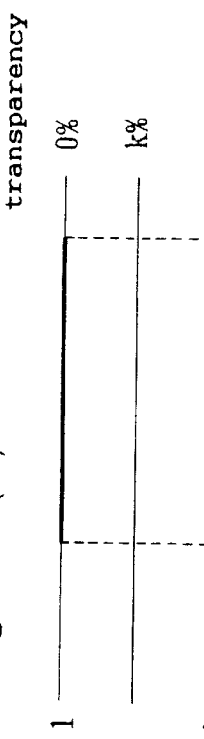
Fig. 21(b)
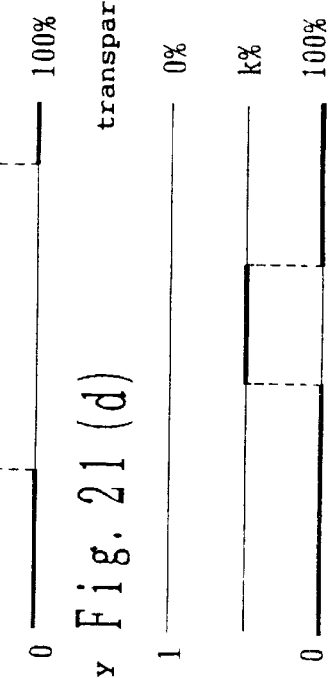
Fig. 21(c)
Fig. 21(d)

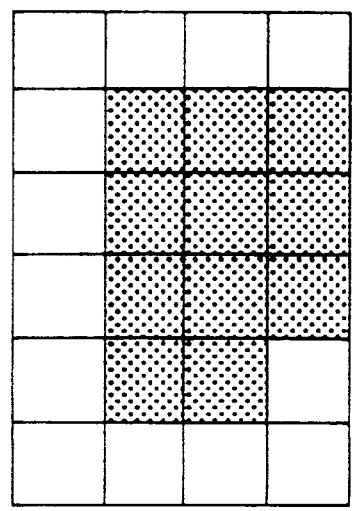
 coding unit (pixel block)
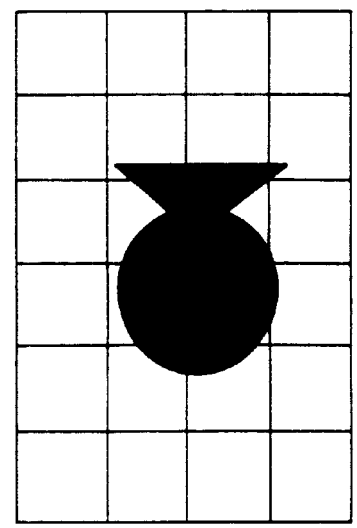
Fig. 29

Fig. 35
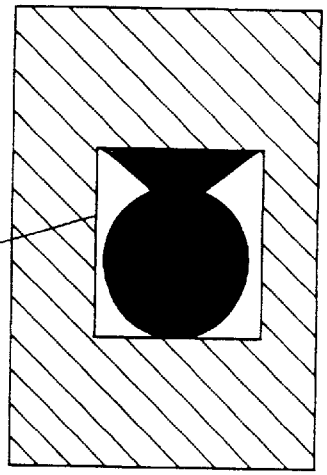
single pixel block to be encoded
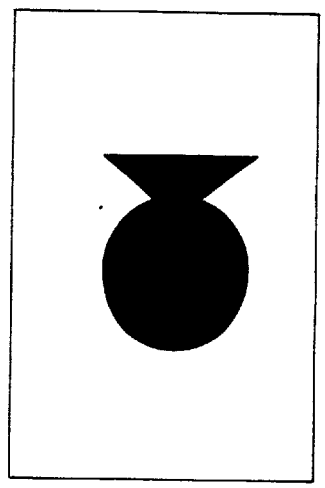

The pixel value in the dotted region which is not a pixel to be encoded is set to be the average value of the pixel value to be encoded in the solid region.

PICTURE CODING APPARATUS AND DECODING APPARATUS

This application is a divisional application of U.S. patent application Ser. No. 08/552,617, filed Nov. 3, 1995 now U.S. Pat. No. 5,751,377.

BACKGROUND OF THE INVENTION

1. Field of the Invention

The invention relates to a picture coding apparatus and a decoding apparatus which, when a video signal is to be encoded and decoded for storage or transmission, can realize high efficiency coding, and also a high speed search or reproduction of excellent efficiency.

2. Related Art of the Invention

Recently, MPEG (Moving Picture Expert Group) which is an international standard is typical of video coding.

According to MPEG, intrapicture coding is first conducted, motion vectors of a P-frame or a B-frame are detected on the basis of the intrapicture-decoded picture (I-frame) corresponding to the coding, motion compensation prediction of the detected motion vectors is conducted based on the motion vectors, and a difference between a motion compensated picture obtained by the motion compensation and the picture to be encoded is encoded. Namely, MPEG is a coding method of the intrapicture/interpicture selection type in which the intrapicture-decoded picture and the intrapicture coding of the picture are combined with each other.

In a coding method of the intrapicture/interpicture selection type, in order to prevent error propagation from occurring or enable an encoded picture to be reproduced from the middle irrespective of the contents of a moving picture, intrapicture coding is conducted with a predetermined period. When a moving picture is to be subjected to high speed reproduction, therefore, only a picture which has undergone intrapicture coding is extracted and then decoded to obtain a reproduced picture.

FIG. 10 is a block diagram of a high-speed reproduction apparatus in which an intrapicture-coded picture is extracted and then decoded. In the figure, 1 designates a coded input signal, 2 designates intrapicture-coded picture extracting means, 3 designates an intrapicture-coded signal, 4 designates intrapicture-coded picture decoding means, and 5 designates a decoded output signal.

The operation of the thus configured high-speed reproduction apparatus will be described. The intrapicture-coded picture extracting means 2 extracts only a picture which has undergone intrapicture coding, from the coded input signal 1 which has been subjected to coding of the intrapicture/interpicture selection type, and outputs the intrapicture-coded signal 3. The intrapicture-coded picture decoding means 4 decodes the intrapicture-coded signal 3 and outputs the decoded output signal 5. In this way, high-speed reproduction is conducted by extracting only an intrapicture-coded picture and decoding it.

In the high-speed reproduction apparatus, however, a P-frame or B-frame cannot be used in high-speed reproduction unless a I-frame or P-frame which is to be referred is decoded. Consequently, it is difficult to produce a high-speed reproduction apparatus which can smoothly conduct high-speed reproduction.

Even when only a part of a picture is updated, moreover, the previous picture must be updated. This causes the amount of information to be processed for high-speed reproduction, to be increased.

Since reproduction is performed at fixed intervals, it is difficult to conduct high-speed reproduction or a high-speed scene search in accordance with a change in contents of a picture.

Coding of pixel value information for a conventional picture scene is conducted on a single layer. In other words, pixel value information of the whole contents of one scene of a picture are completed on a single layer, and coding is conducted on each of the pixel value information on the single layer. When pixel value information which is completed on a single layer is to be encoded, the need for efficiently conducting the coding is growingly increased.

However, conventional means for encoding pixel value information which is completed on a single layer has a problem in that, even when a pixel which is not required to be encoded exists in the single layer, coding must be conducted with considering the value of the pixel and therefore the amount of information to be encoded is increased so that the processing speed is reduced.

SUMMARY OF THE INVENTION

According to the invention, a technique of layered coding is employed in which a moving picture is separated into layers such as a background, a foreground, and characters or pictures are separately prepared as one layer and coding is conducted on each layer. As a novel technique of coding a moving picture, the inventors have proposed in another patent application a technique of layered coding which uses a representative picture structure and global motion compensation.

FIG. 11(a) is a diagram illustrating a layered structure. A final output picture is generated by synthesizing a foreground layer with a background layer. In each layer, coding is conducted by using a representative picture (template) structure and global motion compensation. Global motion compensation is a method in which motion of the whole picture is represented by global motion parameters such as translation, rotation, zooming, and reduction, motion compensation is conducted, and a predictive coded picture is generated. In the method, a predictive differential signal may be encoded or predictive differential signal coding may be omitted.

FIG. 11(b) is a diagram illustrating the representative picture structure. Each layer is tracked along the time series, and a picture which represents each scene is selected as a representative picture. Examples of selecting a representative picture are listed below:

1. A picture which, in motion compensation, exhibits a minimum differential signal after motion compensation is selected.

2. A picture which is easy to search in a search process is artificially selected.

3. The first picture in a scene is selected.

In each scene, global motion compensation is conducted while using the representative picture of the scene as the reference picture, and a predictive coded picture is generated. As the representative picture to be referred, a representative picture of the scene, or a picture which has been selected as the representative picture in a previous scene may be selected. In other words, there is a possibility that the same representative picture is referred in a plurality of scenes. Such a scene may be a scene between scene changes in a picture, or a small scene which is obtained by partitioning in accordance with the groups of motions of the object. Alternatively, the scene may be deemed as a scene which is united in contents of a picture.

To comply with this, it is an object of the invention to provide a picture coding apparatus and a decoding apparatus for the coding apparatus which can conduct a search or reproduction wherein stress is placed on rapidness or wherein stress is placed on rapidness and also on continuity.

It is another object of the invention to provide a picture coding apparatus and a decoding apparatus for the coding apparatus which can efficiently encode and decode a picture signal.

Specifically, an object of the invention is to provide a picture decoding apparatus which can conduct high speed reproduction rapidly and efficiently with using a representative picture structure and a layered structure in layered coding which uses a representative picture structure and global motion compensation.

In the picture coding apparatus of the invention, even when the same representative picture is referred plural times in a plurality of scenes in the case where a coded signal consisting of representative pictures representing scenes of a picture and predictive coded pictures referring the representative pictures is to be encoded, reference relationships are encoded as additional information, and therefore it is possible to realize high-efficiency coding in which waste such as duplication of encoding the same representative picture is eliminated. In addition to the reference relationships, significance in contents of the time series of representative pictures may be encoded so that, in decoding associated with a high speed search or high speed reproduction, only a representative picture of higher significance is allowed to be decoded only by referring additional information of higher significance.

In the picture decoding apparatus of the invention, when a coded signal consisting of representative pictures representing scenes of a picture and predictive coded pictures referring the representative pictures is to be decoded, only a coded representative picture signal is extracted from a coded input signal by representative picture extracting means and then decoded by representative picture decoding means. Since only a representative picture signal is subjected to decoding, high-speed reproduction can be realized. Since a representative picture signal is selected in accordance with a large change of a picture, the selected signal corresponds to a scene change of a picture. Therefore, high speed reproduction or scene search of excellent efficiency which reflects the picture contents is enabled only by tracking representative pictures.

In the picture decoding apparatus of the invention, when a coded signal consisting of representative pictures representing scenes of a picture and predictive coded pictures referring the representative pictures is to be decoded, significance of a representative picture in a time series of a picture is set in decreasing order of significance in contents, representative picture extracting means extracts a representative picture in consideration of significance, and only a representative picture of higher significance is decoded. Since significance is considered, it is possible to omit decoding of a representative picture which is not important in contents. Therefore, high speed reproduction or search of more excellent efficiency is enabled.

In the picture decoding apparatus of the invention, when a coded signal consisting of representative pictures representing scenes of a picture and predictive coded pictures referring the representative pictures is to be decoded, high speed reproduction is performed by conducting not only decoding of a representative picture but also a part of a predictive coded signal referring a representative picture signal. It is sufficient for decoding of a predictive coded signal to decode a representative picture signal to be referred and global motion parameters. Since high speed reproduction is performed while decoding a part of a predictive coded signal, it is possible to realize high speed reproduction which complies with the picture contents and in which motion is relatively smooth.

In the picture decoding apparatus of the invention, when a coded signal consisting of representative pictures representing scenes of a picture and predictive coded picture referring the representative pictures is to be decoded, the time interval between adjacent representative picture signals, namely, predictive coded pictures existing between representative picture signals is counted. The coded signal is decoded while shortening the representative picture interval to a time interval which is proportional to the number of the predictive coded pictures, and then output, thereby realizing high speed reproduction which maintains the original smoothness in the time direction of the picture.

In the picture coding apparatus of the invention, when a picture is to be encoded for each of layers such as a background and a foreground, significance in contents is added to each layer as additional information and encoded. In decoding for high speed reproduction or scene search, therefore, the significance is referred so that a layer of higher significance is subjected to decoding which is detailed in contents, and that of lower significance is subjected to simplified decoding or refrained from being subjected to decoding.

In the picture decoding apparatus of the invention, in the case where a picture is encoded for each of layers such as a background and a foreground, when decoding for high speed reproduction or scene search is to be conducted, additional information of layer significance of a coded signal of each layer which is an input signal is referred to judge significance. Then a layer of higher significance in contents is subjected to decoding which is detailed, and that of lower significance is subjected to simplified decoding or refrained from being subjected to decoding, thereby realizing decoding in which waste is eliminated and which enables a high speed scene search or reproduction of excellent efficiency.

In the picture decoding apparatus of the invention, in the case where a picture is expressed by a layered structure and a coded signal consisting of representative pictures representing scenes of a picture and predictive coded pictures referring the representative pictures is to be decoded, when decoding of a representative picture signal is newly conducted in layers the number of which is larger than a predetermined one by predetermined-number judging means, the output of a representative picture is updated in all layers. Even when coding positions of representative pictures in time series in layers are different from each other, therefore, it is possible to coincide output positions with each other. When the number of layers is less than the predetermined number, the output of a representative picture is not updated. Consequently, processing can be simplified.

In the picture decoding apparatus of the invention, in the case where a picture is expressed by a layered structure, the method of decoding layer-1 is changed from that of decoding layer-2, and the output process is performed without synthesizing layers with each other, but with switching the output layer, thereby realizing high speed reproduction or scene search of excellent efficiency in which functions of high speed reproduction and high speed scene search are selected in accordance with the picture contents of the layers. Since decoding is required to be conducted only in the switched layer, decoding in which decoding of a non-selected layer is omitted or waste is eliminated is enabled.

Specifically, an object of the invention is to efficiently realize coding and decoding in a picture which is expressed by a layered structure, with using transparency information between layers of the layered structure.

In the picture coding apparatus of the invention, coding of transparency of a pixel value obtained from a picture signal results in most cases in a distribution in which the ratio of intermediate level values is small or most elements are 0% or 100%. When the binarization of transparency is efficiently conducted so that coding of intermediate level values is omitted or simplified, therefore, the coding efficiency can be improved.

In the picture coding apparatus of the invention, when the frequency ratio of intermediate level values is not small, the part other than that of transparency of 100% is extracted as one region, and pixels in the one region are subjected to a multivaluing process, whereby the process of multivalue-encoding the region other than the one region can be omitted. Consequently, the coding efficiency can be improved.

Specifically, the invention is a picture coding apparatus which judges for a picture signal on the basis of the transparent state of the pixel value whether a pixel region is to be encoded or not, and a pixel region to be encoded is encoded by a predetermined coding method on the basis a pixel to be encoded position signal which is obtained by encoding the judgment result.

In the picture coding apparatus of the invention, a picture signal is checked to judge whether a pixel region is to be encoded or not, on the basis of the transparent state of the pixel value, and a pixel region is to be encoded is encoded by a predetermined coding method on the basis a pixel to be encoded position signal which is obtained by encoding the judgment result. Therefore, coding of a pixel region other than the pixel region to be encoded can be omitted. Consequently, the invention has an advantage that the efficiency of coding can be improved.

To achieve the above objects, the invention provides a picture coding apparatus comprising: binarizing means (2002) for binarizing transparency information for each of pixels of a picture on the basis of a predetermined value; binary coding means (2004) for binary-encoding the transparency information binarized by the binarizing means; judging means (2203) for judging whether or not the transparency information for each of the pixels is to be multivalue-encoded on the basis of the transparency information, for each of the pixels; and multivalue coding means (2206) for multivalue-encoding the transparency information which is judged by the judging means that the transparency information is to be multivalue-encoded.

Further, to achieve the above objects, the invention provides a picture coding apparatus comprising: judging means (3005) for judging whether or not each pixel of a picture is to be encoded on the basis of transparency information for the pixel; and coding means for encoding each pixel which is judged by the judging means that the pixel is to be encoded.

To achieve the above objects, the invention provides a picture coding apparatus comprising: representative picture selecting means (12) for selecting a representative picture from a picture group which includes a plurality of pictures; coding means for encoding each of the pictures which are included in the picture group, with using the representative picture; and signal generating means (17) for generating a signal including the pictures encoded by the coding means, and for generating a signal including coding information relating to the representative picture which is used for each of the encoded pictures included in the signal; the signal generating means being able to separately send the signal including the encoded pictures and the signal including the coding information relating to the representative picture.

Further, to achieve the above objects, the invention provides a picture decoding apparatus comprising: representative picture extracting means (102) for extracting information relating to all or part of the representative pictures, from the signal generated by the signal generating means (17) of the picture coding apparatus; and representative picture decoding means (104) for decoding the representative picture extracted by the representative picture extracting means.

BRIEF DESCRIPTION OF THE DRAWINGS

These and other objects, advantages, features, and uses will become more apparent as the description proceeds, when considered with the accompanying drawings in which:

FIG. 11(*a*) is a diagram illustrating a layered structure in layered coding which uses a representative picture and global motion compensation;

FIG. 11(*b*) is a diagram illustrating a representative picture structure in layered coding which uses a representative picture and global motion compensation;

FIG. 16(*a*) is a block diagram relating to a picture coding apparatus which is a tenth embodiment of the invention;

FIG. 16(*b*) is a diagram showing binarization of binarizing means;

FIG. 21(a) is a block diagram of a picture coding apparatus which is a fifteenth embodiment of the invention;

FIG. 21(b) is a diagram showing an example of a multi-value signal 2001;

FIG. 21(c) is a diagram showing an example of a binary signal 2003;

FIG. 21(d) is a diagram showing an example of a binary signal 2403;

FIG. 29 is a diagram showing pixel blocking in the twenty-second embodiment;

FIG. 35 is a diagram showing single blocking in the twenty-fifth embodiment;

DETAIL DESCRIPTION OF THE INVENTION

Figure 1:
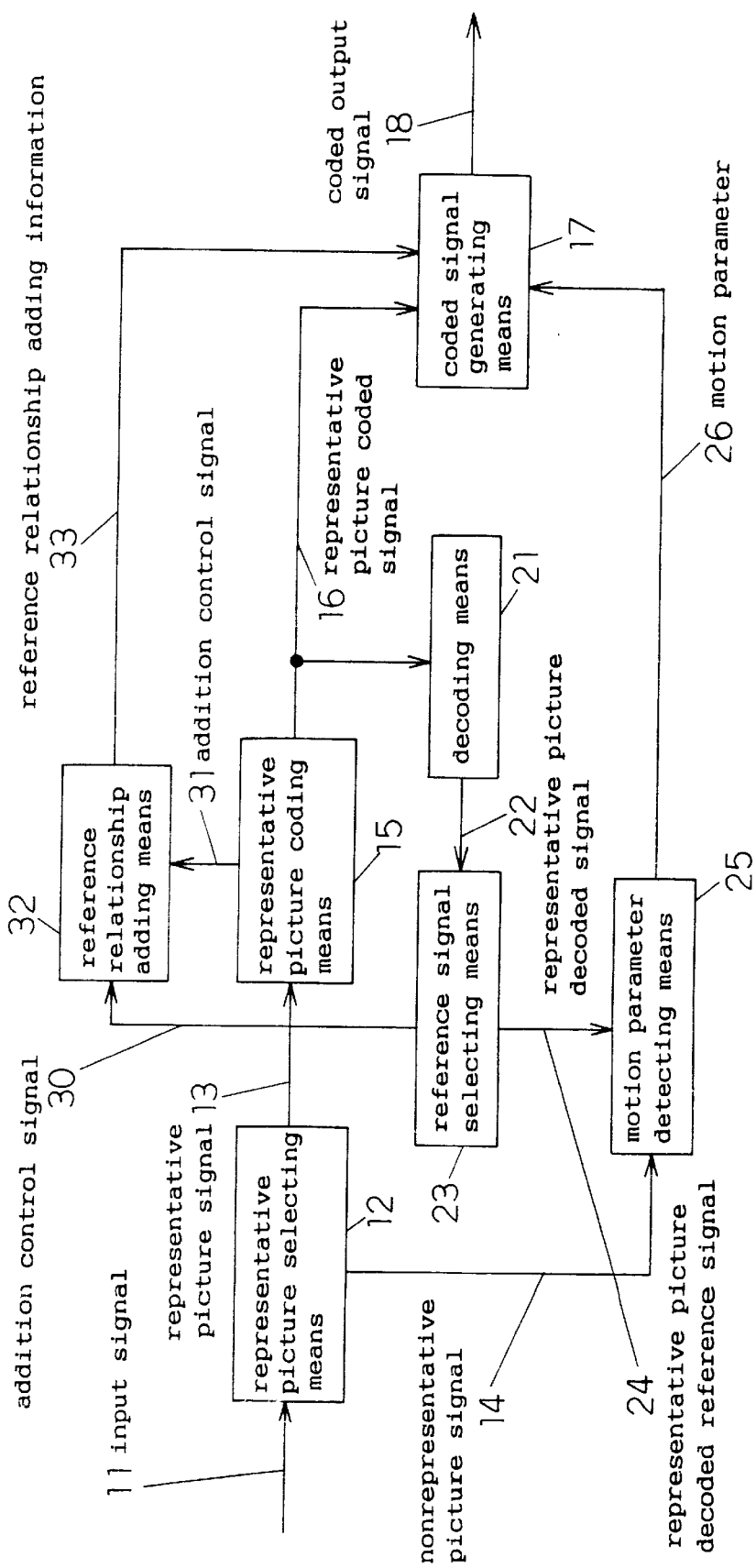
FIG. 1 is a block diagram of a picture coding apparatus which is a first embodiment of the invention.

Referring now to FIG. 1, there is shown therein a block diagram of a picture coding apparatus which is a first embodiment of the invention. The reference numeral 11 designates an input signal, 12 designates representative picture selecting means, 13 designates a representative picture signal, 14 designates a nonrepresentative picture signal, 15 designates representative picture coding means, 16 designates a representative picture coded signal, 17 designates coded signal generating means, 18 designates a coded output signal, 21 designates decoding means, 22 designates a representative picture decoded signal, 23 designates reference signal selecting means, 24 designates a representative picture decoding reference signal, 25 designates motion parameter detecting means, 26 designates a motion parameter, 30 and 31 designate addition control signals, 32 designates reference relationship adding means, and 33 designates reference relationship adding information. The input signal 11 is a picture signal.

The operation of the thus configured picture coding apparatus of the embodiment will be described. The representative picture selecting means 12 selectively outputs from the input signal 11 which is a picture to be encoded, the representative picture signal 13 which will function as the representative picture of each scene, and the nonrepresentative picture signal 14 which is to be encoded as a predictive picture by motion compensation. Examples of selecting a representative picture are listed below:

1. A picture which, in motion compensation, exhibits a minimum differential signal after motion compensation is selected.

2. A picture which is easy to search in a search process is artificially selected.

3. The first picture in a scene is selected.

The scene may be a scene between scene changes in a picture, or a small scene which is obtained by partitioning a scene between scene changes in accordance with the groups of motions of the object. The scene may be deemed as a scene which is united in contents of a picture.

The representative picture coding means 15 encodes the representative picture signal 13, and outputs the coded signal as the representative picture coded signal 16. Furthermore, the means determines the reference relationship for using the representative picture as a reference picture of predictive coding, and outputs the addition control signal 31 to the reference relationship adding means 32. The representative picture may be encoded by, for example, a coding method in which orthogonal transformation of the discrete cosine transform (DCT) used in MPEG is performed and then transform coefficients are subjected to entropy coding. The invention is not restricted to the method.

The reference relationship adding means 32 generates the reference relationship adding information 33 on the basis of the addition control signal 31 and the addition control signal 30 output from the reference signal selecting means 23, and outputs the signal to the coded signal generating means 17.

In the embodiment, the representative picture which represents each scene of a picture, and a predictive coded picture which refers the representative picture are encoded. Therefore, there is the case where the same representative picture is referred plural times in a plurality of scenes. The case shown in FIG. 11(b) will be described. The same representative picture A is referred in scenes 1 and 3, and hence representative pictures A and B are sufficient for the three scenes. In this case, therefore, the two representative pictures are encoded, and the reference relationships of additional information is "ABA". When the reference relationships are encoded as additional information in this way, a waste of duplication of encoding the same representative picture is eliminated. In addition to the reference relationship, significance in contents of the time series of representative pictures is encoded. In decoding associated with a high speed search or high speed reproduction, therefore, only a representative picture of higher significance is allowed to be decoded only by referring additional information of significance. As an example of significance addition conditions, a condition that, when motion or deformation of the object between representative pictures is large in degree, significance is increased, and, when motion or deformation is small in degree, significance is reduced may be employed.

The decoding means 21 decodes the representative picture coded signal 16, and outputs the representative picture decoded signal 22 to the reference signal selecting means 23. The reference signal selecting means 23 stores the representative picture decoded signal 22, selects a representative picture decoded signal corresponding to each nonrepresentative picture signal, and outputs the selected signal as the representative picture decoding reference signal 24 to the motion parameter detecting means 25. The reference signal selecting means 23 outputs also a signal indicative of the scene the representative picture of which is used as the reference picture, to the reference relationship adding means 32 as the addition control signal 30. If the reference signal selecting means 23 stores several previous representative pictures, it is possible to select an optimum representative picture when motion parameters are to be detected, and the same representative picture can be referenced plural times over a plurality of scenes.

The motion parameter detecting means 25 compares the nonrepresentative picture signal 14 with the representative picture decoding reference signal 24, calculates motions between the two pictures to detect the motion parameter 26 for motion compensation coding, and outputs the detected parameter. In this case, when the motion of the whole picture is written by global motion parameters such as translation, rotation, zooming, and reduction, the coding efficiency is improved. The predictive differential signal for the motion compensation may be encoded or the predictive differential signal coding may be omitted. The coded signal generating means 17 combinedly outputs the motion parameter 26, the representative picture coded signal 16, and the reference relationship adding information 33, as the coded output signal.

As seen from the above description, in the embodiment, since the reference relationships of representative pictures are encoded as additional information, a waste of duplication of encoding the same representative picture is eliminated. Therefore, the embodiment can realize a picture coding apparatus of excellent efficiency.

Furthermore, in addition to the reference relationships, significance in contents of the time series of representative pictures is encoded. In decoding in a high speed search or high speed reproduction, therefore, only a representative picture of higher significance is allowed to be decoded only by referring additional information of significance.

Figure 2:
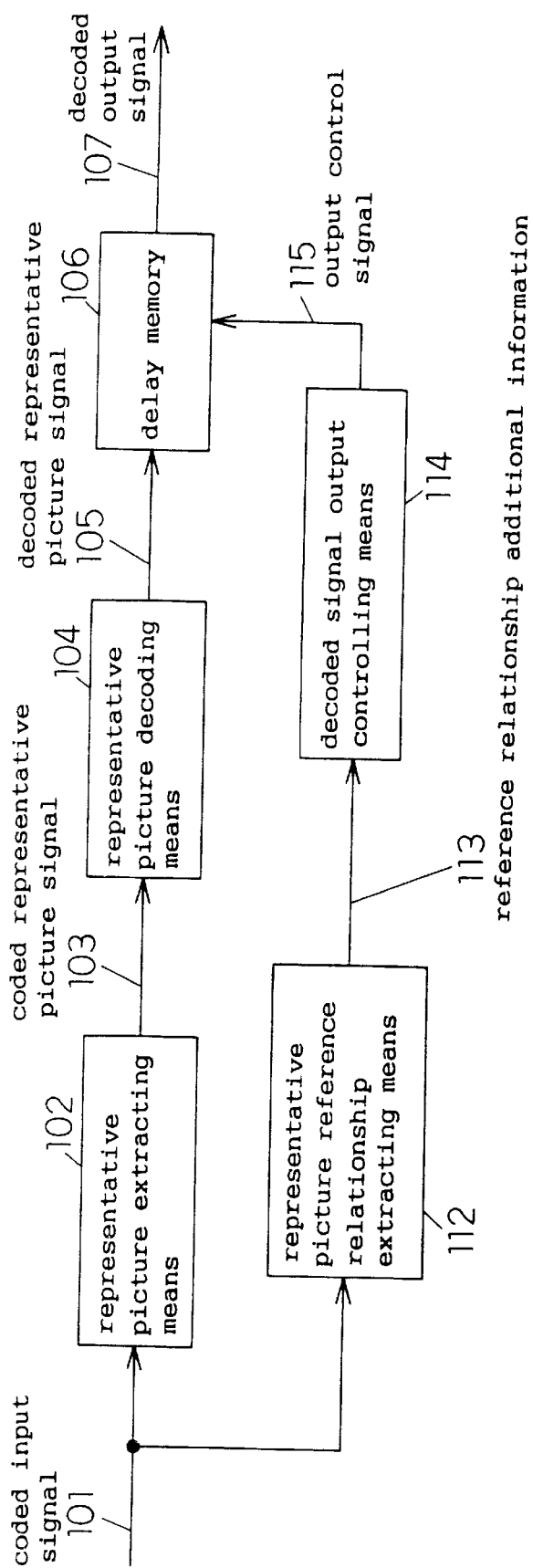
FIG. 2 is a block diagram of a picture decoding apparatus which is a second embodiment of the invention.

Referring to FIG. 2, there is shown therein a block diagram of a picture decoding apparatus which is a second embodiment of the invention. The reference numeral 101 designates a coded input signal, 102 designates representative picture extracting means, 103 designates a coded representative picture signal, 104 designates representative picture decoding means, 105 designates a decoded representative picture signal, 106 designates a delay memory, 107 designates a decoded output signal, 112 designates representative picture reference relationship extracting means, 113 designates reference relationship additional information, 114 designates decoded signal output controlling means, and 115 designates an output control signal.

The operation of the thus configured picture decoding apparatus of the embodiment will be described. The coded input signal 101 is the coded output signal 18 which is encoded by the picture coding apparatus of the first embodiment, and consists of representative pictures which respectively represent scenes of a picture, motion parameters for motion compensation predictive coding which refers the representative pictures, and additional information of reference relationships of the representative pictures. The representative picture extracting means 102 extracts a representative picture from the coded input signal 101, and outputs the coded representative picture signal 103. Since the time intervals of the scenes are not constant, those of the representative pictures are not constant. The coded representative picture signal 103 is decoded by the representative picture decoding means 104, and sent as the decoded representative picture signal 105 to the delay memory 106.

The representative picture reference relationship extracting means 112 extracts the reference relationship additional information 113 from the coded input signal 101, and outputs the extracted information to the decoded signal output controlling means 114. On the basis of the reference relationship additional information 113, the decoded signal output controlling means 114 determines the order of outputting the representative pictures and output conditions, and outputs the output control signal 115 to the delay memory 106.

On the basis of the output control signal 115, the delay memory 106 outputs the decoded representative picture signal 105 as the decoded output signal 107. As the output conditions, for example, considered are the cases where, when the decoded representative picture signal 105 is input, the signal is output as it is based on the reference relationship, and where, in accordance with the target reproduction speed, the same decoded representative picture signal 105 is continuously output plural times. If the delay memory 106 stores several previous representative pictures, when the same representative picture is to be again output, the representative picture is allowed to be immediately output without conducting decoding and only by reading the decoded representative picture on the basis of the reference relationship additional information.

The coded input signal 101 may be either of a coded input signal of a single layer and that for each layer based on a layered structure as far as the signal is encoded on the basis of the representative picture structure.

Figure 12:
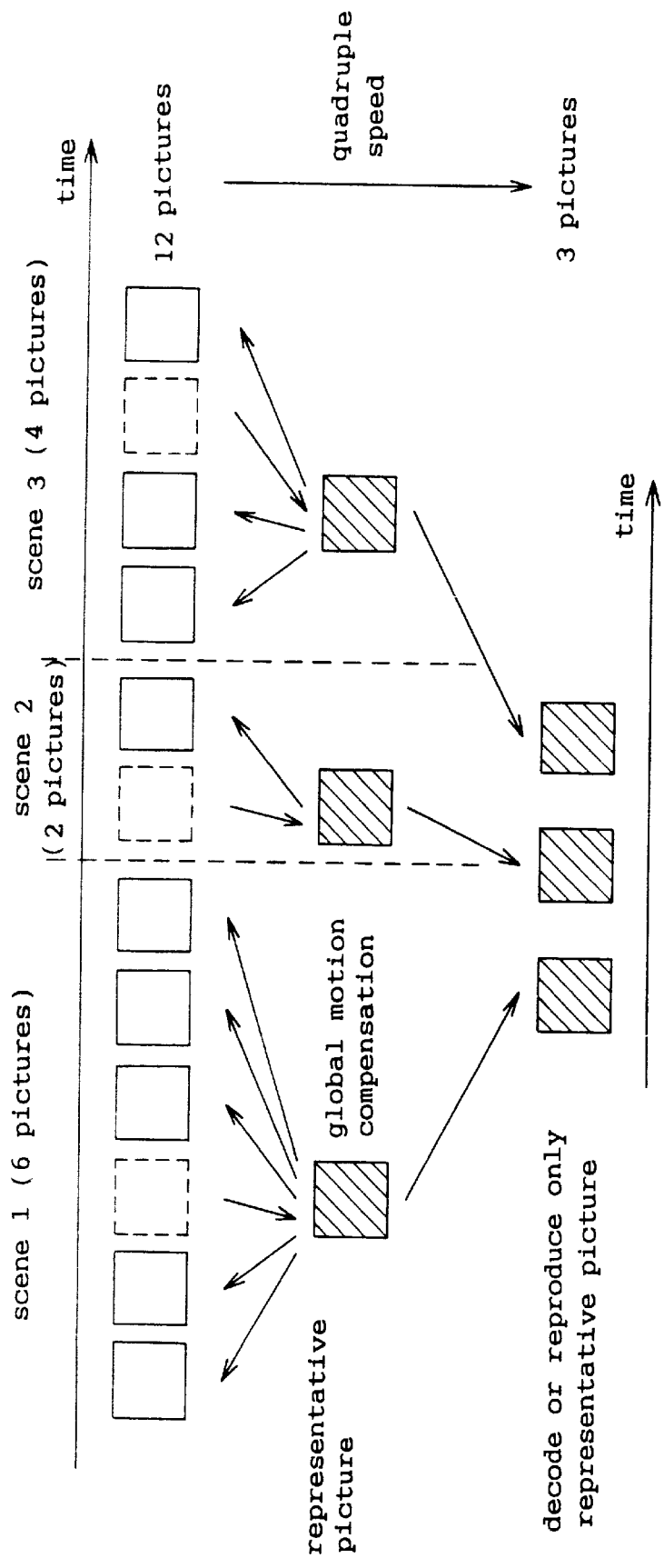
FIG. 12 is a diagram illustrating the operation of the second embodiment.

FIG. 12 is a diagram illustrating an example of the operation of the embodiment. The twelve pictures in the upper portion indicate the manner of reproduction in normal decoding. In the picture decoding apparatus of the embodiment, since only representative pictures are extracted and decoded, decoding and reproduction are conducted on the three pictures in the lower portion. In this case, reproduction is done at a quadruple speed.

As seen from the above description, according to the embodiment, the employment of the configuration in which the object of decoding is restricted to representative pictures can realize high speed reproduction.

Since the representative picture signal 13 is selected in consideration of scene changes of a picture, the signal corresponds to scene changes of a picture. Consequently, high speed reproduction or scene search of excellent efficiency which reflects the picture contents is enabled only by tracking representative pictures.

Figure 3:
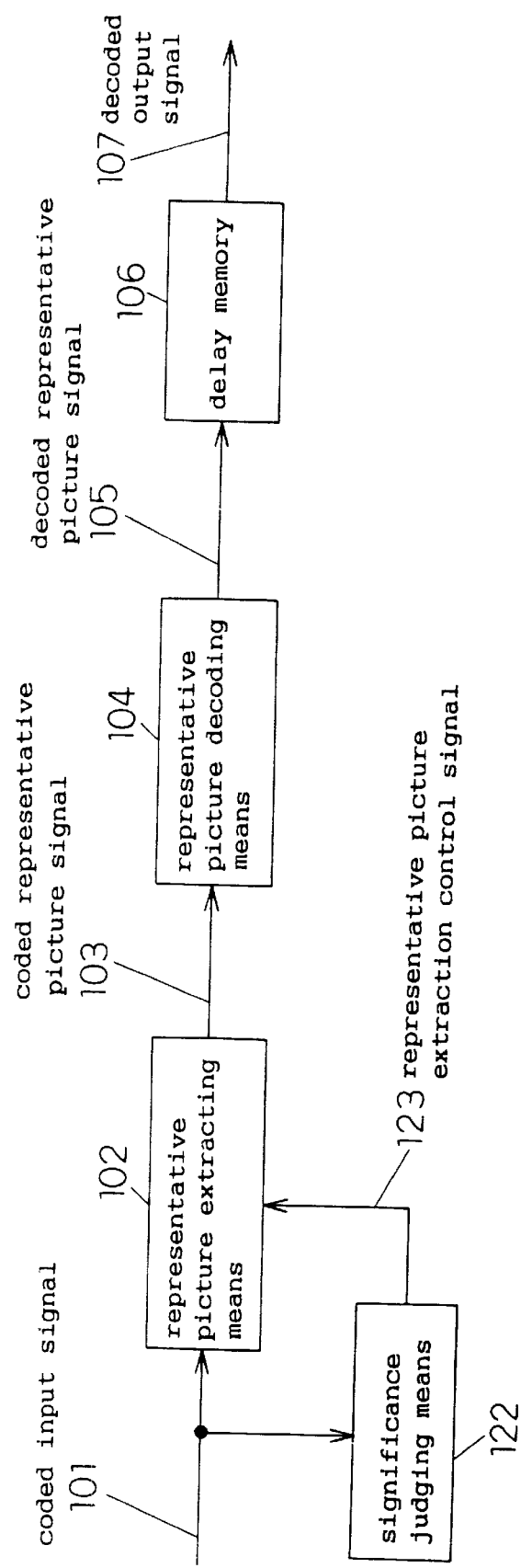
FIG. 3 is a block diagram of a picture decoding apparatus which is a third embodiment of the invention.

Referring to FIG. 3, there is shown therein a block diagram of a picture decoding apparatus which is a third embodiment of the invention. The reference numeral 101 designates a coded input signal, 122 designates significance judging means, 123 designates a representative picture extraction control signal, 102 designates representative picture extracting means, 103 designates a coded representative picture signal, 104 designates representative picture decoding means, 105 designates a decoded representative picture signal, 106 designates a delay memory, and 107 designates a decoded output signal. The embodiment has a configuration in which the significance judging means 122 is provided in place of the representative picture reference relationship extracting means 112 and the decoded signal output controlling means 114 of the second embodiment.

The operation of the thus configured picture decoding apparatus of the embodiment will be described. The coded input signal 101 is the coded output signal 18 which is encoded by the picture coding apparatus of the first embodiment, and consists of representative pictures which respectively represent scenes of a picture, motion parameters for motion compensation predictive coding which refers the representative pictures, and additional information including reference relationships and significance of the representative pictures.

The significance judging means 122 extracts significance of a coded representative picture from the coded input signal 101, and compares the extracted significance with a predetermined value. When the significance is higher, the significance judging means outputs the representative picture extraction control sign al 123 to the representative picture extracting means 102. On the basis of the representative picture extraction control signal 123, the representative picture extracting means 102 extracts representative pictures from the coded input signal 101, and outputs the coded representative picture signal 103. The subsequent operations are the same as those of the second embodiment, and hence their description is omitted.

Figure 13:
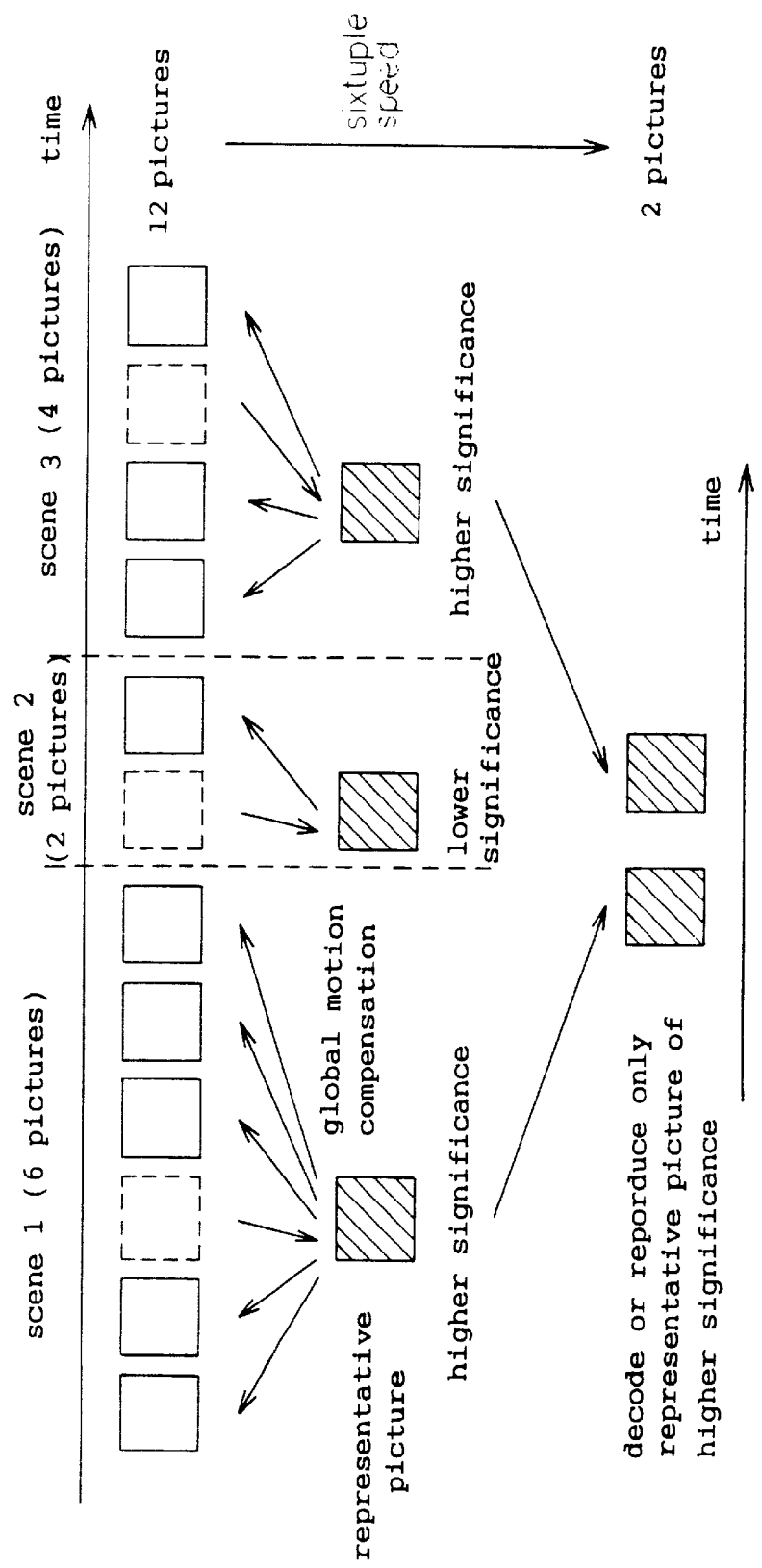
FIG. 13 is a diagram illustrating the operation of the third embodiment.

FIG. 13 is a diagram illustrating an example of the operation of the embodiment. The twelve pictures in the upper portion indicate the manner of reproduction in normal decoding. In the embodiment, since only representative pictures of higher significance are extracted and decoded, decoding and reproduction are conducted on the two pictures in the lower portion. In this case, reproduction is done at a sextuple speed.

As an example of conditions of determining significance in coding of the coded input signal 101, a technique in which significance is increased in accordance with a large change of scenes in the case where motion is largely changed may be employed. Alternatively, a technique in which significance is increased in accordance with a large change in contents of a scene in the case where the background or the object is changed may be employed.

The coded input signal 101 may be either of a coded input signal of a single layer and that for each layer based on a layered structure as far as the signal is encoded on the basis of the representative picture structure.

As seen from the above description, according t o the embodiment, the employment of the configuration in which significance is considered can realize a picture decoding apparatus having functions of high speed reproduction and search which a re further excellent in efficiency.

Figure 4:
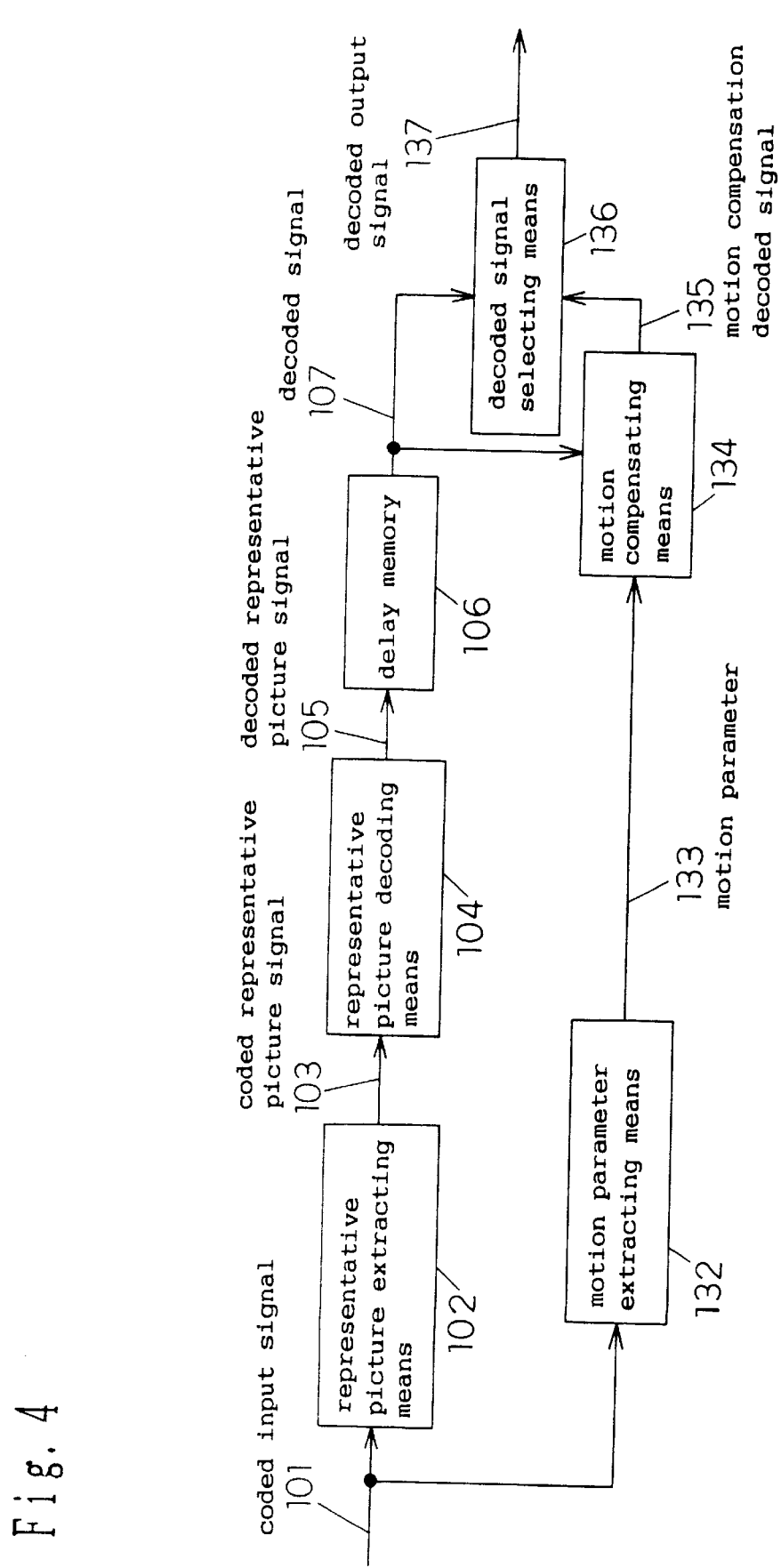
FIG. 4 is a block diagram of a picture decoding apparatus which is a fourth embodiment of the invention.

Referring to FIG. 4, there is shown therein a block diagram of a picture decoding apparatus which is a fourth embodiment of the invention. The reference numeral 101 designates a coded input signal, 102 designates representative picture extracting means, 103 designates a coded representative picture signal, 104 designates representative picture decoding means, 105 designates a decoded representative picture signal, 106 designates a delay memory, 107 designates a decoded signal, 132 designates motion parameter extracting means, 133 designates a motion parameter, 134 designates motion compensating means, 135 designates a motion compensation decoded signal, 136 designates decoded signal selecting means, and 137 designates a decoded output signal. The embodiment has a configuration in which the motion parameter extracting means 132, the motion compensating means 134, and the decoded signal selecting means 136 are provided in place of the representative picture reference relationship extracting means 112 and the decoded signal output controlling means 114 of the second embodiment.

The operation of the thus configured picture decoding apparatus of the embodiment will be described. The coded input signal 101 is the coded output signal 18 which is encoded by the picture coding apparatus of the first embodiment, and consists of representative pictures which respectively represent scenes of a picture, motion parameters for motion compensation predictive coding which refers the representative pictures, and additional information including reference relationships of the representative pictures.

The motion parameter extracting means 132 extracts the motion parameter 133 which is required for decoding of a motion compensation predictive coded picture, from the coded input signal 101, and outputs the extracted parameter to the motion compensating means 134. On the basis of the motion parameter 133, the motion compensating means 134 conducts motion compensation with reference to the decoded signal 107 sent from the delay memory 106, and outputs the motion compensation decoded signal 135 to the decoded signal selecting means 136. The operations in the decoding of representative pictures are the same as those of the second embodiment, and hence their description is omitted.

Under predetermined conditions, the decoded signal selecting means 136 selects one of the decoded output signal 107 sent from the delay memory 106, and the motion compensation decoded signal 135 sent from the motion compensating means 134, and outputs the selected signal as the decoded output signal 137. For example, the conditions may be set so that, in the case where the motion compensation decoded signal 135 is output from the motion compensating means 134, the motion compensation decoded signal 135 is selected, and, in another case, the decoded output signal 107 of representative pictures is selected.

The coded input signal 101 may be either of a coded input signal of a single layer and that for each layer based on a layered structure as far as the signal is encoded on the basis of the representative picture structure.

As seen from the above description, in the embodiment, a part of a predictive coded picture is decoded and then inserted between representative pictures, whereby a high speed search or high speed reproduction having continuity in addition to rapidness can be realized. Namely, the second and third embodiments have the configuration in which only representative pictures are decoded while placing stress on rapidness of a search or reproduction. Since the time intervals of representative pictures are not constant, however, the smoothness in the time direction is impaired with the result that unnaturalness is produced in motions in reproduction. The present embodiment can improve this point.

In the embodiment, when a predictive coded signal is to be decoded, the representative picture signal to be reference and motion parameters are decoded. In other words, a picture coding apparatus suitable for a high speed search or high speed reproduction which can be conducted while checking the contents can be provided only by adding motion parameters.

In the embodiment, when global motion parameters which can express translation, rotation, zooming, and reduction of the whole of a picture are used as motion parameters, it is possible to realize a high speed search or high speed reproduction of more excellent efficiency.

Figure 5:
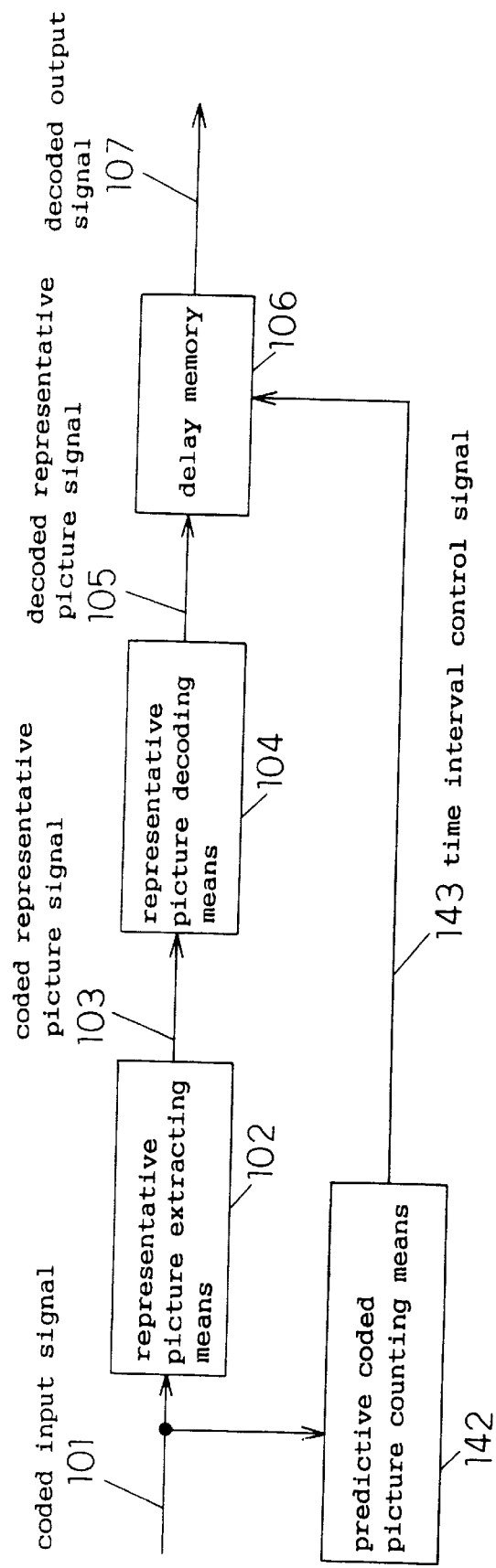
FIG. 5 is a block diagram of a picture decoding apparatus which is a fifth embodiment of the invention.

Referring to FIG. 5, there is shown therein a block diagram of a picture decoding apparatus which is a fifth embodiment of the invention. The reference numeral 101 designates a coded input signal, 142 designates predictive coded picture counting means, 143 designates a time interval control signal, 102 designates representative picture extracting means, 103 designates a coded representative picture signal, 104 designates representative picture decoding means, 105 designates a decoded representative picture signal, 106 designates a delay memory, and 107 designates a decoded output signal. The embodiment has a configuration in which the predictive coded picture counting means 142 is provided in place of the representative picture reference relationship extracting means 112 and the decoded signal output controlling means 114 of the second embodiment.

The operation of the thus configured picture decoding apparatus of the embodiment will be described. The coded input signal 101 is the coded output signal 18 which is encoded by the picture coding apparatus of the first embodiment, and consists of representative pictures which respectively represent scenes of a picture, motion parameters for motion compensation predictive coding which refers the representative pictures, and additional information of reference relationships of the representative pictures.

The second and third embodiments have the configuration in which only representative pictures are decoded while placing stress on rapidness of a search or reproduction. Since the time intervals of representative pictures are not constant, however, the smoothness in the time direction is impaired with the result that unnaturalness is produced in motions in reproduction. To comply with this, in the present embodiment, the time intervals of scenes, i.e., those of representative pictures are considered so that high speed reproduction in which stress is placed on the smoothness in the time direction is realized.

The predictive coded picture counting means 142 extracts predictive coded pictures which have undergone motion compensation coding while referring representative pictures, from the coded input signal 101, counts the number of the extracted pictures, and outputs the time interval control signal 143 to the delay memory 106. In accordance with the control of the output time intervals based on the time interval control signal 143, the delay memory 106 outputs the decoded representative picture signal 105 sent from the representative picture decoding means 104, as the decoded output signal 107. As a result of the control of the output time intervals, the time interval of adjacent representative pictures constituting the decoded output signal 107 is shortened to that which is proportional to the counted number of the predictive coded pictures which exist between representative picture signals included in the coded input signal 101. In summary, the control of the output time interval is set so that the time interval of adjacent representative pictures constituting the decoded output signal 107 is constant.

The operations in the decoding of representative pictures are the same as those of the second embodiment, and hence their description is omitted.

Figure 14:
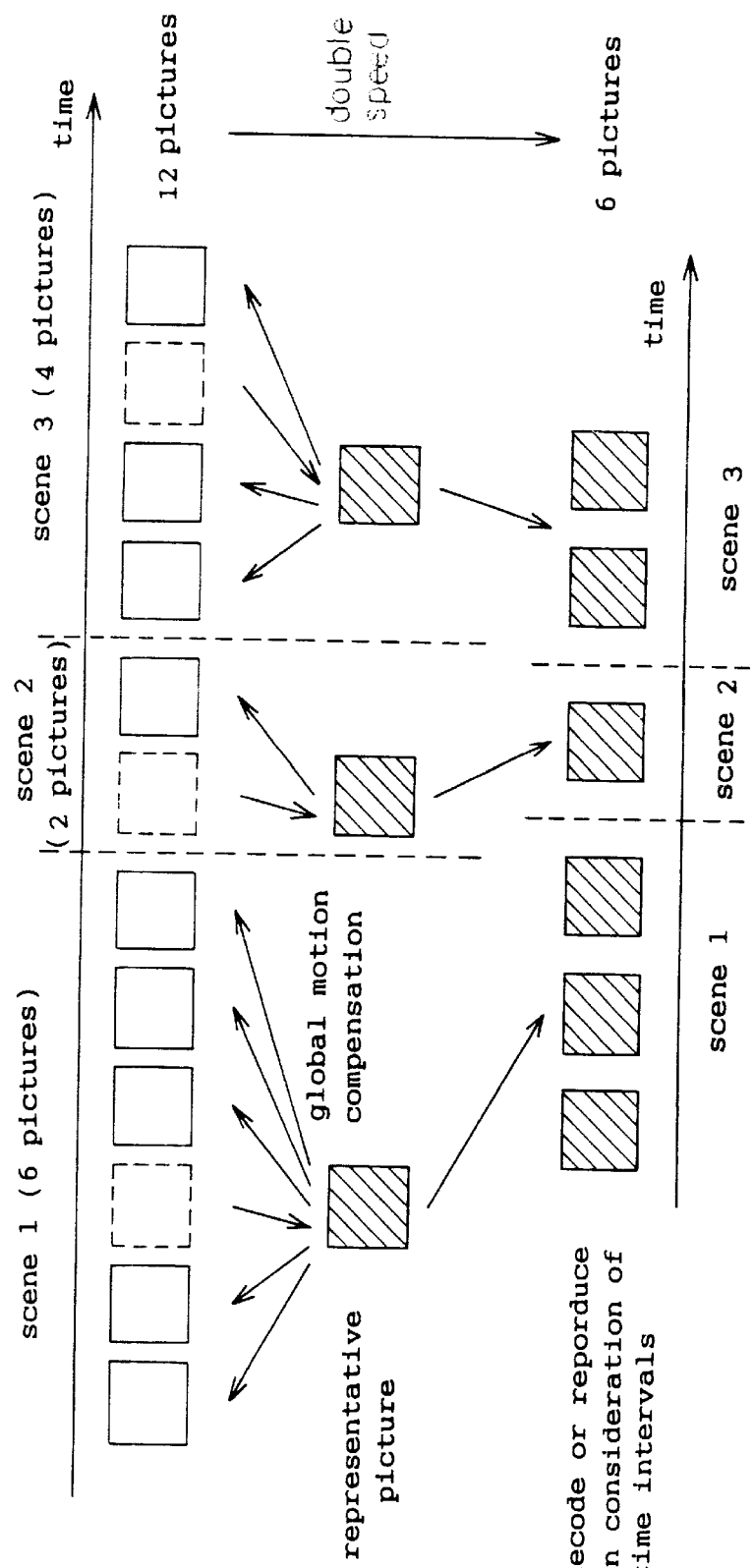
FIG. 14 is a diagram illustrating the operation of the fifth embodiment.

FIG. 14 is a diagram illustrating an example of the operation of the embodiment. The twelve pictures in the upper portion indicate the manner of reproduction in normal decoding. In the picture coding apparatus of the embodiment, representative pictures of each scene conform to the time of each scene, i.e., the number of predictive pictures. As illustrated, scene 1 consists of six pictures so that a representative picture is output three times, scene 2 consists of two pictures so that a representative picture is output one time, and scene 3 consists of four pictures so that a representative picture is output two times. In this way, high speed reproduction in which contents can be grasped in a relatively easy manner can be conducted at a double speed. In the same manner as the second and third embodiments, it is possible to eliminate a mismatch in smoothness in the time direction.

As seen from the above description, according to the embodiment, the number of the predictive coded pictures which exist between representative picture signals included in the coded input signal 101 is counted, and the time interval of representative pictures included in the decoded output signal 107 can be shortened to that which is proportional to the number of the predictive coded pictures. This allows high speed reproduction to be realized while maintaining the original smoothness in the time direction of the picture.

Figure 6:
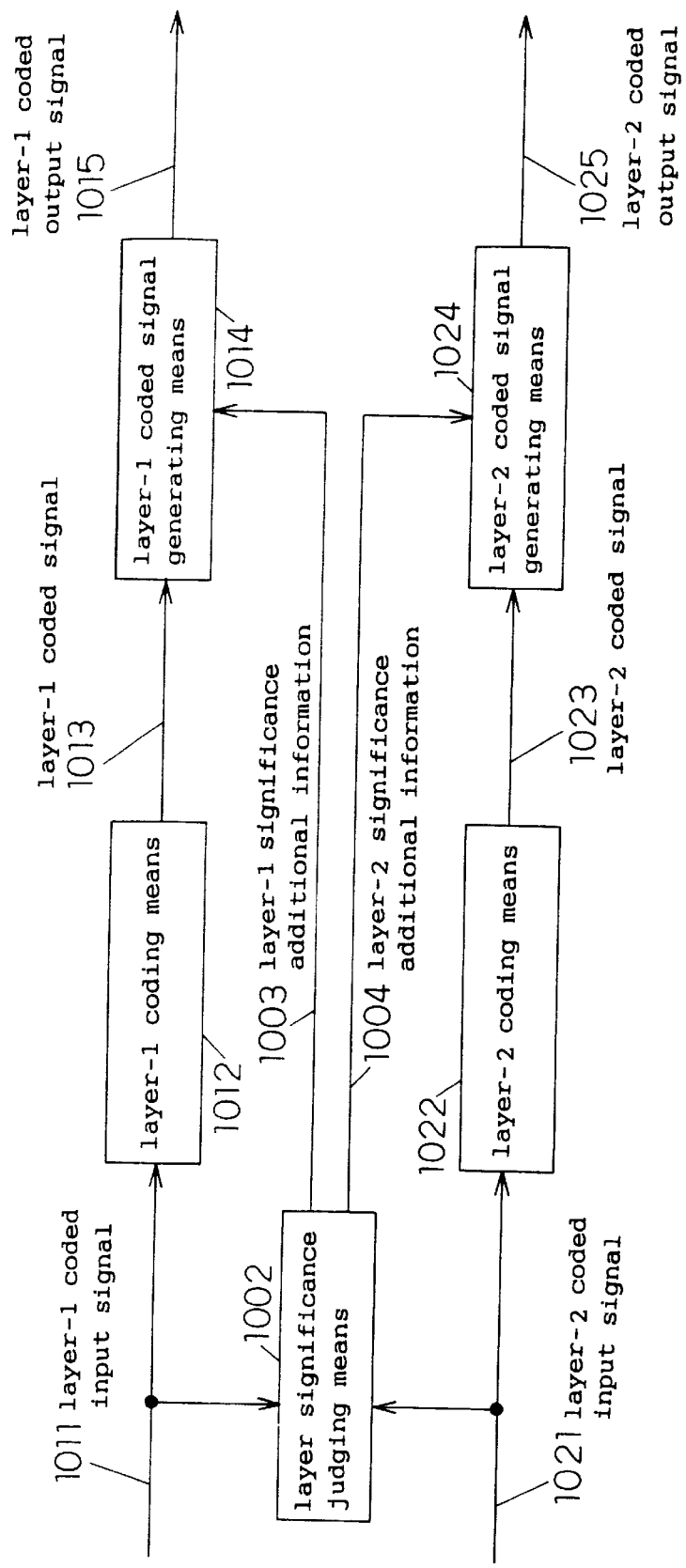
FIG. 6 is a block diagram of a picture coding apparatus which is a sixth embodiment of the invention.

Referring to FIG. 6, there is shown therein a block diagram of a picture coding apparatus which is a sixth embodiment of the invention. The reference numeral 1011 designates a layer-1 input signal, 1012 designates layer-1 coding means, 1013 designates a layer-1 coded signal, 1014 designates layer-1 coded signal generating means, 1015 designates a layer-1 coded output signal, 1021 designates a layer-2 input signal, 1022 designates layer-2 coding means, 1023 designates a layer-2 coded signal, 1024 designates layer-2 coded signal generating means, 1025 designates a layer-2 coded output signal, 1002 designates layer significance determining means, 1003 designates layer-1 significance additional information, and 1004 designates layer-2 significance additional information.

The operation of the thus configured picture coding apparatus of the embodiment will be described. The embodiment will be described with the assumption that two layers are used. However, the number of layers in the picture coding apparatus of the invention is not restricted to two. The layer-1 input signal 1011 and the layer-2 input signal 1021 are signals obtained as a result of the separation of a picture signal into two layers.

The layer significance determining means 1002 determines significance relating to the contents of the layers of the layer-1 input signal 1011 and the layer-2 input signal 1021, and outputs the layer-1 significance additional information 1003 to the layer-1 coded signal generating means 1014, and the layer-2 significance additional information 1004 to the layer-2 coded signal generating means 1024.

As examples of conditions of determining significance relating to the contents of the layers, following techniques may be employed.

1. Significance is determined with using relationships of layers as an index. When stress is placed on a character or the like, for example, significance of the foreground layer, particularly of the layer of the character is increased. When stress is placed on scenery, significance of the background layer is increased.

2. The area occupied by an object region in each layer is calculated, and significance is determined with using the area of a layer as an index. When the area is large, for example, significance is increased, and, when the area is small, significance is decreased.

3. The degree of motion or deformation of the object is calculated for each layer, and significance is determined with using motion or deformation of a region of a layer as an index. When motion or deformation is large in degree, significance is increased, and, when motion or deformation is small in degree, significance is reduced.

The layer-1 input signal 1011 is encoded by the layer-1 coding means 1012, and then output as the layer-1 coded signal 1013. The layer-2 input signal 1021 is encoded by the layer-2 coding means 1022, and then output as the layer-2 coded signal 1023. In the coding process, the technique of MPEG may be employed in which orthogonal transformation of the discrete cosine transform (DCT) is performed and then transform coefficients are subjected to entropy coding. However, the picture coding apparatus of the invention is not restricted to this method.

On the basis of the layer-1 significance additional information 1003, the layer-1 coded signal generating means 1014 generates the layer-1 coded output signal 1015 from the layer-1 coded signal 1013, and outputs the generated signal. On the basis of the layer-2 significance additional information 1004, the layer-2 coded signal generating means 1024 generates the layer-2 coded output signal 1025 from the layer-2 coded signal 1023, and outputs the generated signal.

As described above, a picture is first separated into layers such as a background, and a foreground, and each of the separated layers is encoded together with additional information indicative of significance of the layer. According to the embodiment, in decoding of the coded signals, significance of the additional information is referred. Then, a layer of higher significance is subjected to decoding which is detailed in contents, and that of lower significance is subjected to simplified decoding or refrained from being subjected to decoding, thereby realizing a high speed search or high speed reproduction in which waste is eliminated and which is excellent in efficiency.

Figure 7:
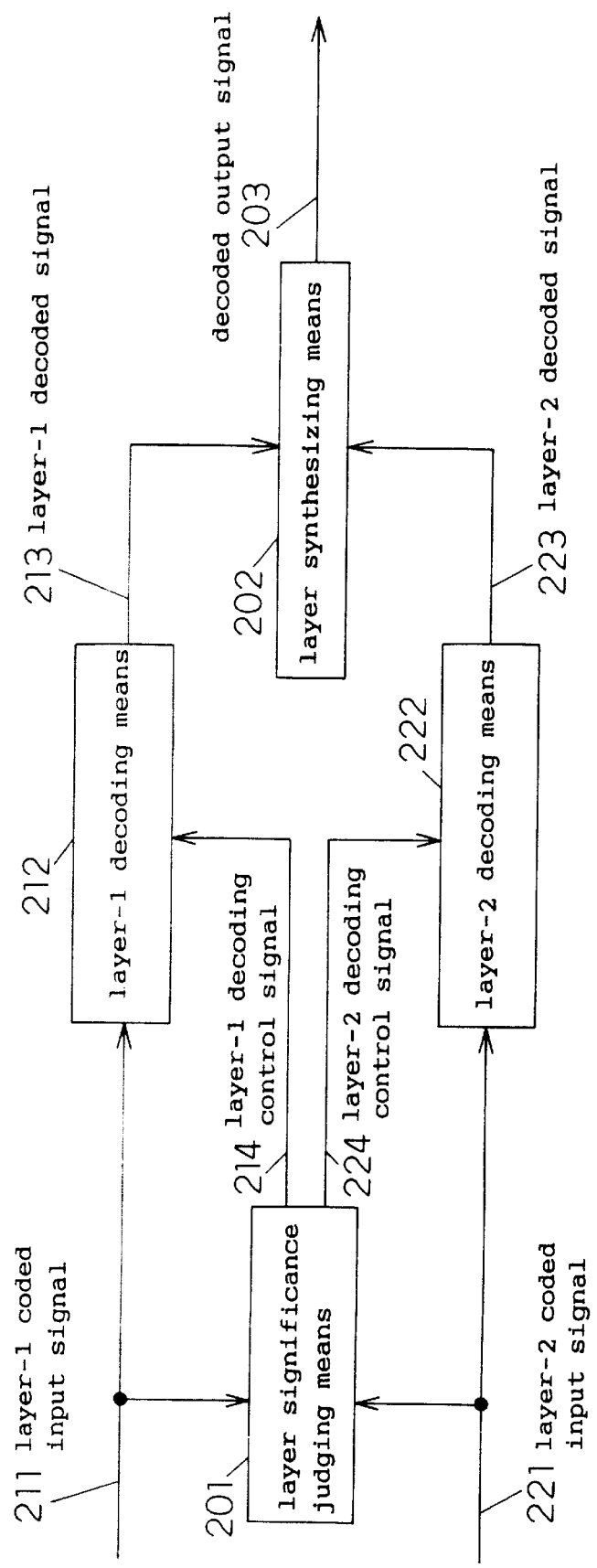
FIG. 7 is a block diagram of a picture decoding apparatus which is a seventh embodiment of the invention.

Referring to FIG. 7, there is shown therein a block diagram of a picture decoding apparatus which is a seventh embodiment of the invention. The reference numeral 201 designates layer significance judging means, 211 designates a layer-1 coded input signal, 212 designates layer-1 decoding means, 213 designates a layer-1 decoded signal, 214 designates a layer-1 decoding control signal, 221 designates a layer-2 coded input signal, 222 designates layer-2 decoding means, 223 designates a layer-2 decoded signal, 224 designates a layer-2 decoding control signal, 202 designates layer synthesizing means, and 203 designates a decoded output signal.

The operation of the thus configured picture decoding apparatus of the embodiment will be described. The embodiment will be described with the assumption that two layers are used. However, the number of layers in the picture coding apparatus of the invention is not restricted to two. The layer-1 coded input signal 211 and the layer-2 coded input signal 221 are the layer-1 input signal 1011 and the layer-2 input signal 1021 which are encoded by the picture coding apparatus of the sixth embodiment, respectively. The signals have been encoded with being added with significance of the respective layer.

The layer significance judging means 201 compares significance of the layer-1 coded input signal 211 with that of layer-2 coded input signal 221, and, on the basis of predetermined conditions, outputs the layer-1 decoding control signal 214 to the layer-1 decoding means 212, and the layer-2 decoding control signal 224 to the layer-2 decoding means 222. The method of controlling the decoding in layer-1 is different from that in layer-2.

On the basis of the layer-1 decoding control signal 214, the layer-1 decoding means 212 decodes the layer-1 coded input signal 211, and outputs the layer-1 decoded signal 213 to the layer synthesizing means 202. On the basis of the layer-1 decoding control signal 224, the layer-2 decoding means 222 decodes the layer-2 coded input signal 221, and outputs the layer-2 decoded signal 223 to the layer synthesizing means 202. As the decoding method, a method similar to the methods employed in the second to fifth embodiments may be employed.

When the decoding method of the fourth embodiment is employed, for example, a picture decoding apparatus that can reproduce smooth motion from which picture contents can easily be grasped is realized by increasing the frequency of using motion compensation decoding in a layer of higher significance. With respect to a layer of lower significance, processing is restricted only to updation of a representative picture and stress is placed on rapidness, whereby a picture decoding apparatus that can simplify processing is realized.

The layer synthesizing means 202 synthesizes the layer-1 decoded signal 213 with the layer-2 decoded signal 223, and outputs the synthesized signal as the decoded output signal 203.

As seen from the above description, according to the embodiment, significance of layers is compared on the basis of a coded signal of each layer which is an input signal, a layer of higher significance is subjected to detailed decoding, and that of lower significance is subjected to simplified decoding or refrained from being subjected to decoding, thereby realizing a high speed search or reproduction of excellent efficiency in which waste can be eliminated without impairing significance of contents of a picture.

Figure 8:
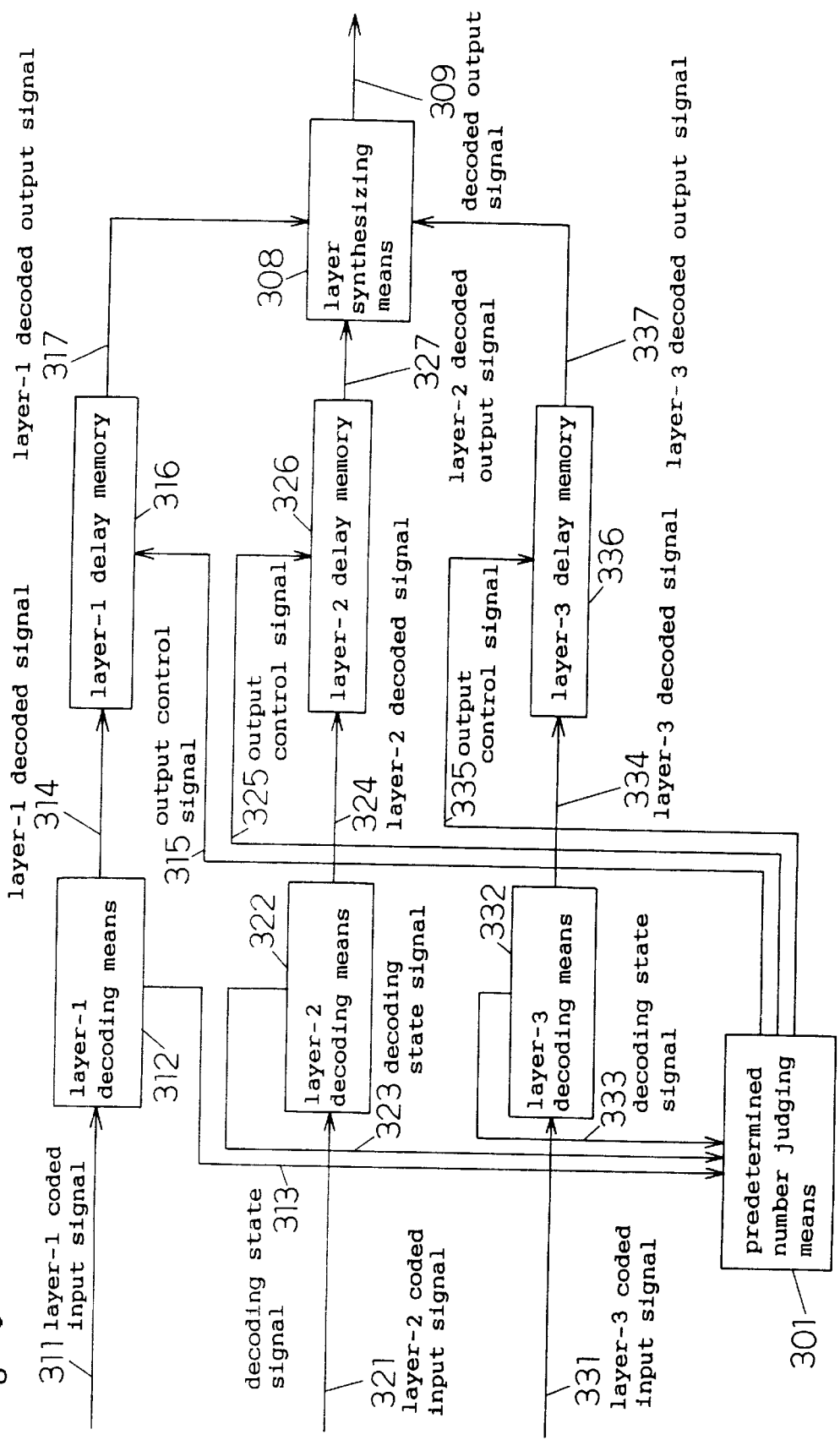
FIG. 8 is a block diagram of a picture decoding apparatus which is an eighth embodiment of the invention.

Referring to FIG. 8, there is shown therein a block diagram of a picture decoding apparatus which is an eighth embodiment of the invention. The reference numeral 311 designates a layer-1 coded input signal, 312 designates layer-1 decoding means, 313 designates a decoding state signal, 301 designates predetermined-number judging means, 314 designates a layer-1 decoded signal, 315 designates an output control signal, 316 designates a layer-1 delay memory, 317 designates a layer-1 decoded output signal, 321 designates a layer-2 coded signal, 322 designates layer-2 decoding means, 323 designates a decoding state signal, 324 designates a layer-2 decoded signal, 325 designates an output control signal, 326 designates a layer-2 delay memory, 327 designates a layer-2 decoded output signal, 331 designates a layer-3 coded signal, 332 designates layer-3 decoding means, 333 designates a decoding state signal, 334 designates a layer-3 decoded signal, 335 designates an output control signal, 336 designates a layer-3 delay memory, 337 designates a layer-3 decoded output signal, 308 designates layer synthesizing means, and 309 designates a decoded output signal.

The operation of the thus configured picture decoding apparatus of the embodiment will be described. The embodiment will be described with the assumption that three layers are used. However, the number of layers in the picture coding apparatus of the invention is not restricted to three.

The layer-1 coded input signal 311, the layer-2 coded input signal 321, and the layer-3 coded input signal 331 are coded signals obtained by separating a picture into layers, and encoding each of signals of the separated layers. In the coding process, the technique of MPEG may be employed in which orthogonal transformation of the discrete cosine transform (DCT) is performed and then transform coefficients are subjected to entropy coding. The picture coding apparatus of the invention is not restricted to this method. The layer-1 coded input signal 311, the layer-2 coded input signal 321, and the layer-3 coded input signal 331 are coded signals each of which has a representative picture structure in the time direction.

The layer-1 decoding means 312 decodes the layer-1 coded input signal 311, outputs the decoded signal to the layer-1 delay memory 316 as the layer-1 decoded signal 314, and outputs the decoding state signal 313 to the predetermined-number judging means 301. On the basis of the output control signal 315 sent from the predetermined-number judging means 301, the layer-1 delay memory 316 outputs the layer-1 decoded signal 314 to the layer synthesizing means 308 as the layer-1 decoded output signal 317.

The layer-2 decoding means 322 decodes the layer-2 coded input signal 321 and outputs the decoded signal to the layer-2 delay memory 326 as the layer-2 decoded signal 324, and outputs the decoding state signal 323 to the predetermined-number judging means 301. On the basis of the output control signal 325 sent from the predetermined-number judging means 301, the layer-2 delay memory 326 outputs the layer-2 decoded signal 324 to the layer synthesizing means 308 as the layer-2 decoded output signal 327.

The layer-3 decoding means 332 decodes the layer-3 coded input signal 321 and outputs the decoded signal to the layer-3 delay memory 336 as the layer-3 decoded signal 334, and outputs the decoding state signal 333 to the predetermined number judging means 301. On the basis of the output control signal 335 sent from the predetermined number judging means 301, the layer-3 delay memory 336 outputs the layer-3 decoded signal 334 to the layer synthesizing means 308 as the layer-3 decoded output signal 337.

In coded signals having a representative picture structure, coding positions of representative picture in time series in layers are different from each other depending on the layers. In a high speed search or high speed reproduction, therefore, the output updation position of a picture must be considered for each layer in a coding process. In a high speed search or high speed reproduction, furthermore, it is not required to update all layers, and the updation may be simplified or omitted as far as contents can be grasped. When the apparatus is configured so that, only when layers the number of which is larger than a predetermined one are subjected to decoding, the output is updated, therefore, it is possible to execute a high speed search or high speed reproduction in which waste is eliminated.

On the basis of the decoding state signals 313, 323, and 333 respectively sent from the layer-1 decoding means 312, the layer-2 decoding means 322, and the layer-3 decoding means 332, when layers the number of which is larger than the predetermined one are newly decoded, the predetermined number judging means 301 outputs the output control signals 315, 325, and 335 to the delay memories 316, 326, and 336.

As the decoding method conducted by the layer-1 decoding means 312, the layer-2 decoding means 322, and the layer-3 decoding means 332, the methods employed in the second to fifth embodiments may be employed.

Figure 15:
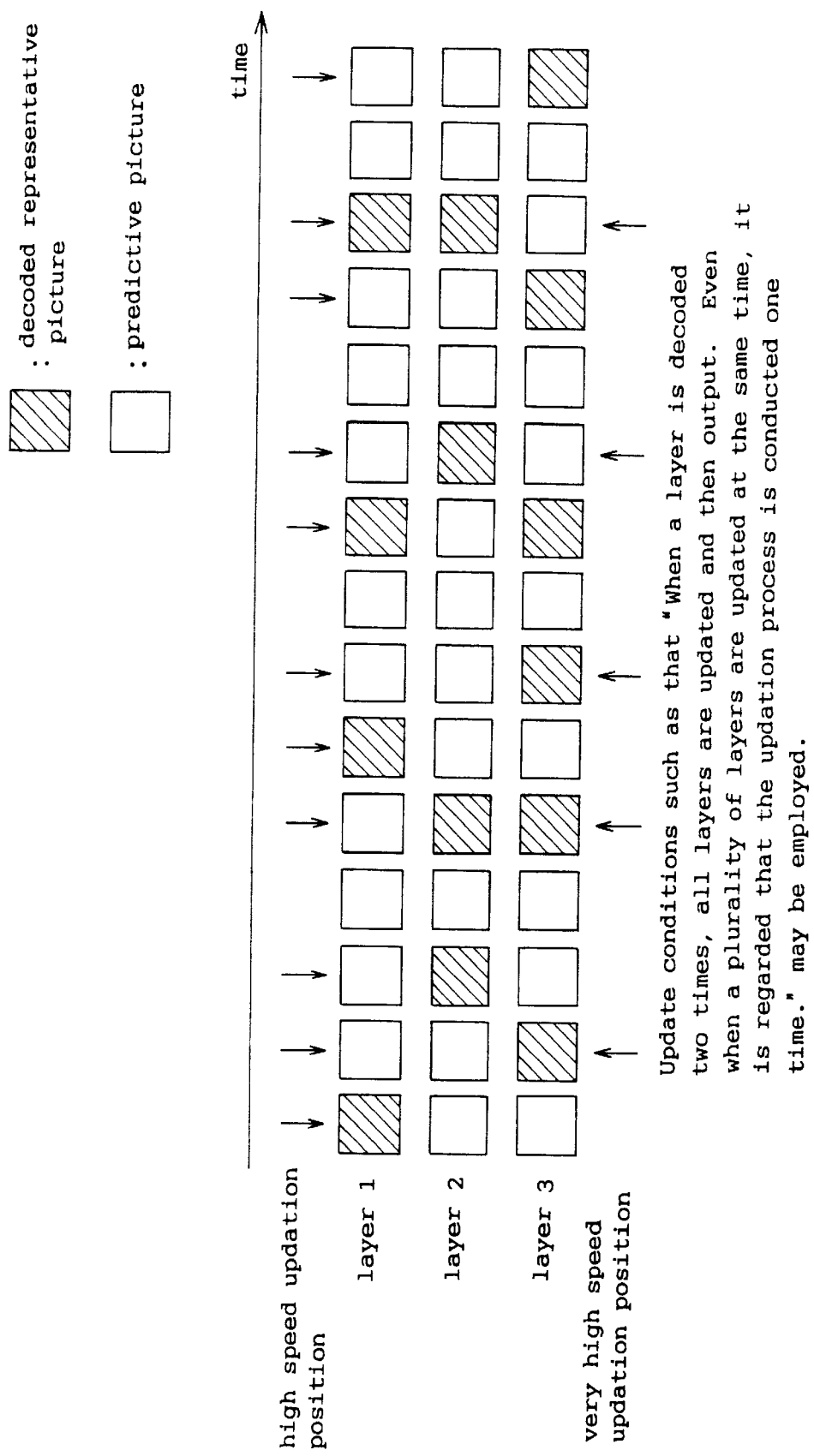
FIG. 15 is a diagram illustrating the output updation of the eighth embodiment.

FIG. 15 is a diagram illustrating an example of output updation between layers. Each of the downward arrows which are at the high speed reproduction update positions indicates an output update position of a high speed search, and each of the upward arrows which are at the very high speed reproduction update positions indicates an output update position according to a very high speed search. In this example, the update conditions are "When a layer is decoded two times, all layers are updated and then output. Even when a plurality of layers are updated at the same time, it is regarded that the updation process is conducted one time." As seen also from the figure, the updation in the high speed search is conducted eleven times, but that in the very high speed search is conducted five times so that the processing is simplified. Since the number of outputting operations is reduced, it is possible to realize a high speed search or high speed reproduction of a higher speed.

As seen from the above description, according to the embodiment, when decoding of a representative picture signal is newly conducted in layers the number of which is greater than a predetermined one, the output of the representative picture is updated in all layers. Even when coding positions of representative pictures in time series in layers are different from each other, therefore, it is possible to coincide output positions with each other.

When the number of layers is less than the predetermined number, the output of a representative picture is not updated. Consequently, processing is simplified so that a high speed search or high speed reproduction in which waste is eliminated is realized.

Figure 9:
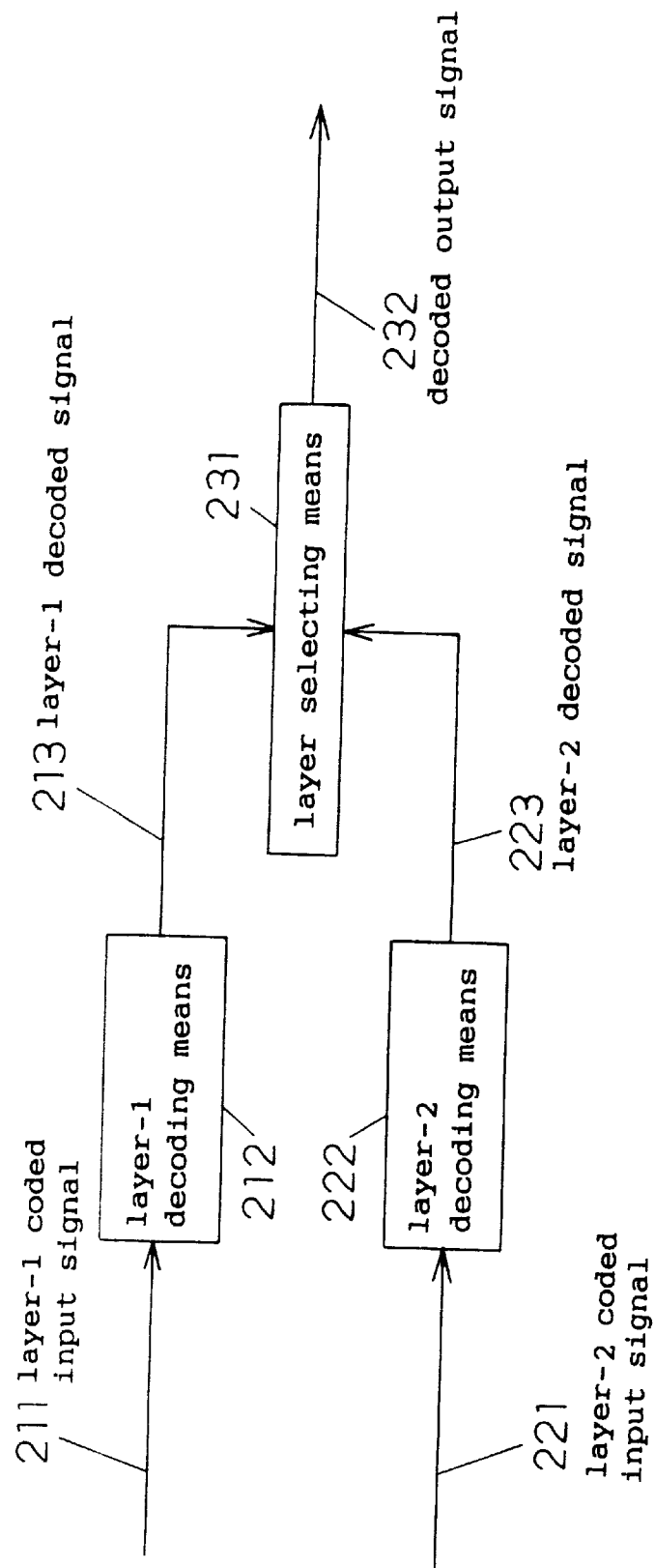
FIG. 9 is a block diagram of a picture decoding apparatus which is a ninth embodiment of the invention.
Figure 10:
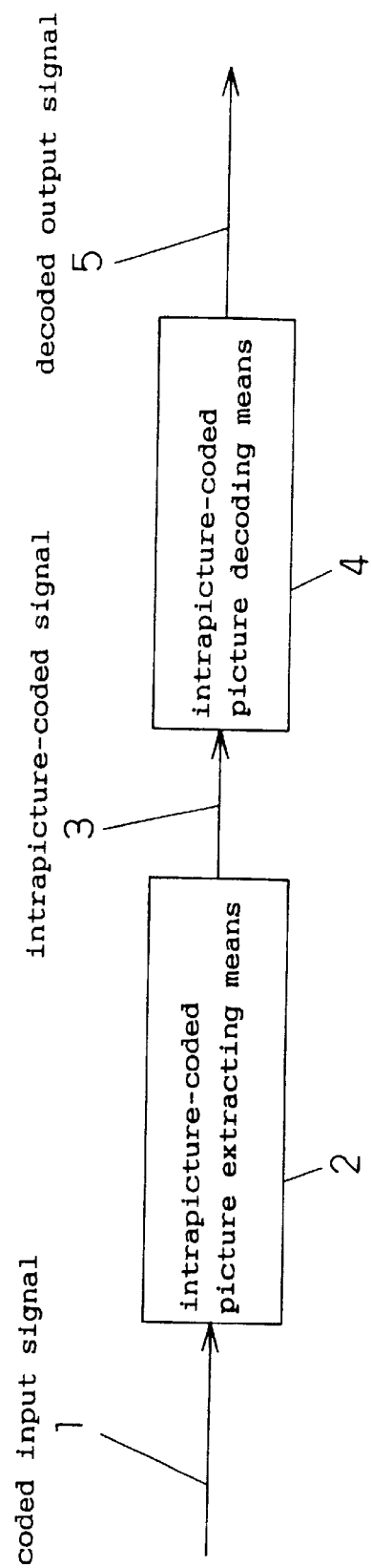
FIG. 10 is a block diagram of a conventional high speed reproduction apparatus in which an intrapicture-coded picture is extracted and then decoded.

Referring to FIG. 9, there is shown therein a block diagram of a picture decoding apparatus which is a ninth embodiment of the invention. The reference numeral 211 designates a layer-1 coded input signal, 212 designates layer-1 decoding means, 213 designates a layer-1 decoded signal, 221 designates a layer-2 coded input signal, 222 designates layer-2 decoding means, 223 designates a layer-2 decoded signal, 231 designates layer selecting means, and 232 designates a decoded output signal.

The operation of the thus configured picture decoding apparatus of the embodiment will be described. The embodiment will be described with the assumption that two layers are used. However, the number of layers in the picture coding apparatus of the invention is not restricted to two.

The layer-1 coded input signal 211 and the layer-2 coded input signal 221 are signals which are obtained by separating a picture into layers (for example, into a foreground and a background), and encoding each of signals of the separated layers. In the coding process, the technique of MPEG may be employed in which orthogonal transformation of the discrete cosine transform (DCT) is performed and then transform coefficients are subjected to entropy coding. However, the picture coding apparatus of the invention is not restricted to this method. The layer-1 coded input signal 211 and the layer-2 coded input signal 221 are coded signals each of which has a representative picture structure in the time direction.

The layer-1 decoding means 212 decodes the layer-1 coded input signal 211, and outputs the decoded signal to the layer selecting means 231 as the layer-1 decoded signal. The layer-2 decoding means 222 decodes the layer-2 coded input signal 221, and outputs the decoded signal to the layer selecting means 231 as the layer-2 decoded signal.

Under predetermined conditions, the layer selecting means 231 selects one of the layer-1 decoded signal 213 and the layer-2 decoded signal 223, and outputs the selected signal as the decoded output signal 232.

The layer-1 decoding means 212 and the layer-2 decoding means 222 are decoding means which use different decoding methods. In each of the layer-1 decoding means 212 and the layer-2 decoding means 222, a decoding method in conformance with the methods employed in the second to fifth embodiments may be employed. For example, it is assumed that the decoding method of the second embodiment in which only a representative picture is decoded is employed in the layer-1 decoding means 212, and that of the fourth embodiment in which a representative picture and a part of motion parameters are used is employed in the layer-2 decoding means 222. In this case, when the layer selecting means 231 is caused to select the layer-1 decoded signal 213 sent from the layer-1 decoding means 212, the process can rapidly be jumped to an approximate picture search position. When the layer selecting means 231 is caused to select the layer-1 decoded signal 223 sent from the layer-2 decoding means 222, high speed reproduction can be conducted while checking the contents. According to the picture decoding apparatus, since reproduction is conducted while switching layers as described above, decoding of excellent efficiency which complies with the object of the high speed search or high speed reproduction can be realized.

As seen from the above description, according to the embodiment, decoding conforming to the object of the high speed or the high speed reproduction can be executed by selecting layers.

Referring now to FIG. 16(a), there is shown therein a block diagram relating to a picture coding apparatus which is a tenth embodiment of the invention, and FIG. 16(b) is a diagram showing binarization of binarizing means. Binarizing means 2002 which receives a multivalue signal 2001 and outputs a binary signal 2003 is connected to binary coding means 2004 which receives the binary signal 2003 and outputs a coded signal 2005.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. (Transparency of 0% indicates a state where an opaque article exists and the background cannot be seen, and transparency of 100% indicates a state where there is no article and the background can be seen as it is. An intermediate level value appears in the case where a translucent article made of glass or the like exists, or in a boundary between articles.) When intermediate level values of transparency of the multivalue signal 2001 are negligible, the multivalue signal 2001 is input to the binarizing means 2002 and then compared with the threshold of the binarizing means 2002 to be binarized. The binarizing means 2002 outputs the binary signal 2003. Specifically, the multivalue signal 2001 is binarized in such a manner that, when transparency of the multivalue signal is 100%, the value is set to be 0, and, when transparency is smaller than 100%, the value is set to be 1. When the binary signal 2003 is input to the binary coding means 2004, the signal is subjected to binary coding in accordance with MR coding or the like. The binary coding means outputs a coded signal 2005.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, when transparency has a small intermediate level value, it is regarded that the intermediate level value is negligible, and its coding is omitted.

The binary coding in the binary coding means 2004 is conducted in accordance with MR coding. The manner of the binary coding is not restricted to this. The binary coding may be conducted in accordance with chain coding or block pattern coding. In short, any binary coding apparatus which can efficiently encode a binary may be used.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 17:
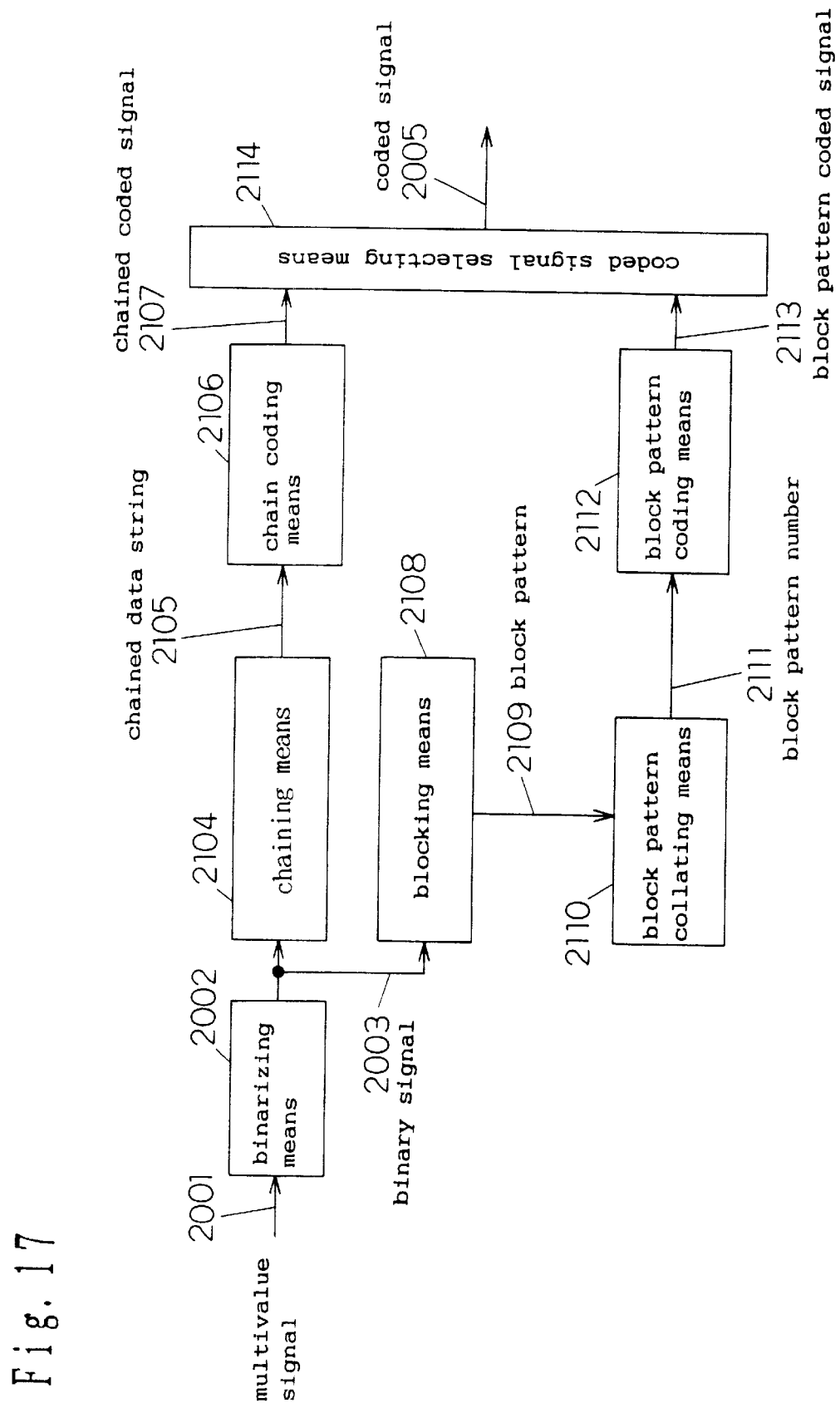
FIG. 17 is a block diagram of a picture coding apparatus which is an eleventh embodiment of the invention.

Referring to FIG. 17, there is shown therein a block diagram of a picture coding apparatus which is an eleventh embodiment of the invention. Binarizing means 2002 which receives a multivalue signal 2001 and outputs a binary signal 2003 is connected to chaining means 2104 which receives the binary signal 2003 and outputs a chained data string 2105, and also to blocking means 2108 which receives the binary signal 2003 and outputs a block pattern 2109. The chaining means 2104 is connected to chain coding means 2106 which receives the chained data string 2105 and outputs a chain coded signal 2107. The blocking means 2108 is connected to block pattern collating means 2110 which receives the block pattern 2109 and outputs a block pattern number 2111. The block pattern collating means 2110 is connected to block pattern coding means 2112 which receives the block pattern number 2111 and outputs a block pattern coded signal 2113. The chain coding means 2106 and the block pattern coding means 2112 are connected to coded signal selecting means 2114 which receives the chain coded signal 2107 and the block pattern coded signal 2113 and outputs a coded signal 2005.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When intermediate level values of transparency of the multivalue signal 2001 are negligible, the multivalue signal 2001 is input to the binarizing means 2002 and then compared with the threshold of the binarizing means 2002 to be binarized. The binarizing means 2002 outputs the binary signal 2003. Specifically, the multivalue signal 2001 is binarized in such a manner that, when transparency of the multivalue signal is 100%, the value is set to be 0, and, when transparency is smaller than 100%, the value is set to be 1. When the binary signal 2003 is input to the chaining means 2104, the signal is classified into three cases: the case where a boundary pixel is on the right side of the boundary, that where a boundary pixel is on the left side of the boundary, and that where a boundary pixel is in front of the boundary, and the chained data string 2105 configured into one data string is output. When the chained data 2105 is input to the chain coding means 2106, the data is binary-coded in accordance with entropy coding, and the chain coded signal 2107 is output. When the binary signal 2003 is input to the blocking means 2108, the signal is divided into blocks and the blocking means then outputs the block pattern 2109. When the block pattern 2109 is input to the block pattern collating means 2110, the block pattern is difference-compared in the unit of a block with a predetermined block pattern, and the block pattern number 2111 at which the smallest difference is obtained is output. When the block pattern number 2111 is input to the block pattern coding means 2112, binary coding is conducted in accordance with entropy coding, and the block pattern coded signal 2113 is output. When the chain coded signal 2107 and the block pattern coded signal 2113 are input to the coded signal selecting means 2114, the coded signal which is smaller in code amount is selected, and the coded signal 2005 is output.

As seen from the above description, according to the embodiment, a multivalue signal coding apparatus in which transparency of pixel values obtained from a picture signal is used as a multivalue signal is provided. In the first coding wherein coding is conducted depending on whether transparency is 100% or has another value, among coded signals which are encoded by the two kinds of binary coding means arranged in parallel, a coded signal which is smaller in code amount is output, whereby the coding efficiency can be improved. In the second coding corresponding to an intermediate level value of transparency, when transparency has a small intermediate level value, it is regarded that the intermediate level value is negligible, and its coding can be omitted.

As the binary coding means, chain coding and block pattern coding are used. The means is not restricted to them, and may be realized by MH coding and MMR coding. In short, any binary coding apparatus may be used as far as it can efficiently encode a binary.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 18:
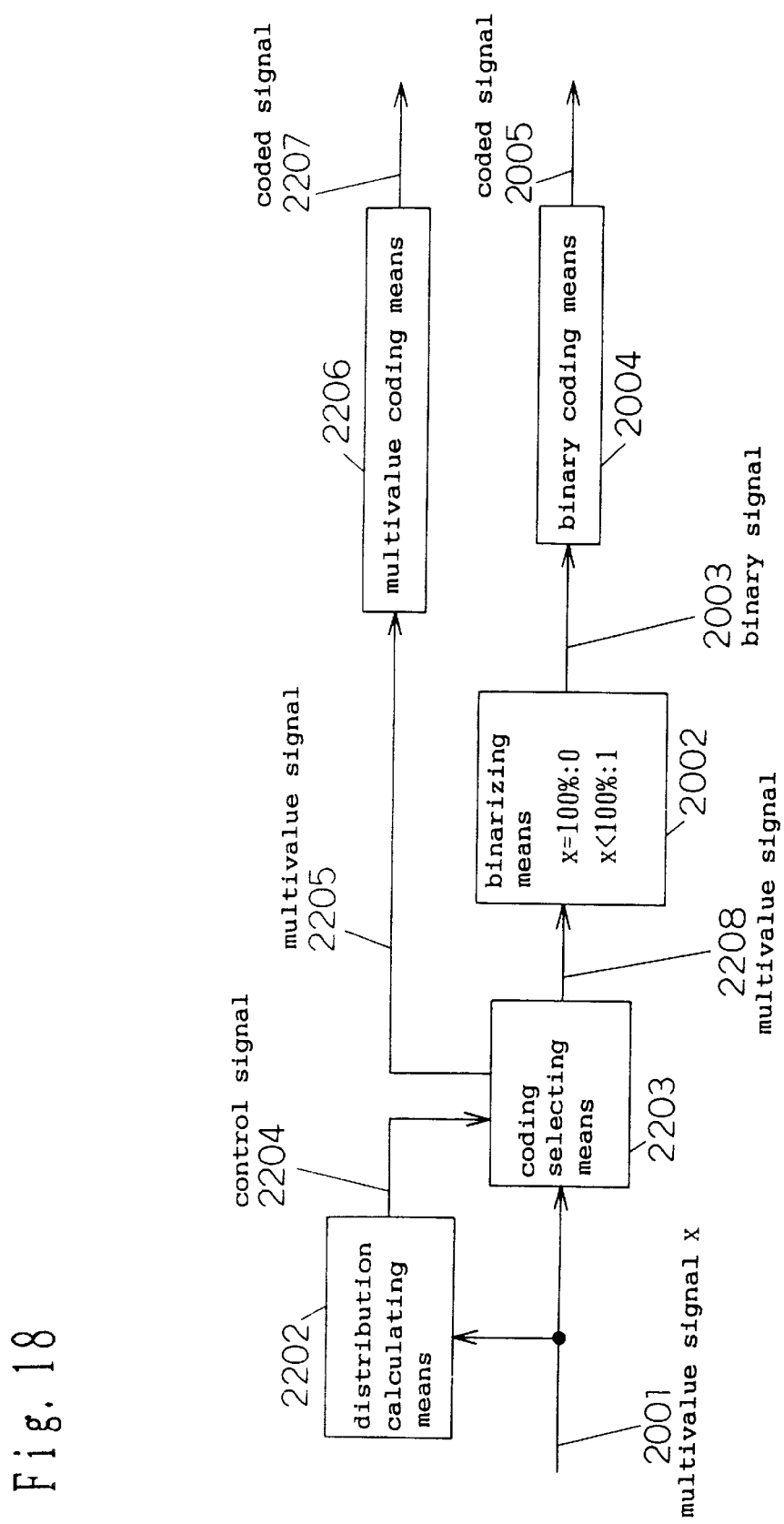
FIG. 18 is a block diagram of a picture coding apparatus which is a twelfth embodiment of the invention.

Referring to FIG. 18, there is shown therein a block diagram of a picture coding apparatus which is a twelfth embodiment of the invention. Frequency distribution calculating means 2202 which receives a multivalue signal 2001 and outputs a control signal 2204 is connected to coding selecting means 2203 which receives the multivalue signal 2001 and outputs multivalue signals 2205 and 2208. The coding selecting means 2203 is connected to multivalue coding means 2206 which receives the multivalue signal 2205 and outputs a coded signal 2207, and also to binarizing means 2002 which receives the multivalue signal 2208 and outputs a binary signal 2003. The binarizing means 2002 is connected to binary coding means 2004 which receives the binary signal 2003 and outputs a coded signal 2005.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the frequency distribution calculating means 2202, the frequency distribution of transparency is calculated from the multivalue signal 2001 to obtain the distribution ratio of intermediate level values of transparency. The distribution ratio of intermediate level values of transparency is compared with a predetermined threshold, and the control signal 2204 is output depending on the comparison result. When the control signal 2204 is input to the coding selecting means 2203, the output destination of the multivalue signal 2001 which is separately input is switched in accordance with the control signal 2204. Specifically, when the distribution ratio of intermediate level values of transparency is larger than the threshold, the multivalue signal 2001 is output to the multivalue signal 2205, and, when the distribution ratio of intermediate level values of transparency is smaller than the threshold, the multivalue signal 2001 is output to the multivalue signal 2208. When the multivalue signal 2205 is input to the multivalue coding means 2206, the signal is multivalue-coded by a coding process in which orthogonal transformation is combined with entropy coding, and the multivalue coding means 2206 outputs the coded signal 2207. When the multivalue signal 2208 is input to the binarizing means 2002, the signal is binarized in accordance with its threshold, and the binarizing means 2002 outputs the binary signal 2003. Specifically, the multivalue signal 2208 is binarized in such a manner that, when transparency of the multivalue signal is 100%, the value is set to be 0, and, when transparency is smaller than 100%, the value is set to be 1. When the binary signal 2003 is input to the binary coding means 2004, the signal is subjected to binary coding in accordance with MR coding or the like. The binary coding means 2004 outputs the coded signal 2005.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, when it is judged from the distribution ratio of intermediate level values of transparency that coding of intermediate level values is required, coding of intermediate level values is conducted by a predetermined multivalue coding apparatus.

The coding apparatus in the multivalue coding means 2206 conducts coding in which orthogonal transformation is combined with entropy coding. The way of coding is not restricted to this. Alternatively, coding may be conducted in accordance with Wavelet transform coding. In short, any multivalue coding apparatus may be used as far as it can efficiently encode a multivalue.

The coding in the binary coding means 2004 is conducted in accordance with MR coding. The manner of the coding is not restricted to this. The coding may be conducted in accordance with chain coding or block pattern coding. In short, any binary coding apparatus which can efficiently encode a binary may be used.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 19A:
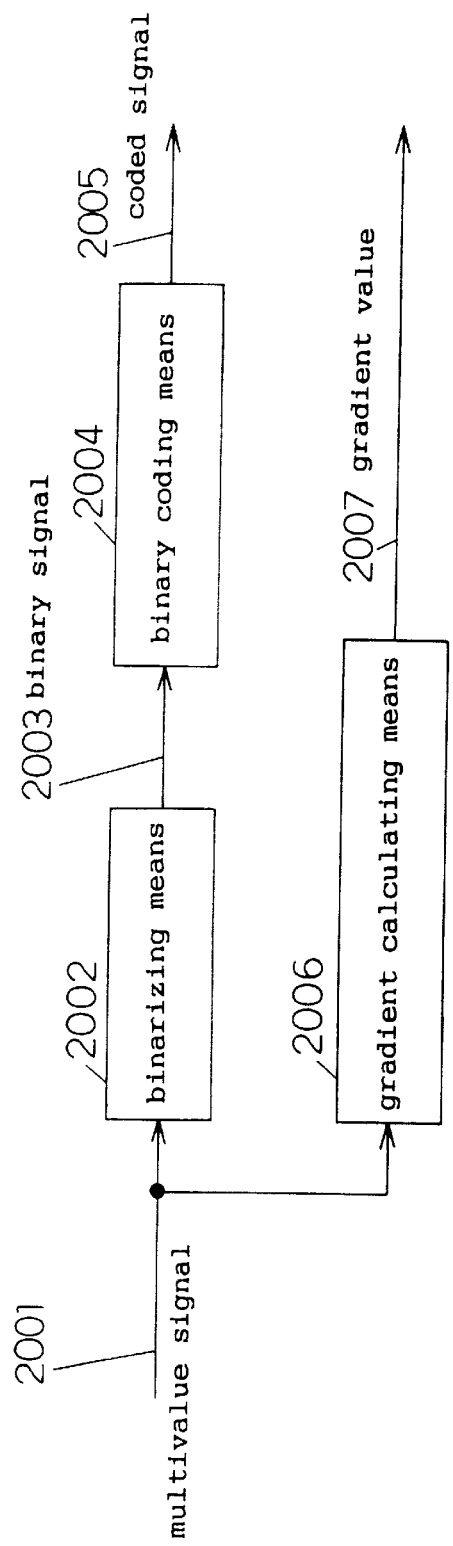
FIG. 19(a) is a block diagram of a picture coding apparatus which is a thirteenth embodiment of the invention.
Figure 19B:
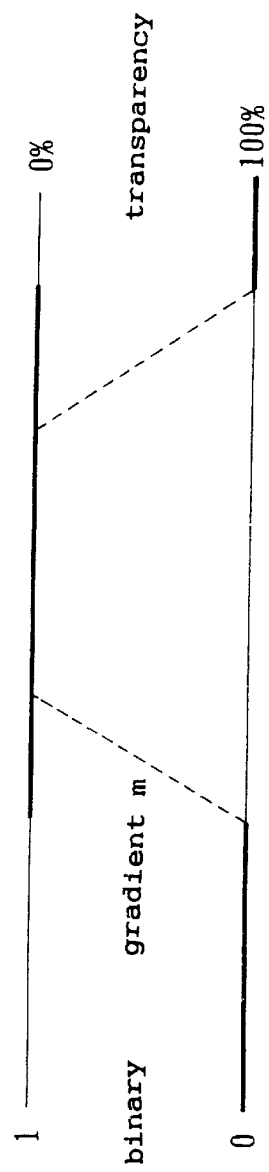
FIG. 19(b) is a diagram showing an example of a gradient in gradient calculating means.

Referring to FIG. 19(*a*), there is shown therein a block diagram of a picture coding apparatus which is a thirteenth embodiment of the invention, and FIG. 19(*b*) is a diagram showing an example of a gradient in gradient calculating means. Binarizing means 2002 which receives a multivalue signal 2001 and outputs a binary signal 2003 is connected to binary coding means 2004 which receives the binary signal 2003 and outputs a coded signal 2005. Gradient calculating means 2006 which receives the multivalue signal 2001 and outputs a gradient value 2007 is connected in parallel with the binarizing means.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the binarizing means 2002, the multivalue signal 2001 is compared with the threshold value of the binarizing means 2002 to be binarized, and the binarizing means 2002 outputs the binary signal 2003. Specifically, the multivalue signal 2001 is binarized in such a manner that, when transparency of the multivalue signal is 100%, the value is set to be 0, and, when transparency is smaller than 100%, the value is set to be 1. When the binary signal 2003 is input to the binary coding means 2004, the signal is encoded in accordance with MR coding, and the coded signal 2005 is output. When the multivalue signal 2001 is input to the gradient calculating means 2006, the gradient of the intermediate value portion which is between the maximum value and the zero value is calculated from transparency of pixel values obtained from the multivalue signal 2001, and the gradient value 2007 which is a typical value of the gradient is output.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, coding is conducted by approximating coding of intermediate level values of transparency.

In the second coding, when intermediate level values in the vicinity of a boundary of an article have a larger ratio of distribution of a transparency gradient of 0% to 100%, intermediate level values may be approximated by a constant gradient, thereby reducing the code amount the intermediate level values.

The threshold of the binarizing means 2002 is set to be 100% of transparency of pixel values. Alternatively, the threshold may be set to be a predetermined value which is not 100%. In the alternative, the gradient calculating means 2006 calculates the gradient of the threshold, and the gradient value 2007 which is a typical value of the gradient is output.

The coding in the binary coding means 2004 is conducted in accordance with MR coding. The manner of the coding is not restricted to this. The coding may be conducted in accordance with chain coding or block pattern coding. In short, any binary coding apparatus which can efficiently encode a binary may be used.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 20A:
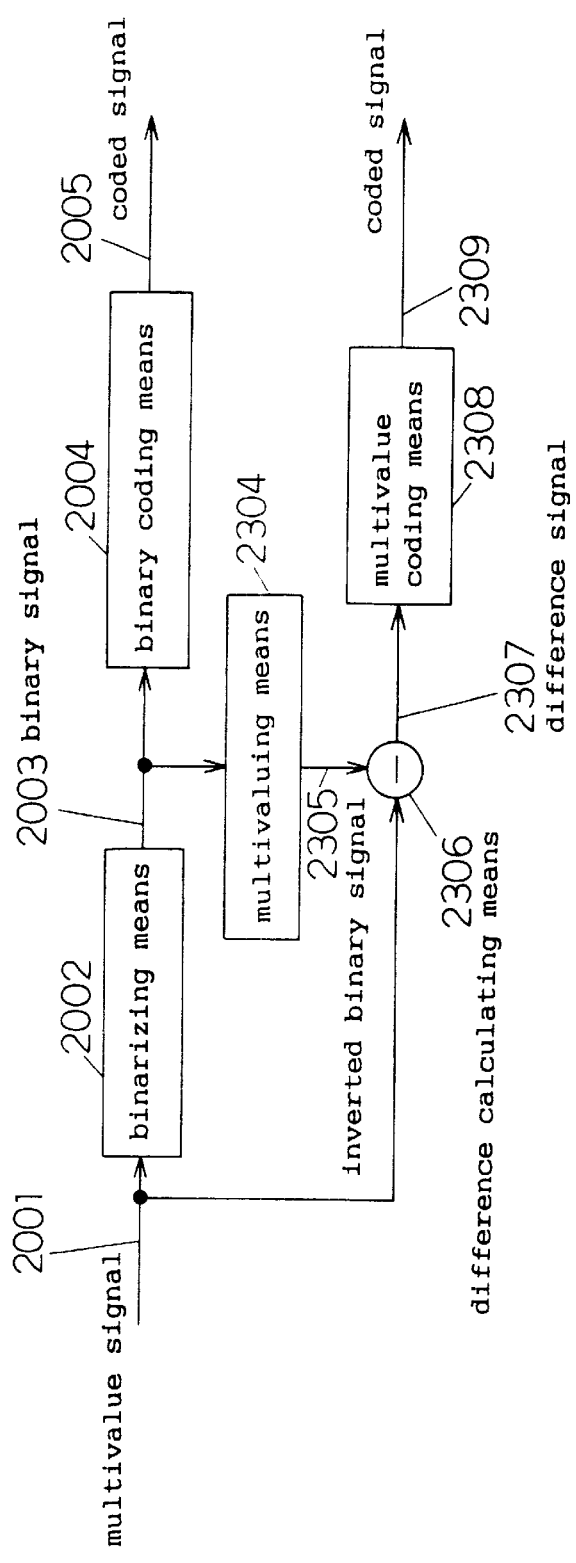
FIG. 20(a) is a block diagram of a picture coding apparatus which is a fourteenth embodiment of the invention.
Figure 20B:
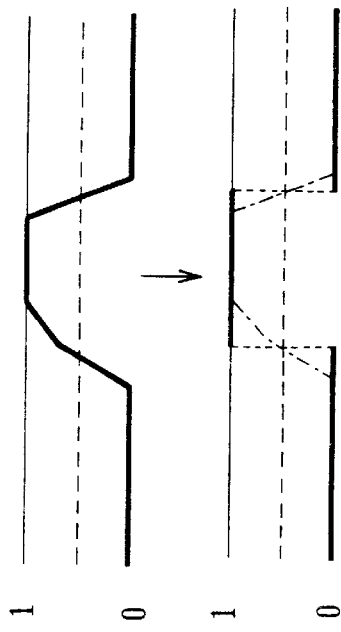
FIG. 20(b) is a diagram showing a difference in difference calculating means.

Referring to FIG. 20(*a*), there is shown therein a block diagram of a picture coding apparatus which is a fourteenth embodiment of the invention, and FIG. 20(*b*) is a diagram showing a difference in difference calculating means. Binarizing means 2002 which receives a multivalue signal 2001 and outputs a binary signal 2003 is connected to binary coding means 2004 which receives the binary signal 2003 and outputs a coded signal 2005, and also to multivaluing means 2304 which receives the binary signal 2003 and outputs an inverted binary signal 2305. The multivaluing means 2304 is connected to difference calculating means 2306 which receives the multivalue signal 2001 and the inverted binary signal 2305 and outputs a difference signal 2307. The difference calculating means 2306 is connected to multivalue coding means 2308 which receives the difference signal 2307 and outputs a coded signal 2309.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the binarizing means 2002, the signal is compared with a predetermined threshold of the binarizing means 2002 to be binarized. Specifically, binarizing is conducted in such a manner that, when the multivalue signal 2001 is equal to the threshold, the value is set to be 0, and, when the signal is smaller than the threshold, the value is set to be 1, and then the binary signal 2003 is output. When the binary signal 2003 is input to the binary coding means 2004, the signal is subjected to binary coding in accordance with MR coding or the like. When the binary signal 2003 is input to the multivaluing means 2304, the signal is multivalued and the inverted binary signal 2305 is output. When the inverted binary signal 2305 and the multivalue signal 2001 are input to the difference calculating means 2306, the difference between the signals is output as the difference signal 2307. When the difference signal 2307 is input to the multivalue coding means 2308, the signal is multivalue-coded by encoding in which orthogonal transformation is combined with entropy coding, and the coded signal 2309 is output.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, coding is conducted on the difference signal between the binary signal depending on whether transparency is 100% or has another value, and the multivalue signal indicative of intermediate level values of transparency.

The coding in the binary coding means 2004 is conducted in accordance with MR coding. The manner of the coding is not restricted to this. The coding may be conducted in accordance with chain coding or block pattern coding. In short, any binary coding apparatus which can efficiently encode a binary may be used.

The multivalue coding means 2308 conducts coding in which orthogonal transformation is combined with entropy coding. The way of coding is not restricted to this. Alternatively, coding may be conducted in accordance with Wavelet transform coding. In short, any multivalue coding means may be used as far as it can efficiently encode a multivalue.

The difference calculating means 2306 calculates a difference with using the inverted binary signal 2305. Alternatively, a difference may be obtained with reference to the threshold of the binarizing means 2002.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Referring to FIG. 21(*a*), there is shown therein a block diagram of a picture coding apparatus which is a fifteenth embodiment of the invention, FIG. 21(*b*) is a diagram showing an example of a multivalue signal 2001, FIG. 21(*c*) is a diagram showing an example of a binary signal 2003, and FIG. 21(*d*) is a diagram showing an example of a binary signal 2403. Binarizing means 2002 which receives the multivalue signal 2001 and outputs the binary signal 2003 is connected to binary coding means 2004 which receives the binary signal 2003 and outputs a coded signal 2005. Frequency distribution calculating means 2406 which receives the multivalue signal 2001 and outputs a threshold 2407 is connected to binarizing means 2402 which receives the multivalue signal 2001 and the threshold 2407 and outputs the binary signal 2403. The binarizing means 2402 is connected to binary coding means 2404 which receives the binary signal 2403 and outputs a coded signal 2405.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the binarizing means 2002, the signal is binarized in accordance with its threshold, and the binary signal 2003 is output. Specifically, the multivalue signal 2001 is binarized in such a manner that, when transparency of the multivalue signal is 100%, the value is set to be 0, and, when transparency is smaller than 100%, the value is set to be 1. When the binary signal 2003 is input to the binary coding means 2004, the signal is coded in accordance with MR coding, and the coded signal 2005 is output. When the multivalue signal 2001 is input to the frequency distribution calculating means 2406, the frequency distribution of transparency of pixel values of the multivalue signal 2001 is calculated to obtain the distribution ratio of intermediate level values of transparency. The distribution ratio of intermediate level values of transparency is compared with a predetermined threshold, and the threshold 2407 (its value is k%) of the binarizing means 2402 is output depending on the comparison result. The binarizing means 2402 conducts binarization in accordance with the threshold 2407. Specifically, the multivalue signal 2001 is binarized in such a manner that, when the signal is k%, the value is set to be 0, and, when the signal is larger than k%, the value is set to be 1, and the binary signal 2403 is output. When the binary signal 2403 is input to the binary coding means 2404, the signal is subjected to coding in accordance with MR coding, and the coded signal 2405 is output.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, coding is conducted on a binarized signal with using a value calculated from the distribution ratio of intermediate level values of transparency, as the threshold.

The coding in the binary coding means 2004 and the binary coding means 2404 is conducted in accordance with MR coding. The manner of the coding is not restricted to this. The coding may be conducted in accordance with chain coding or block pattern coding. In short, any binary coding apparatus which can efficiently encode a binary may be used.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 22:
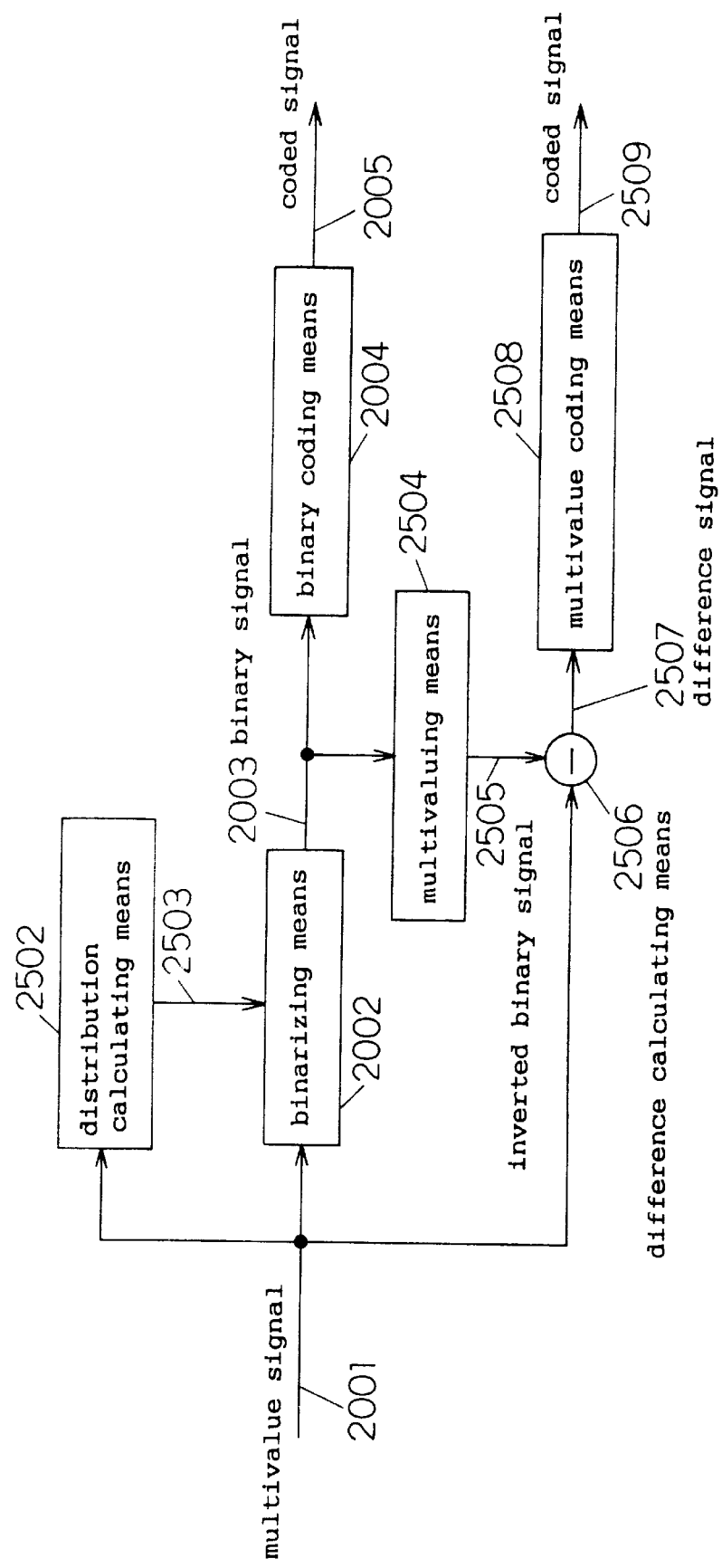
FIG. 22 is a block diagram of a picture coding apparatus which is a sixteenth embodiment of the invention.

Referring to FIG. 22, there is shown therein a block diagram of a picture coding apparatus which is a sixteenth embodiment of the invention. Frequency distribution calculating means 2502 which receives a multivalue signal 2001 and outputs a reference value 2503 is connected to binarizing means 2002 which receives a multivalue signal 2001 and the reference value 2503 and outputs a binary signal 2003. The binarizing means 2002 is connected to binary coding means 2004 which receives the binary signal 2003 and outputs a coded signal 2005, and also to multivaluing means 2504 which receives the binary signal 2003 and outputs an inverted binary signal 2505. The multivaluing means 2504 is connected to difference calculating means 2506 which receives the multivalue signal 2001 and the inverted binary signal 2505 and outputs a difference signal 2507. The difference calculating means 2506 is connected to multivalue coding means 2508 which receives the difference signal 2507 and outputs a coded signal 2509.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the frequency distribution calculating means 2502, the frequency distribution of transparency of pixel values of a picture signal is calculated. In accordance with the frequency distribution of transparency which is third in degree, the reference value 2503 is output. When the reference value 2503 is input to the binarizing means 2002, the multivalue signal 2001 which is another input is binarized in accordance with the reference value 2503. Specifically, the multivalue signal 2001 is binarized in such a manner that, when the multivalue signal 2001 is equal to the reference value 2503, the value is set to be 0, and, when the multivalue signal 2001 is smaller than the reference value 2503, the value is set to be 1, and the binary signal 2003 is output. When the binary signal 2003 is input to the binary coding means 2004, the signal is coded in accordance with MR coding, and the coded signal 2005 is output. When the binary signal 2003 is input to the multivaluing means 2504, the signal is multivalued and the inverted binary signal 2505 is output. When the inverted binary signal 2505 and the multivalue signal 2001 are input to the difference calculating means 2506, the difference between the signals is calculated, and the difference signal 2507 is output. When the difference signal 2507 is input to the multivalue coding means 2508, the signal is multivalue-coded by encoding in which orthogonal transformation is combined with entropy coding, and the coded signal 2509 is output.

As seen from the above description, according to the embodiment, a multivalue signal coding apparatus in which transparency of pixel values obtained from a picture signal is used as a multivalue signal is provided. In the first coding in which coding is conducted depending on whether transparency is 100% or has another value, coding is conducted on a binary signal which is binarized in accordance with the threshold based on the frequency distribution of transparency which is third in degree. In the second coding for an intermediate level value of transparency, coding is conducted on the difference between the binary signal and the multivalue signal indicative of an intermediate level value of transparency.

The coding in the binary coding means 2004 is conducted in accordance with MR coding. The manner of the coding is not restricted to this. The coding may be conducted in accordance with chain coding or block pattern coding. In short, any multivalue coding apparatus which can efficiently encode a binary may be used.

In the multivalue coding means 2508, coding in which orthogonal transformation is combined with entropy coding is conducted. The way of coding is not restricted to this. Alternatively, coding may be conducted in accordance with Wavelet transform coding. In short, any multivalue coding apparatus may be used as far as it can efficiently encode a multivalue.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 23:
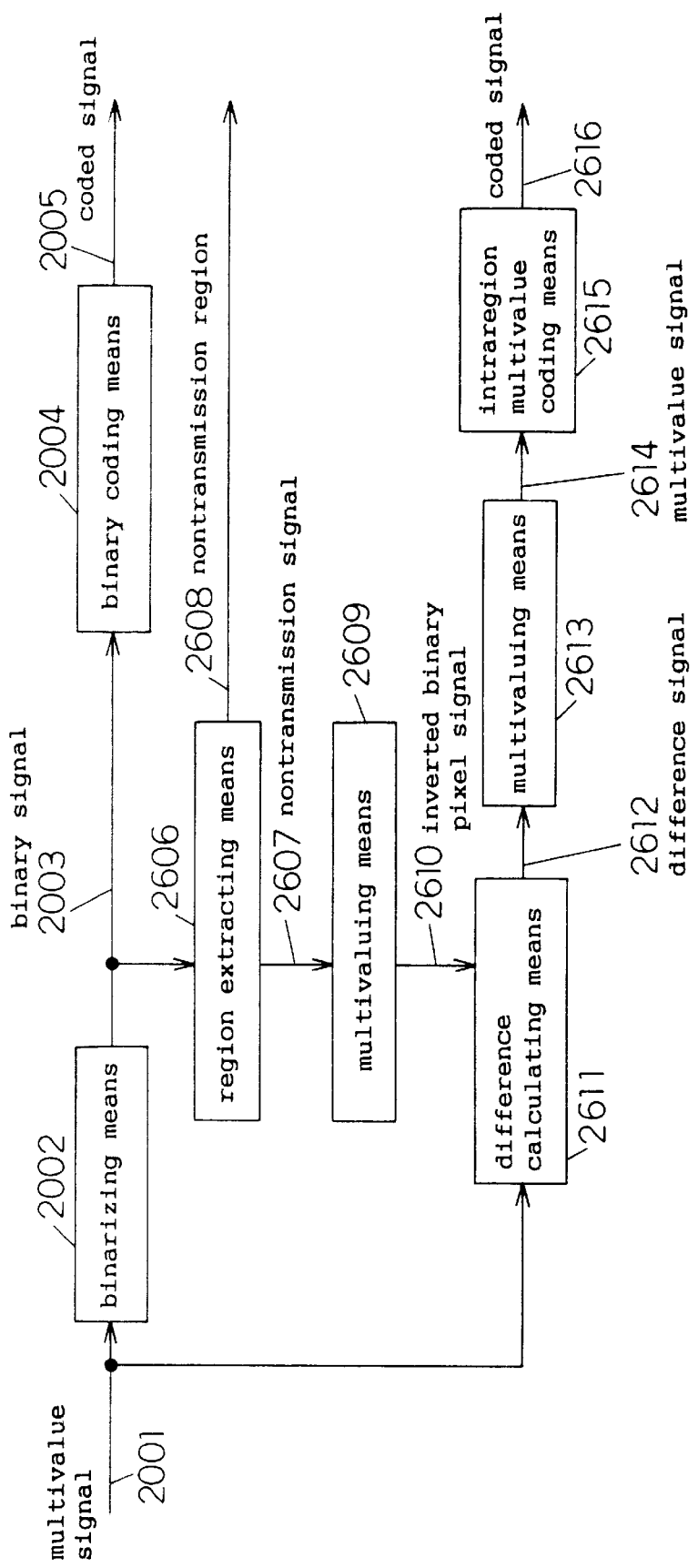
FIG. 23 is a block diagram of a picture coding apparatus which is a seventeenth embodiment of the invention.

Referring to FIG. 23, there is shown therein a block diagram of a picture coding apparatus which is a seventeenth embodiment of the invention. Binarizing means 2002 which receives a multivalue signal 2001 and outputs a binary signal 2003 is connected to binary coding means 2004 which receives the binary signal 2003 and outputs a coded signal 2005, and also to region extracting means 2606 which receives the binary signal 2003 and outputs a nontransmission signal 2607 and a nontransmission region 2608. The region extracting means 2606 is connected to multivaluing means 2609 which receives the nontransmission signal 2607 and outputs an inverted binary pixel signal 2610. The multivaluing means 2609 is connected to difference calculating means 2611 which receives the multivalue signal 2001 and the inverted binary pixel signal 2610 and outputs a difference signal 2612. The difference calculating means 2611 is connected to multivaluing means 2613 which receives the difference signal 2612 and outputs a multivalue signal 2614. The multivaluing means 2613 is connected to intraregion multivalue coding means 2615 which receives the multivalue signal 2614 and outputs a coded signal 2616.

Next, the operation of the embodiment will be described.

The multivalue signal 2001 is a signal indicative of transparency of pixel values obtained from a picture signal. The transparency has a distribution in which the ratio of intermediate level values is small or most elements are 0% or 100%. When the multivalue signal 2001 is input to the binarizing means 2002, the signal is compared with the threshold of the binarizing means 2002 to be binarized, and the binarizing means 2002 outputs the binary signal 2003. Specifically, the multivalue signal 2001 is binarized in such a manner that, when the signal is 100%, the value is set to be 0, and, when the signal is smaller than 100%, the value is set to be 1. When the binary signal 2003 is input to the binary coding means 2004, the signal is subjected to binary coding in accordance with MR coding, and the binary coding means outputs the coded signal 2005. When the binary signal 2003 is input to the region extracting means 2606, a pixel region in which transparency is not 100% is extracted. The extracted region is output as the nontransmission region 2608, and a pixel value signal of the transparency is output as the nontransmission signal 2607. When the nontransmission signal 2607 is input to the multivaluing means 2609, the signal is converted into a multivalue signal and the inverted binary pixel signal 2610 is output. When the multivalue signal 2001 and the inverted binary pixel signal 2610 are input to the difference calculating means 2611, the difference between the signals is calculated, and the difference signal 2612 is output. When the difference signal 2612 is input to the multivaluing means 2613, the signal is multivalued by comparing it with the threshold of the multivaluing means 2613, and the multivaluing means 2613 outputs the multivalue signal 2614. When the multivalue signal 2614 is input to the intraregion multivalue coding means 2615, the signal is multivalue-coded by encoding in which orthogonal transformation is combined with entropy coding, and the coded signal 2616 is output.

As seen from the above description, according to the embodiment, a multivalue signal coding apparatus in which transparency of pixel values obtained from a picture signal is used as a multivalue signal is provided. In the first coding, coding is conducted depending on whether transparency is 100% or has another value. In the second coding, coding is conducted by extracting only a region in which transparency is not 100%, and calculating a difference between an intermediate-value portion of the region and a portion of transparency of 0%.

Alternatively, the intraregion multivalue coding means 2615 may conduct the intraregion binary coding after binarization using a second threshold.

The coding in the binary coding means 2004 is conducted in accordance with MR coding. The manner of the coding is not restricted to this. The coding may be conducted in accordance with chain coding or block pattern coding. In short, any multivalue coding apparatus which can efficiently encode a binary may be used.

In the multivalue coding means 2615, coding in which orthogonal transformation is combined with entropy coding is conducted. The way of coding is not restricted to this. Alternatively, coding may be conducted in accordance with Wavelet transform coding. In short, any multivalue coding apparatus may be used as far as it can efficiently encode a multivalue.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 24:
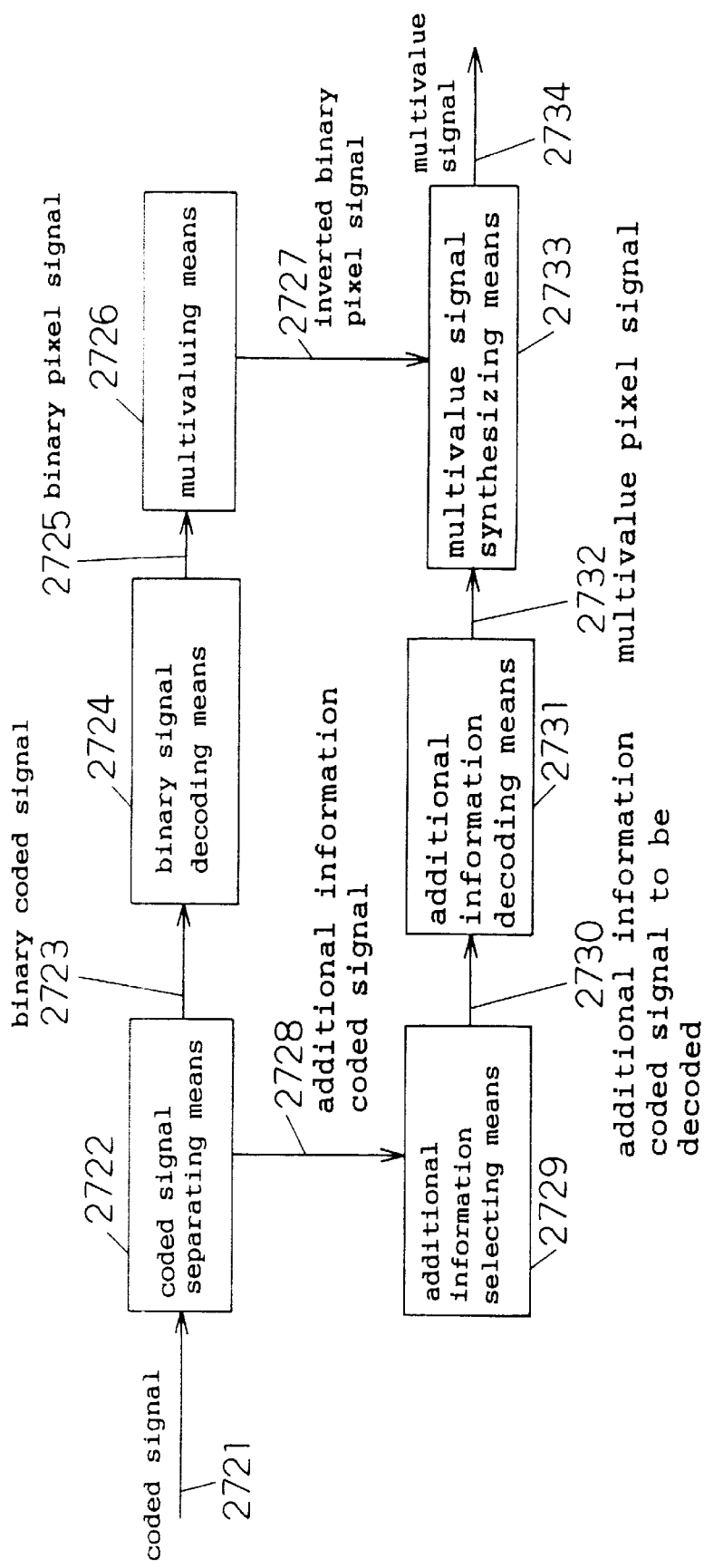
FIG. 24 is a block diagram of a picture decoding apparatus which is an eighteenth embodiment of the invention.

Referring to FIG. 24, there is shown therein a block diagram of a picture decoding apparatus which is an eighteenth embodiment of the invention. Coded signal separating means 2722 which receives a coded signal 2721 and outputs a binary coded signal 2723 and an additional information coded signal 2728 is connected to binary signal decoding means 2724 which receives the binary coded signal 2723 and outputs a binary pixel signal 2725, and also to additional information selecting means 2729 which receives the additional information coded signal 2728 and outputs an additional information coded signal to be decoded 2730. The coded signal separating means 2722 is connected to the binary signal decoding means 2724 which receives the binary coded signal 2723 and outputs the binary pixel signal 2725. The binary signal decoding means 2724 is connected to multivaluing means 2726 which receives the binary pixel signal 2725 and outputs an inverted binary pixel signal 2727. The additional information selecting means 2729 is connected to additional information decoding means 2731 which receives the additional information coded signal to be decoded 2730 and outputs a multivalue pixel signal 2732. The multivaluing means 2726 and the additional information decoding means 2731 are connected to multivalue signal synthesizing means 2733 which receives the inverted binary pixel signal 2727 and the multivalue pixel signal 2732 and outputs a multivalue signal 2734.

Next, the operation of the embodiment will be described.

The coded signal 2721 is a coded signal in which a code obtained by encoding transparency in the case where pixel values obtained from a picture signal have transparency of 0% or 100% is integrated with a code obtained by encoding intermediate values of transparency. When the coded signal 2721 is input to the coded signal separating means 2722, the signal is separated into the binary coded signal 2723 corresponding to transparency of 0% or 100% of pixel values obtained from a picture signal, and the additional information coded signal 2728 corresponding to intermediate values of transparency. When the binary coded signal 2723 is input to the binary signal decoding means 2724, the signal is decoded to a binary signal, and the binary pixel signal 2725 is output. When the binary pixel signal 2725 is input to the multivaluing means 2726, the binary pixel signal 2725 which is a binary signal is converted into a multivalue signal and the inverted binary pixel signal 2727 is output. When the additional information coded signal 2728 is input to the additional information selecting means 2729, the additional information coded signal to be decoded 2730 is output only in the case where the additional information coded signal 2728 includes a code of intermediate values of transparency. When the additional information coded signal to be decoded 2730 is input to the additional information decoding means 2731, the signal is decoded and the multivalue pixel signal 2732 is output. When the multivalue pixel signal 2732 and the inverted binary pixel signal 2727 are input to the multivalue signal synthesizing means 2733, the two signals are synthesized with each other and the multivalue signal 2734 is output.

As seen from the above description, according to the embodiment, an apparatus is provided in which, in the first decoding, a binary coded signal in the case where transparency is 100% or has another value is decoded, and, in the second decoding, a coded signal of an intermediate level value of transparency is decoded, and a multivalue signal of transparency is decoded by superimposing the decoded signals with each other.

Figure 25:
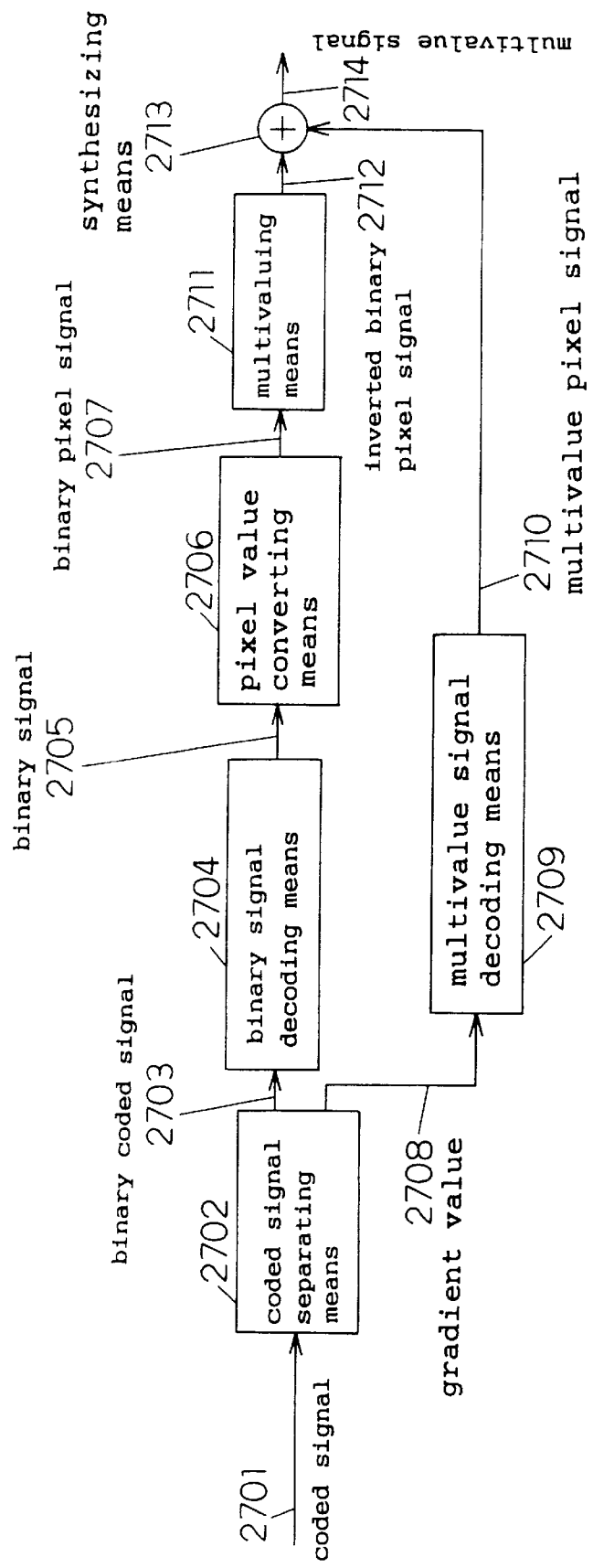
FIG. 25 is a block diagram of a picture decoding apparatus which is a nineteenth embodiment of the invention.

Referring to FIG. 25, there is shown therein a block diagram of a picture decoding apparatus which is a nineteenth embodiment of the invention. Coded signal separating means 2702 which receives a coded signal 2701 and outputs a binary coded signal 2703 and a gradient value 2708 is connected to binary signal decoding means 2704 which receives the binary coded signal 2703 and outputs a binary signal 2705, and also to multivalue signal decoding means 2709 which receives the gradient value 2708 and outputs a multivalue pixel value 2710. The binary signal decoding means 2704 is connected to pixel value converting means 2706 which receives the binary signal 2705 and outputs a binary pixel signal 2707. The pixel value converting means 2706 is connected to multivaluing means 2711 which receives the binary pixel signal 2707 and outputs an inverted binary pixel signal 2712. The multivaluing means 2711 and the multivalue signal decoding means 2709 are connected to synthesizing means 2713 which receives the inverted binary pixel signal 2712 and outputs a multivalue signal 2714.

Next, the operation of the embodiment will be described.

The coded signal 2701 is a coded signal in which the coded signal 2005 and the gradient value 2007 shown in FIG. 19 are integrated with each other. When the coded signal 2701 is input to the coded signal separating means 2702, the signal is separated into the binary coded signal 2703 and the gradient value 2708. When the binary coded signal 2703 is input to the binary signal decoding means 2704, the signal is decoded to a binary signal and the binary signal 2705 is output. When the binary signal 2705 is input to the pixel value converting means 2706, transparency of 100% is substituted in the case of 0, a predetermined value is substituted in the case of 1, and the binary pixel signal 2707 is output. When the binary pixel signal 2707 is input to the multivaluing means 2711, the signal is converted into a multivalue signal and the inverted binary pixel signal 2712 is output. When the gradient value 2708 is input to the multivalue signal decoding means 2709, extrapolation starting with 0 is conducted on the basis of the gradient value 2708, and the multivalue pixel value 2710 is output. The inverted binary signal 2712 and the multivalue pixel value 2710 are synthesized with each other by the synthesizing means 2713, and then output as the multivalue signal 2714.

As seen from the above description, according to the embodiment, a multivalue signal decoding apparatus which decodes a signal coded by the coding apparatus of FIG. 19 is provided. In the first decoding, a binary coded signal in the case where transparency of a pixel value obtained from a picture signal is 100% or has another value is decoded. In the second decoding, a signal in which intermediate level values of transparency are approximated as gradient values is decoded. The decoded signals are superimposed with each other, whereby a multivalue signal of transparency can be decoded.

When the threshold of the binarizing means 2002 of FIG. 19 is set to be a predetermined value other than 0, the pixel value converting means 2706 substitutes 100% in the case where the binary signal 2705 is 0, and a predetermined maximum value in the case where the signal is 1. The multivalue signal decoding means 2709 conducts predetermined extrapolation on intermediate level values on the basis of the gradient value 2708.

Figure 26:
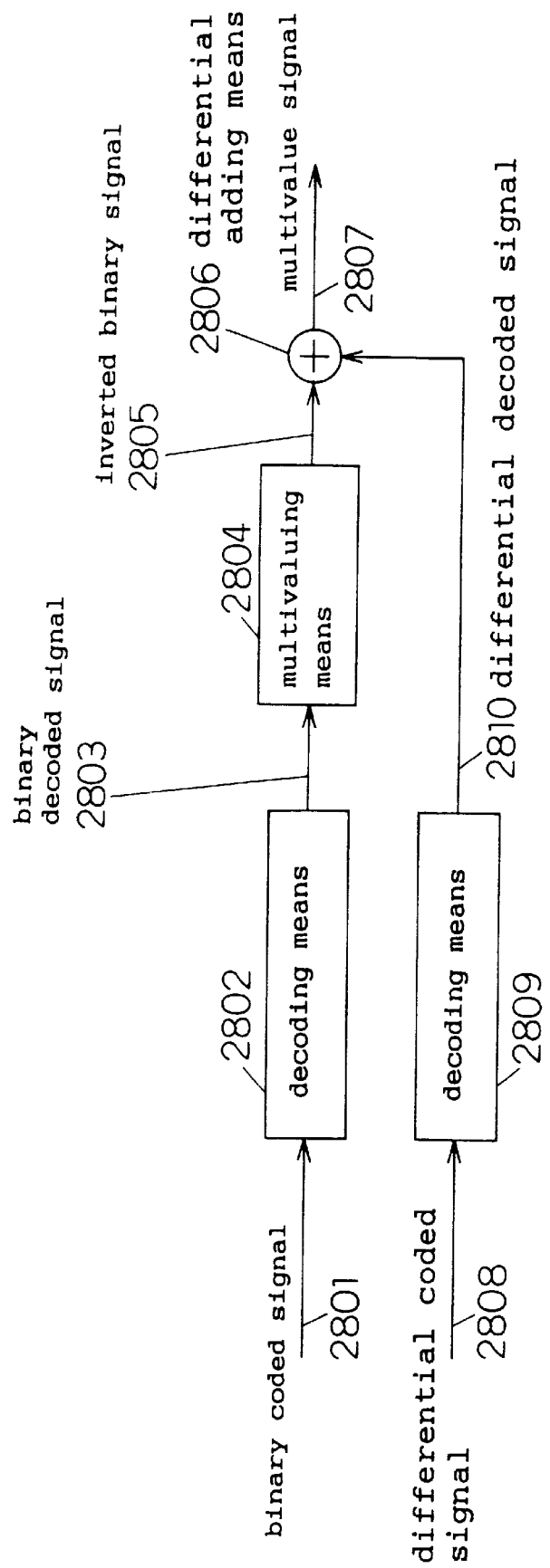
FIG. 26 is a block diagram of a picture decoding apparatus which is a twentieth embodiment of the invention.

Referring to FIG. 26, there is shown therein a block diagram of a picture decoding apparatus which is a twentieth embodiment of the invention. Decoding means 2802 which receives a binary coded signal 2801 and outputs a binary decoded signal 2803 is connected to multivaluing means 2804 which receives the binary decoded signal 2803 and outputs an inverted binary signal 2805. The multivaluing means 2804, and decoding means 2809 which receives a differential coded signal 2808 and outputs a differential decoded signal 2810 are connected to differential adding means 2806 which receives the inverted binary signal 2805 and the differential decoded signal 2810 and outputs a multivalue signal 2807.

Next, the operation of the embodiment will be described.

When the binary coded signal 2801 is input to the decoding means 2802, the signal is decoded to a binary signal, and the binary decoded signal 2803 is output. When the binary decoded signal 2803 is input to the multivaluing means 2804, the signal is converted into a multivalue signal, and the inverted binary signal 2805 is output. When the differential coded signal 2808 is input to the decoding means 2809, the signal is decoded to a multivalue signal, and the differential decoded signal 2810 is output. When the inverted binary signal 2805 and the differential decoded signal 2810 are input to the differential adding means 2806, the two signals are added to each other and the multivalue signal 2807 is output.

As seen from the above description, according to the embodiment, a multivalue signal decoding apparatus which decodes a signal coded by the coding apparatus of FIG. 20 is provided. In the first decoding, a binary coded signal in the case where transparency of a pixel value obtained from a picture signal is 100% or has another value is decoded. In the second decoding, a signal in which a difference signal between a signal of intermediate level values of transparency and a binary signal in the case where transparency is 100% or has another value is decoded. The decoded signals are superimposed with each other, whereby a multivalue signal of transparency can be decoded.

Figure 27A:
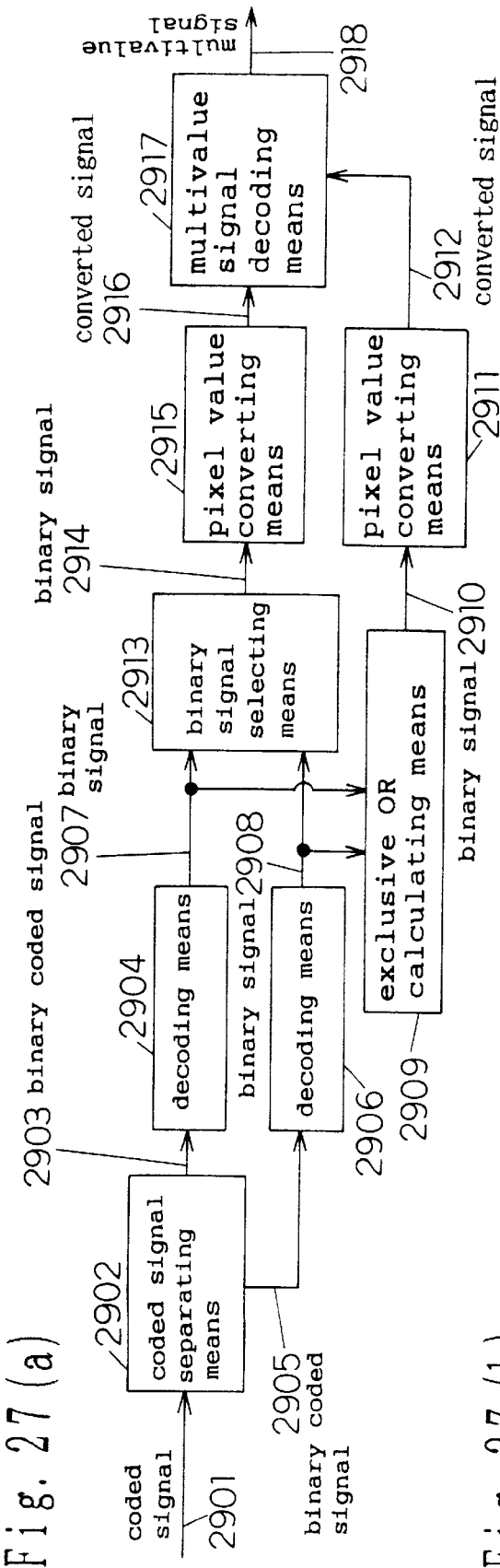
FIG. 27(a) is a block diagram of a picture decoding apparatus which is a twenty-first embodiment of the invention.
Figure 27B:
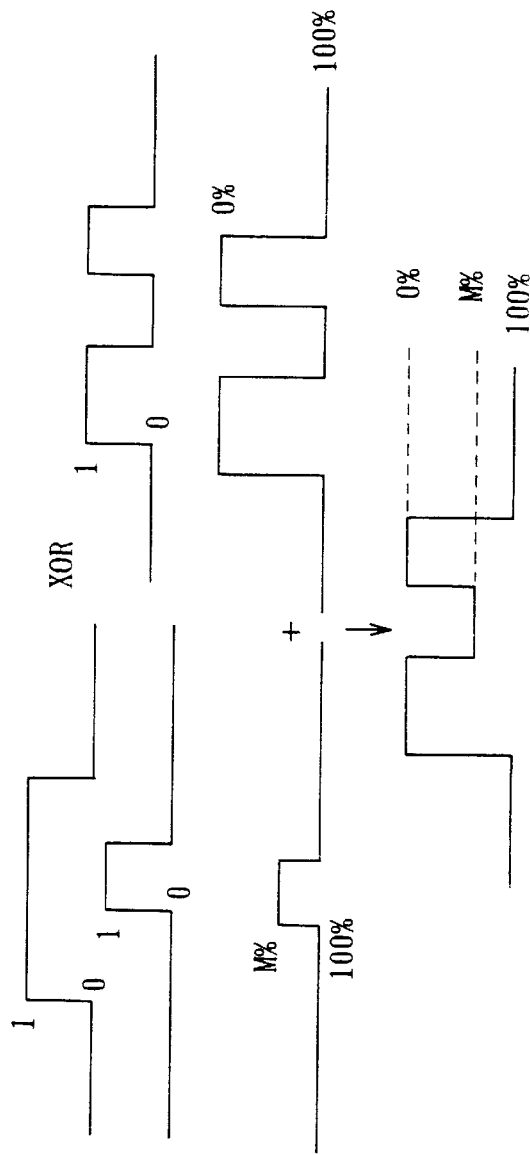
FIG. 27(b) is a diagram showing an example of signal processing of the twenty-first embodiment.

Referring to FIG. 27(a), there is shown therein a block diagram of a picture decoding apparatus which is a twenty-first embodiment of the invention, and FIG. 27(b) is a diagram showing an example of signal processing of the embodiment. Coded signal separating means 2902 which receives a coded signal 2901 and outputs binary coded signals 2903 and 2905 is connected to decoding means 2904 which receives the binary coded signal 2903 and outputs a binary signal 2907, and also to decoding means 2906 which receives the binary coded signal 2905 and outputs a binary signal 2908. The decoding means 2904 and 2906 are connected to exclusive OR calculating means 2909 which receives the binary signals 2907 and 2908 and outputs a binary signal 2910, and also to binary signal selecting means 2913 which receives the binary signals 2917 and 2918 and outputs a binary signal 2914. The exclusive OR calculating means 2909 is connected to pixel value converting means 2911 which receives the binary signal 2910 and outputs a converted signal 2912. The binary signal selecting means 2913 is connected to pixel value converting means 2915 which receives the binary signal 2914 and outputs a converted signal 2916. The pixel value converting means 2911 and means 2915 are connected to multivalue signal decoding means 2917 which receives the converted signals 2912 and 2916 and outputs a multivalue signal 2918.

Next, the operation of the embodiment will be described.

The coded signal 2901 is a coded signal in which the coded signals 2005 and 2509 shown in FIG. 22 are integrated with each other. When the coded signal 2901 is input to the coded signal separating means 2902, the signal is separated into the binary coded signals 2903 and 2905. When the binary coded signal 2903 is input to the decoding means 2904, the signal is decoded to a binary signal and the binary signal 2907 is output. When the binary coded signal 2903 is input to the decoding means 2906, the signal is decoded to a binary signal and the binary signal 2908 is output. The binary signals 2907 and 2908 are input to the exclusive OR calculating means 2909. An exclusive OR is calculated from the two input values, and the binary signal 2910 is output. The binary signal 2910 is input to the pixel value converting means 2911, the converted signal 2912 is output while substituting transparency of 100% into 0, and an intermediate value of transparency into 1. When the binary signals 2917 and 2918 are input to the binary signal selecting means 2913, the signal in which 1 among the two input values occupies a smaller ratio is output as the binary signal 2914. The binary signal 2914 is input to the pixel value converting means 2915, and the converted signal 2916 is output while substituting transparency of 100% into 0, and the maximum value into 1. When the converted signals 2912 and 2916 are input to the multivalue signal decoding means, the two signals are added to each other and the multivalue signal 2918 is output.

As seen from the above description, according to the embodiment, a multivalue signal decoding apparatus which decodes a signal coded by the coding apparatus of FIG. 20 is provided. In the first decoding, a binary coded signal in the case where transparency of pixel values obtained from a picture signal is 100% or has another value is conducted. In the second decoding, a signal which is binarized and encoded in accordance with a threshold on the basis of the frequency distribution of intermediate values of transparency is decoded. The decoded signals are superimposed with each other, whereby a multivalue signal of transparency can be decoded.

Figure 28:
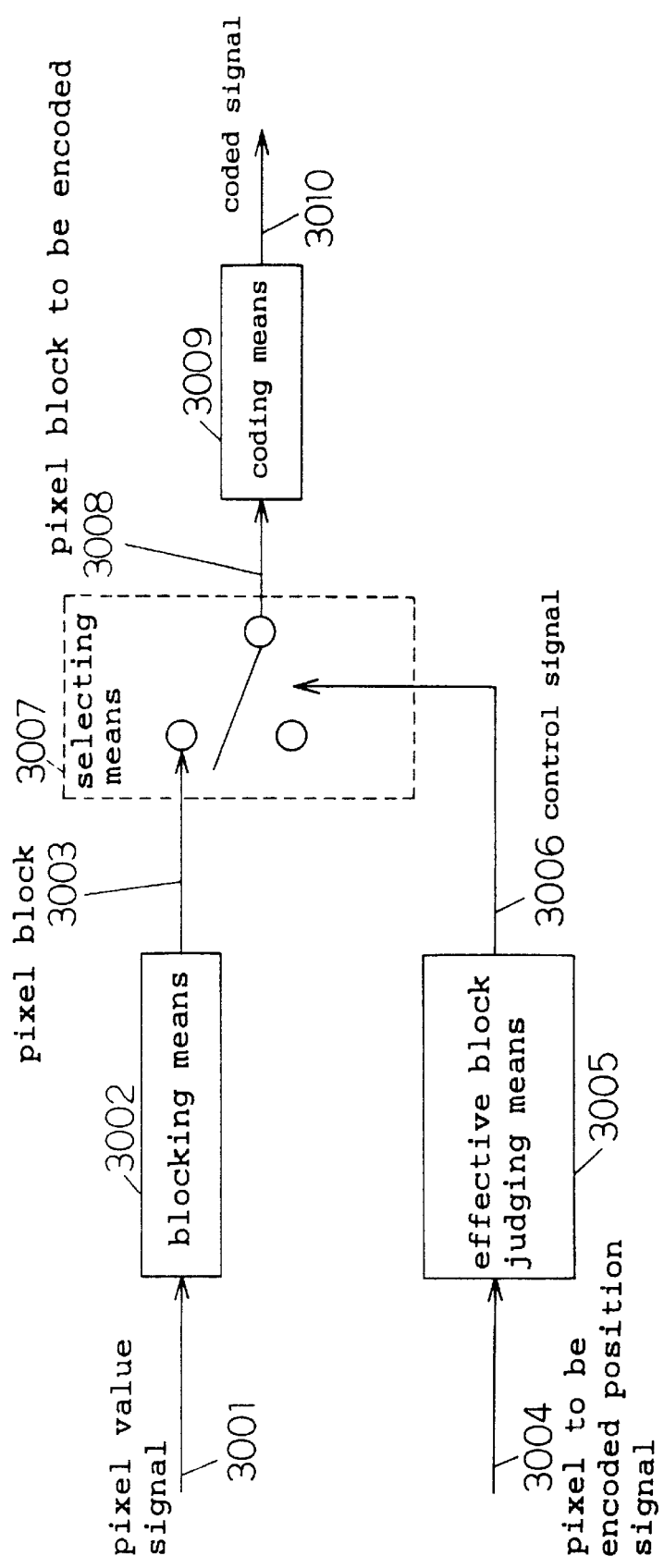
FIG. 28 is a block diagram of a picture coding apparatus which is a twenty-second embodiment of the invention.

Referring now to FIG. 28, there is shown therein a block diagram of a picture coding apparatus which is a twenty-second embodiment of the invention. As shown in FIG. 28, blocking means 3002 which receives a pixel value signal 3001 and outputs a pixel block 3003, and effective block judging means 3005 which receives a pixel to be encoded position signal 3004 and outputs a control signal 3006 are connected to selecting means 3007 which receives the pixel block 3003 and the control signal 3006 and outputs a pixel block to be encoded 3008. The selecting means 3007 is connected to coding means 3009 which receives the pixel to be encoded block 3008 and outputs a coded signal 3010.

Next, the operation of the embodiment will be described.

When the pixel value signal 3001 which includes pixel value information of a picture is input to the blocking means 3002, the picture is divided into pixel blocks consisting of 16×16 pixels, and then output from the blocking means 3002 as the pixel block 3003.

The pixel to be encoded position signal 3004 is a signal obtained by conducting coding while judging from transparency of pixel values of a picture whether coding is to be conducted or not. (Transparency of 0% indicates a state where an opaque article exists and the background cannot be seen, and transparency of 100% indicates a state where there is no article and the background can be seen as it is. An intermediate level value appears in the case where a translucent article made of glass or the like exists, or in a boundary between articles.)

When the pixel to be encoded position signal 3004 is input to the effective block judging means 3005, a block which is synchronized with the pixel block 3003 is checked to judge whether it includes a pixel value to be encoded or not. The effective block judging means 3005 outputs a signal based on the judgment as the control signal 3006. When the control signal 3006 and the pixel block 3003 are input to the selecting means 3007, if the effective block judging means 3005 judges that the pixel block 3003 includes a pixel value to be encoded, the selecting means 3007 outputs the pixel block 3003 as the pixel to be encoded block 3008. If the effective block judging means 3005 judges that the pixel block 3003 does not include a pixel value to be encoded, the selecting means 3007 does not output the pixel to be encoded block 3008. When the pixel to be encoded block 3008 output from the selecting means 3007 is input to the coding means 3009, multivalue-coding which uses DCT is conducted and the coded signal 3010 is output.

FIG. 29 is a diagram showing pixel blocking in the embodiment. The solid figure in the left portion of FIG. 29 indicates pixels which are judged to be encoded in accordance with transparency of pixel values. Dotted blocks in the right portion of FIG. 29 indicate pixel blocks to be encoded which are divided on the basis of information of the pixels to be encoded.

In the embodiment, it is possible to uniquely identify from the pixel to be encoded position signal not only a pixel block which includes a pixel to be encoded, but also a pixel block which does not include a pixel to be encoded. Therefore, the apparatus of the embodiment is a picture signal coding apparatus in which coding of such a pixel block can be omitted so that the coding efficiency is improved.

The multivalue coding in the coding means 3009 employs DCT. The method of the coding is not restricted to this. Alternatively, multivalue coding in which orthogonal transformation is combined with entropy coding may be employed. In short, any multivalue coding method may be employed as far as it can efficiently conduct multivalue coding.

A pixel block has a structure of 16×16 pixels. The structure of a pixel block is not restricted to this, and may be 32×32 pixels. In short, any pixel structure may be employed as far as it can improve the coding efficiency.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 30:
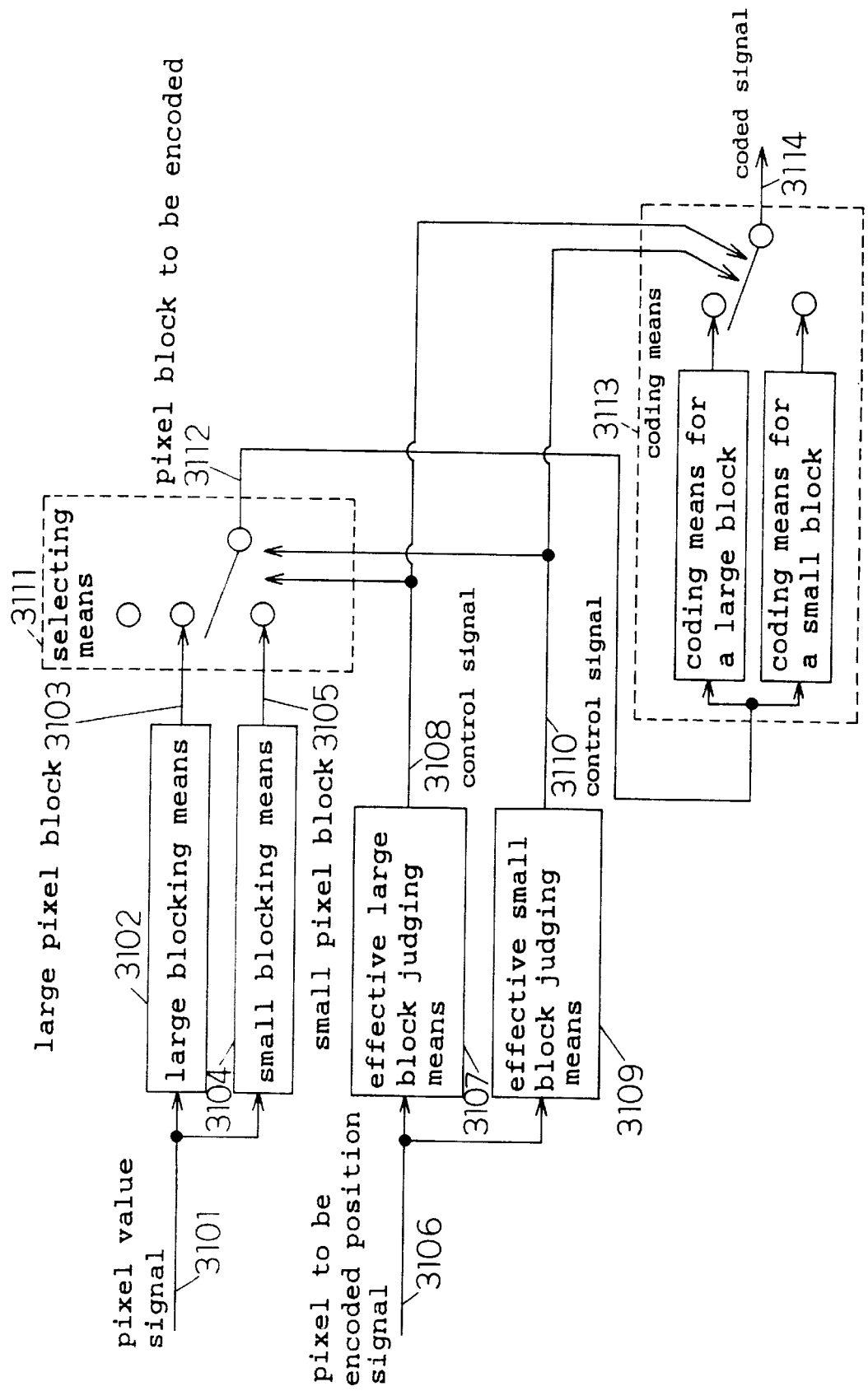
FIG. 30 is a block diagram of a picture coding apparatus which is a twenty-third embodiment of the invention.

Referring to FIG. 30, there is shown therein a block diagram of a picture coding apparatus which is a twenty-third embodiment of the invention. Large blocking means 3102 which receives a pixel value signal 3101 and outputs a large pixel block 3103, small blocking means 3104 which receives the pixel value signal 3101 and outputs a small pixel block 3105, effective large block judging means 3107 which receives a pixel to be encoded position signal 3106 and outputs a control signal 3108, and effective small block judging means 3109 which receives the pixel to be encoded position signal 3106 and outputs a control signal 3110 are connected to selecting means 3111 which receives the large pixel block 3103, the small pixel block 3105, and the control signals 3108 and 3110 and outputs a pixel block to be encoded 3112. The selecting means 3111 is connected to coding means 3113 which receives the pixel block to be encoded 3112, and the control signals 3108 and 3110 and outputs a coded signal 3114.

Next, the operation of the embodiment will be described.

When the pixel value signal 3101 which includes pixel value information of a picture is input to the large blocking means 3102, the picture is divided into large pixel blocks consisting of 16×16 pixels, and then output as the large pixel block 3103. When the pixel value signal 3101 is input to the small blocking means 3104, the picture is divided into small pixel blocks consisting of 8×8 pixels, and then output as the small pixel block 3105.

The pixel to be encoded position signal 3106 is a signal obtained by conducting coding wile judging from transparency of pixel values of a picture whether coding is to be conducted or not.

When the pixel to be encoded position signal 3106 is input to the effective large block judging means 3107, a block which is synchronized with the large pixel block 3103 is checked to judge whether it includes a pixel value to be encoded or not. The effective large block judging means 3107 outputs a signal based on the judgment as the control signal 3108. When the pixel to be encoded position signal 3106 is input to the effective small block judging means 3109, a block which is synchronized with the small pixel block 3105 is checked to judge whether it includes a pixel value to be encoded or not. The effective small block judging means 3109 outputs a signal based on the judgment as the control signal 3110.

When the large pixel block 3103, the small pixel block 3105, and the control signals 3108 and 3110 are input to the selecting means 3111, the large pixel block 3103 and the small pixel block 3105 are controlled by the control signals 3108 and 3110 and the pixel block to be encoded 3112 is output. Specifically, if it is judged that all the four small pixel blocks contained in the large pixel block 3103 include a pixel to be encoded, the large pixel block 3103 is output as the pixel block to be encoded 3112 from the selecting means 3111. In the case other than the above, if it is judged that at least one of the four small pixel blocks contained in the large pixel block 3103 includes a pixel to be encoded, only the small pixel block 3105 which is judged that it includes a pixel to be encoded is output as the pixel block to be encoded 3112 from the selecting means 3111.

When the pixel block to be encoded 3112 and the control signals 3108 and 3110 are input to the coding means 3113, the pixel block to be encoded 3112 is controlled by the control signals 3108 and 3110 and the coded signal 3114 is output. Specifically, if it is judged from the control signals 3108 and 3110 that all the four small pixel blocks contained in the large pixel block 3103 include a pixel to be encoded, the pixel block to be encoded 3112 is subjected to multivalue coding according to DCT which corresponds to the large pixel block, and the coding means 3113 outputs the coded signal 3114. In the case other than the above, if it is judged from the control signals 3108 and 3110 that at least one of the four small pixel blocks contained in the large pixel block 3103 includes a pixel to be encoded, the pixel block to be encoded 3112 is subjected to multivalue coding according to DCT which corresponds to the small pixel block, and the coding means 3113 outputs the coded signal 3114. In the other case, the coded signal 3114 is not output.

Figure 31:
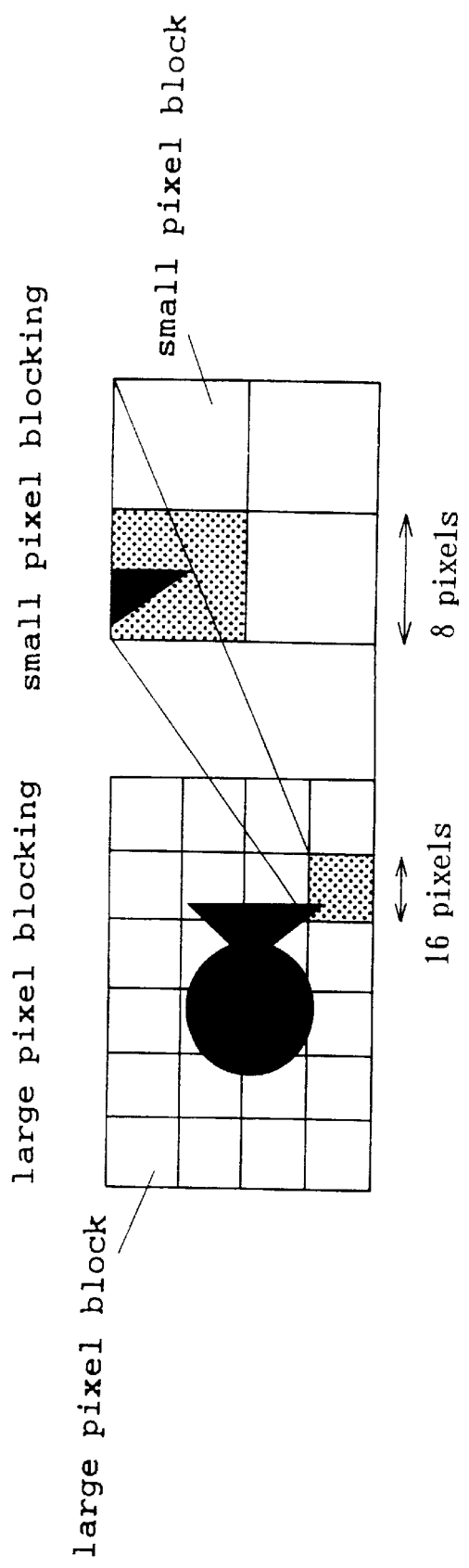
FIG. 31 is a diagram showing large pixel blocking and small pixel blocking of the twenty-third embodiment.

Referring to FIG. 31, there is shown therein a diagram showing large pixel blocking and small pixel blocking of the embodiment. It will be seen that, when each large pixel block in the left portion of FIG. 31 is divided into small pixel blocks in the right portion of the figure, coding of the three empty small pixel blocks among the four small pixel blocks can be omitted.

According to the embodiment, a picture signal coding apparatus is provided in which a picture is divided into large pixel blocks of the same area, the large pixel blocks are further divided into small pixel blocks, and hence coding of a small pixel block which is included in the large pixel block and not required to be encoded can be omitted, thereby improving the coding efficiency.

The multivalue coding in the coding means 3113 employs DCT. The method of the coding is not restricted to this. Alternatively, multivalue coding in which orthogonal transformation is combined with entropy coding may be employed. In short, any multivalue coding method may be employed as far as it can efficiently conduct multivalue coding.

A pixel block has a structure of 16×16 pixels. The structure of a large pixel block is not restricted to this, and may be 32×32 pixels. To comply with this, a small pixel block has a structure of 4×4 pixels. The structure of a small pixel block is not restricted to this, and may be 8×8 pixels. In short, any pixel structure may be employed as far as it can improve the coding efficiency.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 32:
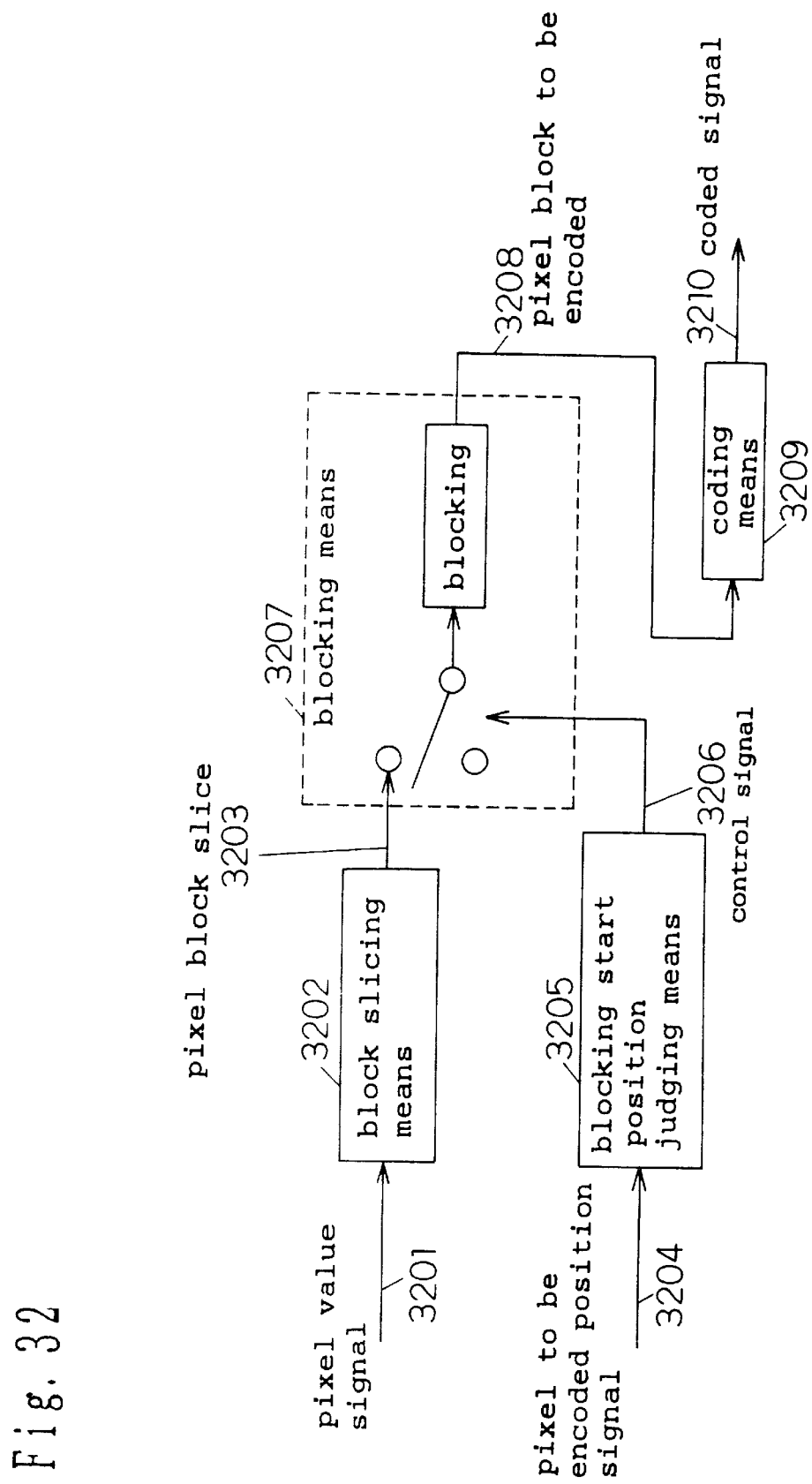
FIG. 32 is a block diagram of a picture coding apparatus which is a twenty-fourth embodiment of the invention.

Referring to FIG. 32, there is shown therein a block diagram of a picture coding apparatus which is a twenty-fourth embodiment of the invention. Block slicing means 3202 which receives a pixel value signal 3201 and outputs a pixel block slice 3203, and blocking start position judging means 3205 which receives a pixel to be encoded position signal 3204 and outputs a control signal 3206 are connected to blocking means 3207 which receives the pixel block slice 3203 and the control signal 3206 and outputs a pixel block to be encoded 3208. The blocking means 3207 is connected to coding means 3209 which receives the pixel block to be encoded 3208 and outputs a coded signal 3210.

Next, the operation of the embodiment will be described.

When the pixel value signal 3201 which includes pixel value information of a picture is input to the block slicing means 3202, the picture is sliced with a height of 16 pixels to be divided into pixel block slice, and then output as the pixel block slice 3203.

The pixel to be encoded position signal 3204 is a signal obtained by conducting coding while judging from transparency of pixel values of a picture whether coding is to be conducted or not.

When the pixel to be encoded position signal 3204 is input to the blocking start position judging means 3205, for the pixel block slice 3203, the control signal 3206 which corresponds to the start position of pixel blocking consisting of 16×16 pixels is output from the blocking start position judging means 3205. When the pixel block slice 3203 and the control signal 3206 are input to the blocking means 3207, pixel blocking consisting of 16×16 pixels is conducted on the pixel block slice 3203. Specifically, if it is judged from the control signal 3206 that the pixel block slice 3203 includes a pixel to be encoded, pixel blocking consisting of 16×16 pixels is conducted with starting from a position where a pixel to be encoded is first detected. Among pixel blocks from which a pixel block slice is separated, only a pixel block which is judged to include a pixel value to be encoded is sequentially output as the pixel block to be encoded 3208 from the blocking means 3207. When the pixel block to be encoded 3208 is input to the coding means 3209, multivalue coding according to DCT is conducted and the coded signal 3210 is output.

Figure 33:
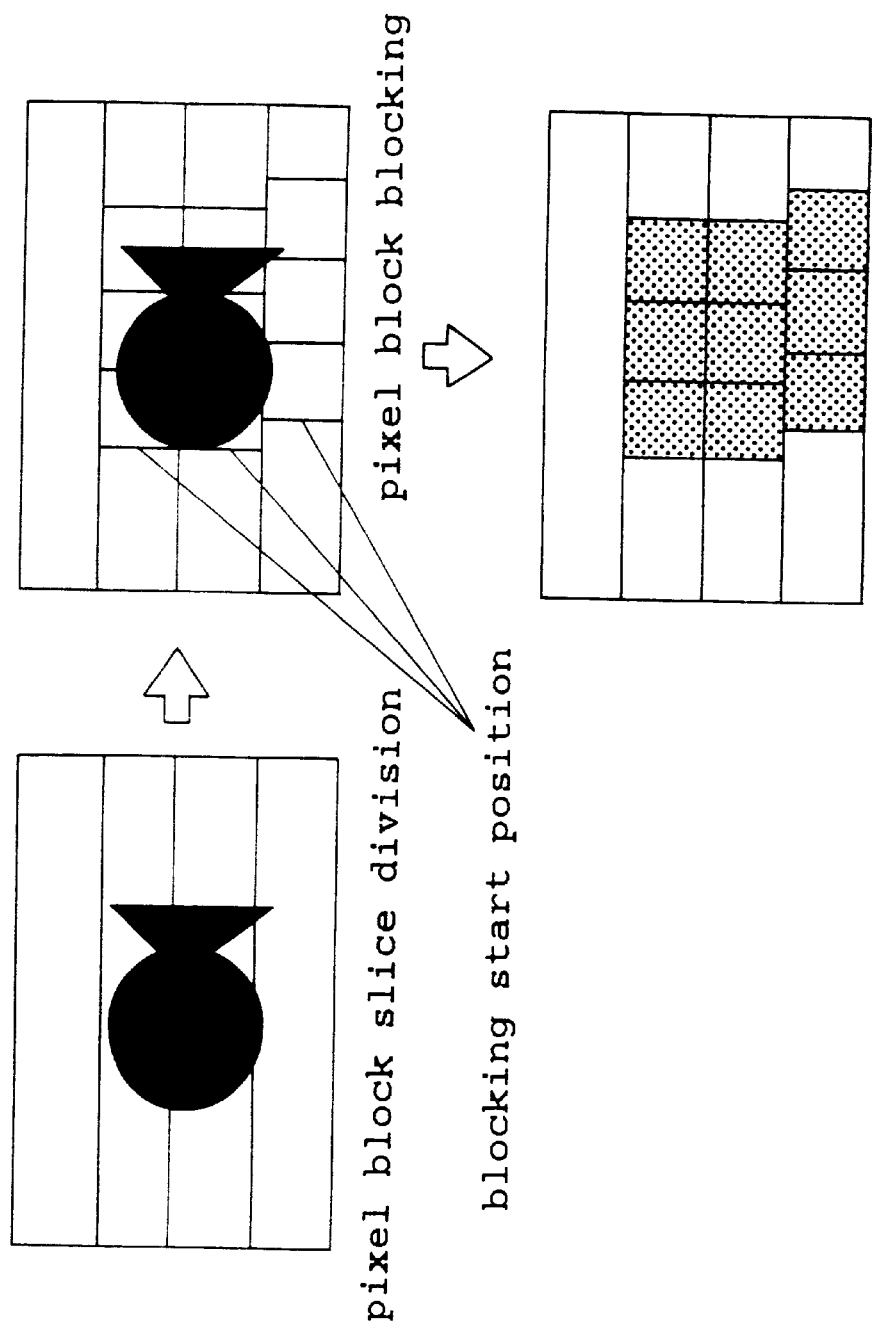
FIG. 33 is a diagram showing pixel blocking in the twenty-fourth embodiment.

FIG. 33 is a diagram showing pixel blocking in the embodiment. As described with reference to FIG. 29, when blocking is conducted by the pixel blocking of the twenty-second embodiment, pixel blocks to be encoded are eleven pixel blocks shown in the right portion of the figure. In contrast, when blocking is conducted by the pixel blocking of the present embodiment as shown in FIG. 33, pixel blocks to be encoded are nine pixel blocks shown in the lower portion of the figure. From the above, it will be seen that the pixel value coding method of the twenty-fourth embodiment shown in FIG. 32 can reduce the number of pixel blocks to be encoded, by two.

The embodiment can provide a picture signal coding apparatus which conducts pixel blocking so that the start position of pixel blocks to be encoded is located at a pixel position that is to be first detected in the horizontal direction, and hence there is a case where the number of pixel blocks to be encoded is made smaller than that in the first embodiment, thereby further improving the coding efficiency.

The multivalue coding in the coding means 3209 employs DCT. The method of the coding is not restricted to this. Alternatively, multivalue coding in which orthogonal transformation is combined with entropy coding may be employed. In short, any multivalue coding method may be employed as far as it can efficiently conduct multivalue coding.

The height of the pixel block slice is set to be 16 pixels. The height is not restricted to this, and may be set to be 32 pixels. To comply with this, a pixel block has a structure of 16×16 pixels. The structure of a pixel block is not restricted to this, and may be 32×32 pixels. In short, any pixel structure may be employed as far as it can improve the coding efficiency.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 34:
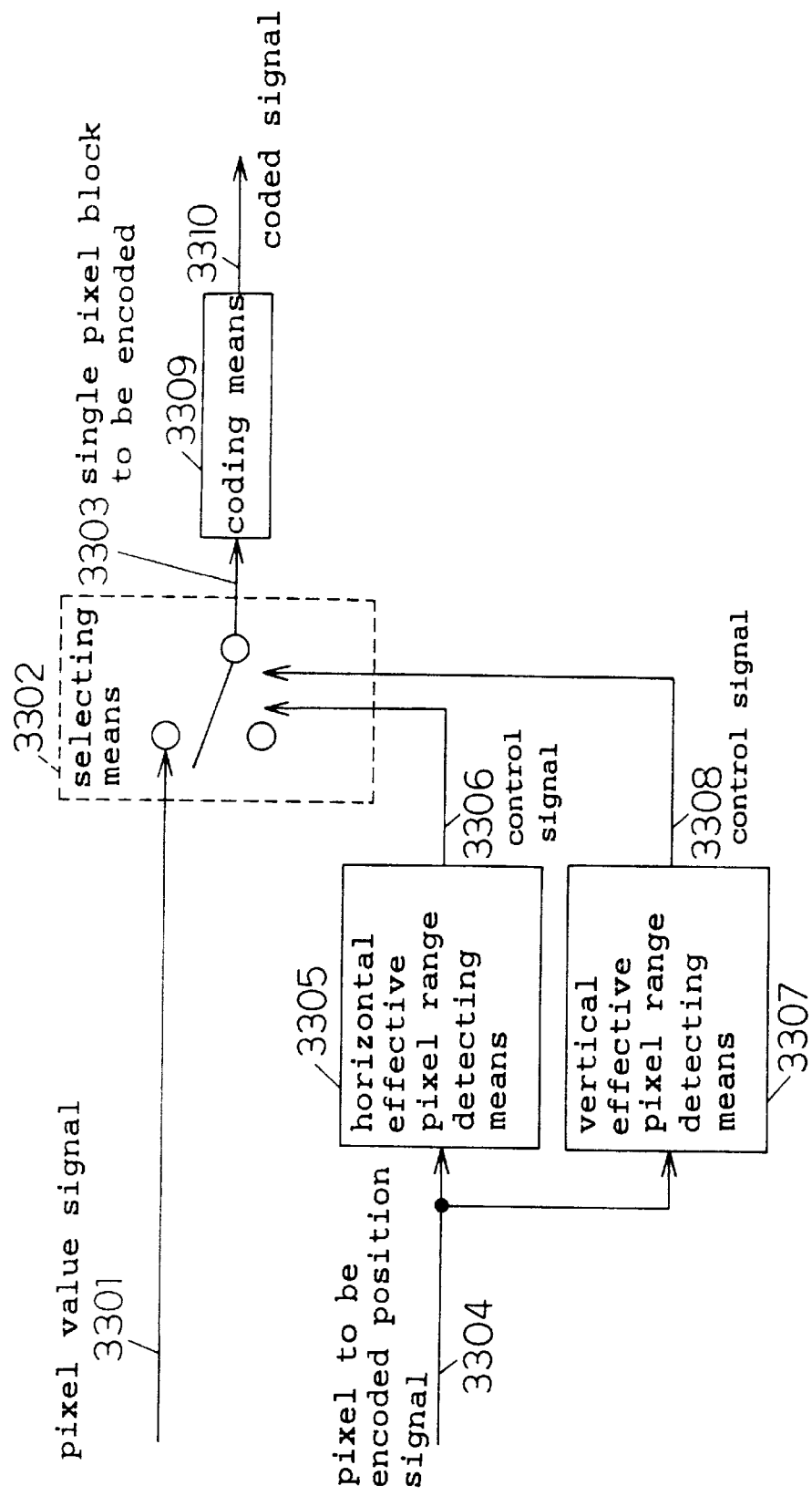
FIG. 34 is a block diagram of a picture coding apparatus which is a twenty-fifth embodiment of the invention.

Referring to FIG. 34, there is shown therein a block diagram of a picture coding apparatus which is a twenty-fifth embodiment of the invention. Horizontal effective pixel range detecting means 3305 which receives a pixel to be encoded position signal 3304 and outputs a control signal 3306, and vertical effective pixel range detecting means 3307 which receives the pixel to be encoded position signal 3304 and outputs a control signal 3308 are connected to selecting means 3302 which receives a pixel value signal 3301 and outputs a single pixel block to be encoded 3303. The selecting means 3302 is connected to coding means 3309 which receives the single pixel block to be encoded 3303 and outputs a coded signal 3310.

Next, the operation of the embodiment will be described.

The pixel to be encoded position signal 3304 is a signal obtained by conducting coding while judging from transparency of pixel values of a picture whether coding is to be conducted or not.

When the pixel to be encoded position signal 3304 is input to the horizontal effective pixel range detecting means 3305, from the pixel to be encoded position signal 3304, the horizontal effective pixel range detecting means 3305 outputs the control signal 3306 based on the pixel position to be decoded which is to be first detected in the horizontal direction and that which is to be last detected. When the pixel to be encoded position signal 3304 is input to the vertical effective pixel range detecting means 3307, from the pixel to be encoded position signal 3304, the vertical effective pixel range detecting means 3307 outputs the control signal 3308 based on the pixel position to be decoded which is to be first detected in the horizontal direction and that which is to be last detected.

The pixel value signal 3301 including pixel value information of a picture and the control signals 3306 and 3308 are input to the selecting means 3302, for the pixel value signal 3301, a minimum single pixel block including a pixel value to be encoded is configured by the control signals 3306 and 3308, and the selecting means 3302 outputs the single pixel block to be encoded 3303. Even when the single pixel block to be encoded 3303 is input to the coding means 3309 which conducts multivalue coding in accordance with Wavelet transform coding that cannot encode plural blocks, it is possible to conduct multivalue coding in accordance with the above-mentioned coding because the block to be encoded is a signal pixel block. The coding means 3309 outputs the coded signal 3310.

FIG. 35 is a diagram showing single blocking in the embodiment. As shown in the right portion of FIG. 35, it will be seen that coding of the hatched region can be omitted by configuring a minimum single pixel block including a pixel value to be encoded.

As seen from the above description, according to the embodiment, a picture signal coding apparatus is provided in which a minimum single pixel block including a pixel value to be encoded is configured so that, even when a pixel value signal is to be encoded by a coding method which cannot encode a pixel value signal consisting of plural blocks, coding is enabled.

The multivalue coding in the coding means 3309 employs Wavelet coding. The method of the coding is not restricted to this. Alternatively, multivalue coding in which orthogonal transformation is combined with entropy coding may be employed. In short, any multivalue coding method may be employed as far as it can efficiently conduct multivalue coding.

As the means for determining whether a pixel is to be encoded or not, transparency of pixel values is used. The means is not restricted to this. Alternatively, brightness on which information of transparency of pixel values is superposed may be used. In short, any means may be used as far as it includes information of a transparent state of a pixel value.

Figure 36:
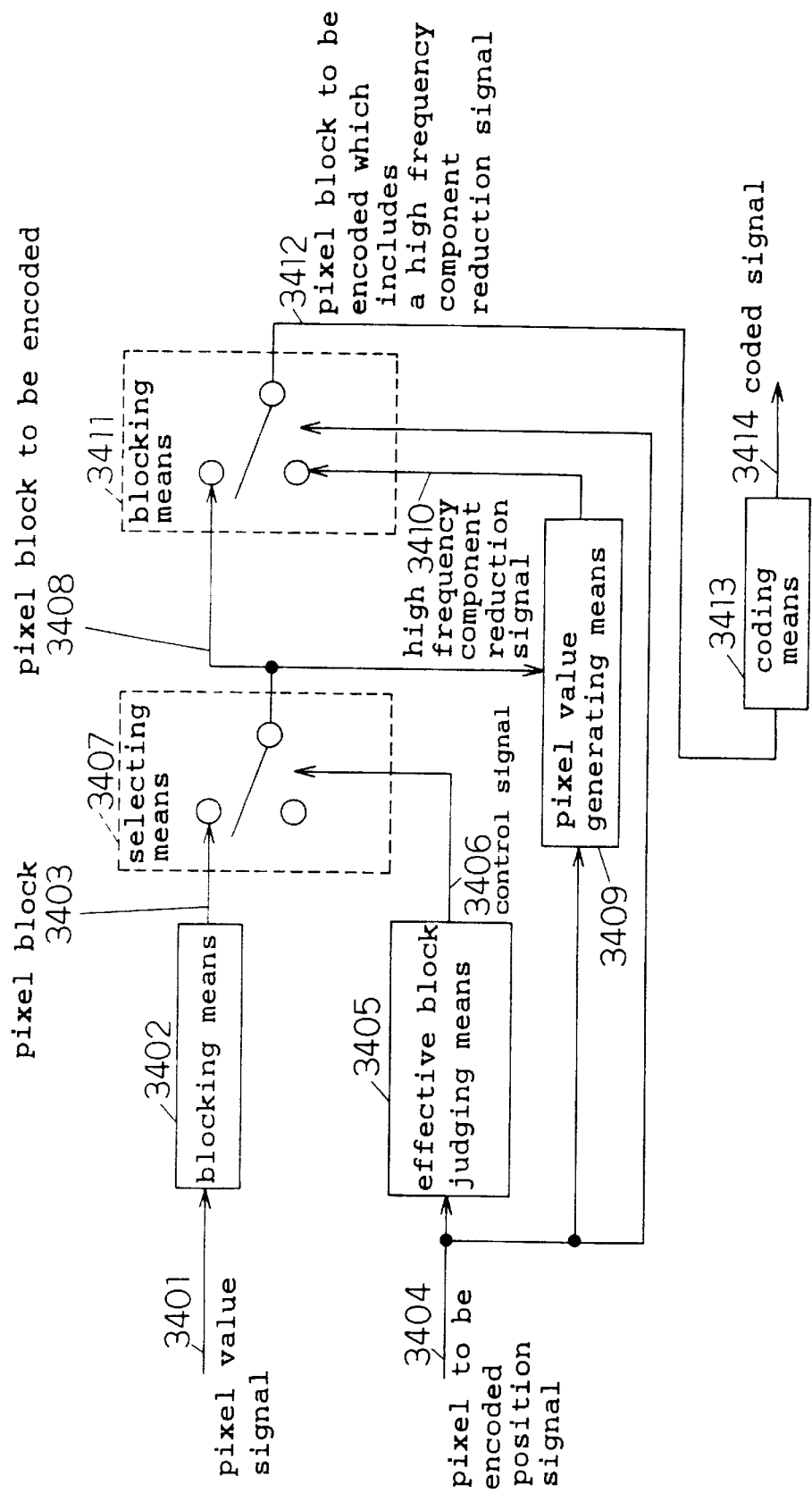
FIG. 36 is a block diagram of a picture coding apparatus which is a twenty-sixth embodiment of the invention.

Referring to FIG. 36, there is shown therein a block diagram of a picture coding apparatus which is a twenty-sixth embodiment of the invention. Blocking means 3402 which receives a pixel value signal 3401 and outputs a pixel block 3403, and effective block judging means 3405 which receives a pixel to be encoded position signal 3404 and outputs a control signal 3406 are connected to selecting means 3407 which receives the pixel block 3403 and the control signal 3406 and outputs a pixel block to be encoded 3408. The selecting means 3407, and pixel value generating means 3409 which receives the pixel to be encoded position signal 3404 and the pixel block to be encoded 3408 and outputs a high frequency component reduction signal 3410 are connected to blocking means 3411 which receives the pixel to be encoded position signal 3404, the pixel block to be encoded, and the high frequency component reduction signal 3410 and outputs a pixel block to be encoded 3412 including the high frequency component reduction signal. The blocking means 3411 is connected to coding means 3413 which receives the pixel block to be encoded 3412 including the high frequency component reduction signal and outputs a coded signal 3414.

Next, the operation of the embodiment will be described.

When the pixel value signal 3401 which includes pixel value information of a picture is input to the blocking means 3402, the picture is divided into pixel blocks which are arranged in a lattice or in horizontal and vertical directions, and then output as the pixel block 3403.

The pixel to be encoded position signal 3404 is a signal obtained by conducting coding while judging from transparency of pixel values of a picture whether coding is to be conducted or not.

When the pixel to be encoded position signal 3404 is input to the effective block judging means 3405, a block which is synchronized with the pixel block 3403 is checked to judge whether it includes a pixel value to be encoded or not. The effective block judging means 3405 outputs a signal based on the judgment as the control signal 3406. When the control signal 3406 and the pixel block 3403 are input to the selecting means 3407, if the effective block judging means 3405 judges that the pixel block 3403 includes a pixel value to be encoded, the pixel block 3403 is output from the selecting means 3407 as the pixel block to be encoded 3408. If the effective block judging means 3405 judges that the pixel block 3403 does not include a pixel value to be encoded, the pixel block 3403 is not output from the selecting means 3407. When the pixel block to be encoded 3408 output from the selecting means 3407 and the pixel to be encoded position signal 3404 are input to the pixel value generating means 3409, the average value of pixel values of pixels to be encoded which are included in the pixel block to be encoded 3408 is calculated and then output from the pixel value generating means 3409 as the high frequency component reduction signal 3410. When the high frequency component reduction signal 3410, the pixel block to be encoded 3408, and the pixel to be encoded position signal 3404 are input to the blocking means 3411, the average value is substituted into the value of a pixel which is included in the pixel block to be encoded and is not to be encoded, and the blocking means 3411 outputs the pixel block to be encoded 3412 which includes the high frequency component reduction signal. When the pixel block to be encoded 3412 which includes the high frequency component reduction signal is input to the coding means 3413, multivalue coding in accordance with DCT is conducted, and the coding means 3413 outputs the coded signal 3414.

Figure 37:
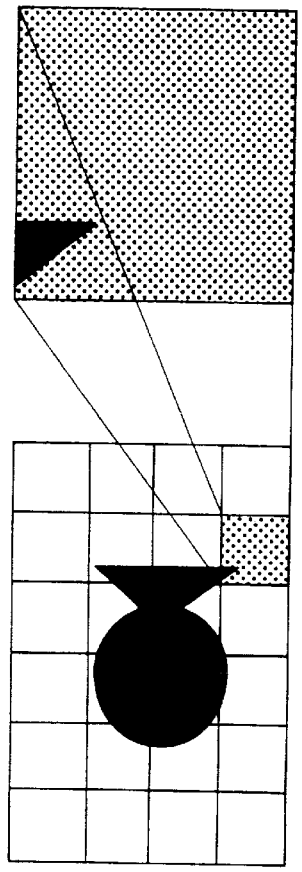
FIG. 37 is a diagram showing a process of storing a value for reducing high frequency components, into a pixel which is not a pixel to be encoded, in the twenty-sixth embodiment.

FIG. 37 is a diagram showing a process of storing a value for reducing high frequency components into the value of a pixel which is not a pixel to be encoded, in the embodiment. As shown in the right portion of FIG. 37, pixels to be encoded are indicated by the solid region, pixels not to be encoded are indicated by the dotted region. The average value which can reduce the high frequency components is substituted into the pixels not to be encoded which are indicated by the dotted region.

As seen from the above description, according to the embodiment, a picture signal coding apparatus is provided in which a value which can reduce the high frequency components of a pixel block to be encoded is substituted into a pixel not to be which is included in the pixel block to be encoded, whereby the high frequency components can be reduced. The method in which the average value which can reduce the high frequency components of a pixel block to be encoded is substituted into a pixel not to be encoded which is included in the pixel block to be encoded may be applied to the other embodiments.

The multivalue coding in the coding means 3413 employs DCT. The method of the coding is not restricted to this. Alternatively, multivalue coding in which orthogonal transformation is combined with entropy coding may be employed. In short, any multivalue coding method may be employed as far as it can efficiently conduct multivalue coding.

In the high frequency component reducing method of the pixel value generating means, the average value of pixel values to be encoded is employed. The value to be employed is not restricted to this, and an interpolation value may be employed. In short, any value may be employed as far as it can reduce high frequency components.

As the means for determining whether a pixel is to be encoded or not, transparency of a pixel values is used. The means is not restricted to this. Alternatively, brightness on which information of transparency of pixel values is superposed may be used. In short, any means may be used as far as it includes information of a transparent state of a pixel value.

What is claimed is:

1. A picture decoding apparatus for decoding a coded block including a plurality of pixels of picture data comprising:

judging means of judging on the basis of transparency information whether or not a block of picture data is to be decoded, said transparency information indicating whether a pixel of the block is transparent and a background of the pixel can be seen, or not transparent and the background of said pixel cannot be seen, and decoding means of decoding the block of picture data judged by said judging means to be decoded; wherein, said judging means judges that the block is to be decoded when said block includes a pixel which is not transparent, and judges that the block is not to be decoded when all pixels included in the block are transparent.

2. A picture decoding method for decoding a coded block including a plurality of pixels of picture data comprising the steps of:

judging on the basis of transparency information whether or not a block of picture data is to be decoded, said transparency information indicating whether a pixel of the block is transparent and a background of the pixel can be seen, or not transparent and the background of said pixel cannot be seen, and decoding the block of picture data judged to be decoded; wherein, the block is judged to be decoded when said block includes a pixel which is not transparent, and the block is judged not to be decoded when all pixels included in the block are transparent.

* * * * *

UNITED STATES PATENT AND TRADEMARK OFFICE
CERTIFICATE OF CORRECTION

PATENT NO.     : 6,351,562 B1
DATED          : February 26, 2002
INVENTOR(S)    : Kadono et al.

It is certified that error appears in the above-identified patent and that said Letters Patent is hereby corrected as shown below:

<u>Title page,</u>
Item [75], Inventors, delete "Kirakata" insert -- Hirakata --.
Item [56], References Cited, U.S. PATENT DOCUMENTS, delete "5,631,107 5/1997 Frank et al." insert -- 5,631,107 5/1997 Tarumi et al. --.

Signed and Sealed this

Fifteenth Day of July, 2003

JAMES E. ROGAN
*Director of the United States Patent and Trademark Office*